United States Patent [19]
Akizawa et al.

[11] Patent Number: 5,452,451
[45] Date of Patent: Sep. 19, 1995

[54] SYSTEM FOR PLURAL-STRING SEARCH WITH A PARALLEL COLLATION OF A FIRST PARTITION OF EACH STRING FOLLOWED BY FINITE AUTOMATA MATCHING OF SECOND PARTITIONS

[75] Inventors: Mitsuru Akizawa; Hisamitsu Kawaguchi, both of Hachioji; Kanji Kato, Tokorozawa; Atsushi Hatakeyama; Kouki Noguchi, both of Kokubunji; Hiromichi Fujisawa, Tokorozawa, all of Japan

[73] Assignees: Hitachi, Ltd., Tokyo; Hitachi Maxell, Ltd., Osaka, both of Japan

[21] Appl. No.: 349,124

[22] Filed: Dec. 1, 1994

Related U.S. Application Data

[63] Continuation of Ser. No. 537,491, Jun. 12, 1990, abandoned.

[30] Foreign Application Priority Data

Jun. 15, 1989 [JP] Japan .................................. 1-150401
Oct. 18, 1989 [JP] Japan .................................. 1-268927

[51] Int. Cl.⁶ .................................................. G06F 17/30
[52] U.S. Cl. ..................................... 395/600; 395/800; 364/DIG. 1; 364/253; 364/225.4; 364/282.1
[58] Field of Search ........................... 395/600, 800

[56] References Cited

U.S. PATENT DOCUMENTS

| | | | |
|---|---|---|---|
| 3,568,156 | 3/1971 | Thompson | 395/800 |
| 4,384,343 | 5/1983 | Morganti et al. | 395/800 |
| 4,450,520 | 5/1984 | Hollaar et al. | 395/550 |
| 4,916,635 | 4/1990 | Ohsone et al. | 395/600 |
| 5,003,307 | 5/1991 | Whiting et al. | 341/51 |
| 5,051,886 | 9/1991 | Kawaguchi et al. | 395/575 |
| 5,051,947 | 9/1991 | Messenger et al. | 395/800 |
| 5,060,143 | 10/1991 | Lee | 395/600 |
| 5,072,367 | 12/1991 | Clayton et al. | 395/600 |
| 5,175,860 | 12/1992 | Yamada | 395/800 |

FOREIGN PATENT DOCUMENTS 63-311530 12/1988 Japan .
2200228 7/1988 United Kingdom .

OTHER PUBLICATIONS

Sedgewick, Algorithms, Addison–Wesley 1983, Chapters 19–20, pp. 241–268.
Su, Database Computers, McGraw–Hill, 1988, Chapter 8, pp. 412–458.
Zeidler, H. "Content-Addressable Mass Memories," IEE Proceedings E. Computers & Digital Techniques, vol. 136, No. 5, Sep. 1989, pp. 351–356. (English).
Malms, M., et al. "Leistungssteigerung durch ein inhaltsadressierbares Speichersystem," Elektronische Rechenanlagen–MIT Computer Praxis, vol. 26, No. 4, Aug. 1984, pp. 179–185. (Abstract—English).

(List continued on next page.)

Primary Examiner—Thomas G. Black
Assistant Examiner—Wayne Amsbury
Attorney, Agent, or Firm—Fay, Sharpe, Beall, Fagan, Minnich & McKee

[57] ABSTRACT

A parallel comparator for performing a parallel and high-speed processing for collation of partial character strings which are partially taken out of a plurality of character strings of interest to be searched out with a character string to be searched in which document data to be searched is arranged sequentially from a leading character, is provided in a front stage of an automaton executing device. Only when a part of the character string to be searched coincides with the partial character string set in the comparator, the collation of the remaining portion of the character string to be searched is performed by the automaton executing device. Also, it is possible to set "don't care" in which a character at any position in the partial character string is ignored at the time of comparison by the comparator and to set a negation condition in which the comparison by the comparator is made taking the negation of a character at any position in the partial character string.

31 Claims, 42 Drawing Sheets

U.S. PATENT DOCUMENTS

Yamada, Hachiro, et al. "Real-Time String Search Engine LSI for 800-Mbit/sec LANs," Proceedings of the IEEE 1988 Custom Integrated Circuits Conference, May 16-19, 1988, pp. 2161-2164. (English).

Ng, Yan H., et al. "Mapping with No Strings Attached," Proceedings of Conpar. Conference Papers: Plenary Sessions and Stream "A", Sep. 12-16, 1988, pp. 155-165. (English).

Thurber, Kenneth James. "An Associative Processor for Air Traffic Control", Proceedings of the Spring Joint Computer Conference, May 18-20, 1971, pp. 49-59. (English).

Fu, Beatrice, et al. "Performance and Microarchitecture of the 1486 Processor," Proceedings of the 1989 IEEE International Conference on Computer Design: VLSI in Computers & Processors, Oct. 2-4, 1989, pp. 182-187. (English).

Doi, Katsuyuki, et al. "CMOS 8-Bit 1-Chip Microcomputer TMP80C49," Toshiba Review, No. 138, Mar.-Apr. 1982, pp. 29-32. (English).

R. L. Haskin, et al., "Operational Characteristics of Hardware-Based Pattern Matcher", ACM Trans. on Database Systems, vol. 8, No. 1, Mar. 1983. (Provided in English).

Alfred V. Aho, et al., "Efficient String Matching: An Aid to Bibliographic Search", Communications of the ACM, vol. 18, No. 6, Jun. 1975. (Provided in English).

CHARACTER STRING OF INTEREST TO BE SEARCHED OUT

K1 : a b c

K2 : b c

K3 : c

CHARACTER STRING TO BE SEARCHED

T : ⋯ a b c ⋯

K1: 文字列照合 (mo ji retsu shyogo)
K2: 文字認識 (mo ji nin shiki)
K3: 文学史 (bungakushi)
K4: 検索制御方式 (kensaku seigyo ho shiki)

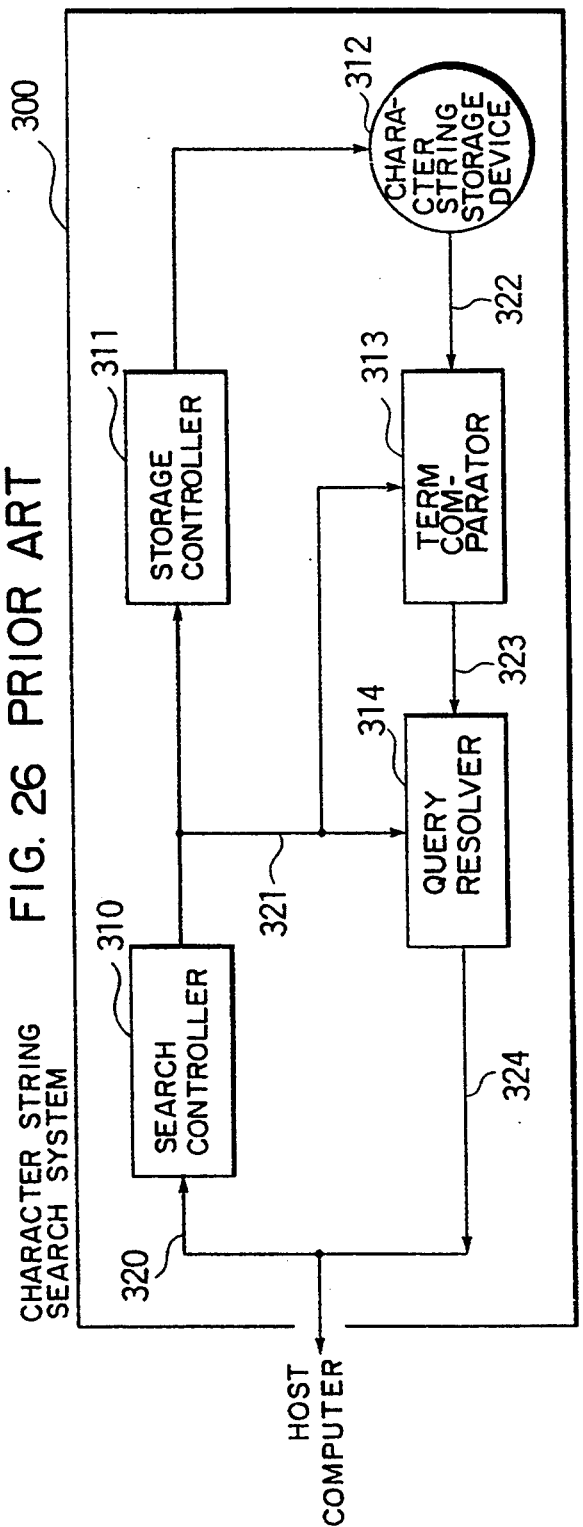
FIG. 26 PRIOR ART
FIG. 28
K : a b c
→
K1 : a b c
K2 : a b¬c
K3 : a¬b c
K4 : ¬a b c
K5 : a b ? c
K6 : a ? b c
K7 : a b
K8 : a c
K9 : bc
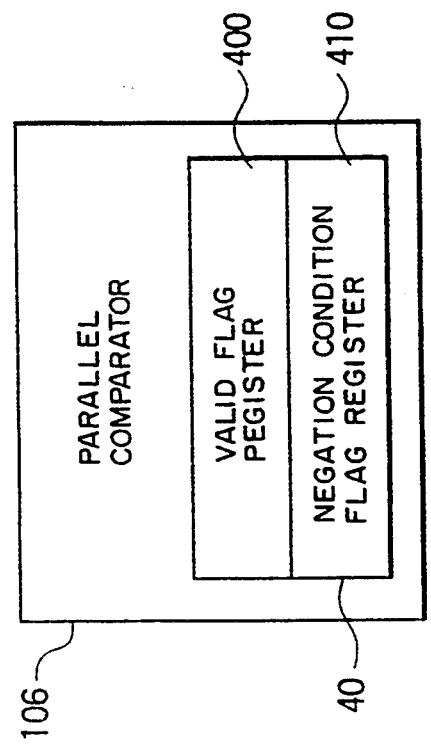
FIG. 27

FIG. 31

| | 0 | 1 | 2 | 3 | 4 | 5 | 6 | 15 |
|---|---|---|---|---|---|---|---|---|
| VALID FLAG REGISTER | 1 1 0 0 | 1 1 0 0 | 1 1 0 0 | 1 1 0 0 | 1 1 0 0 | 0 0 0 0 | 0 0 0 0 | 0 0 0 0 |
| NEGATIVE CONDITION FLAG REGISTER | 1 1 1 1 | 1 1 1 1 | 1 0 1 1 | 1 0 1 1 | 1 0 1 1 | 1 1 1 1 | 1 1 1 1 | 1 1 1 1 |
| PARTIAL CHARACTER STRING | a b △ △ | a c △ △ | a b △ △ | a c △ △ | b c △ △ | △ △ △ △ | △ △ △ △ | △ △ △ △ |

SYSTEM FOR PLURAL-STRING SEARCH WITH A PARALLEL COLLATION OF A FIRST PARTITION OF EACH STRING FOLLOWED BY FINITE AUTOMATA MATCHING OF SECOND PARTITIONS

This is a continuation of U.S. application Ser. No. 07/537,491 filed Jun. 12, 1990 now abandoned.

BACKGROUND OF THE INVENTION

The present invention relates to a method and apparatus for high-speed searching of non-structural data in a system such as a data base or a document filing system in which information including non-numeric data is processed. More particularly, the present invention relates to a symbol string search method which is suitable for full-text searching of document data in a character string search, an apparatus which realizes such a method and a semiconductor integrated circuit which is contemplated as such an apparatus.

As the storage capacity of an information processing system shows a yearly increase, the rate of processing for handling of non-numeric data represented by document data has become high. From such a background, the importance of a processing which can make a high-speed and throughout search for a desired document or data from a large capacity database increases.

Conventionally, a method of using supplementary information such as keywords or classification codes has been generally employed for the search of document data. However, it is difficult to strictly represent fine conditions of a search by means of only the keywords or classification codes and hence it is hard to make a restriction to a desired document or data. Accordingly, in this method, documents which are not desired by a searcher may be included as search noises. Therefore, there is a problem that the searcher must ultimately read the text directly to select his desired document data, thereby lowering the efficiency of the search processing. Further, the amount of an indexing work for adding keywords or classification codes is increased with the increase of document data. This causes delayed registration of document data. Also, the keyword or classification code may often change in meaning to go out of date with the times. This makes it difficult to maintain the up-to-dateness of the data base.

In order to solve the above problems, a method has been proposed in which a collation with an arbitrarily chosen set of keywords is made while scanning the text of document. This method will be hereinafter referred to as full-text search.

One example of a character string search system based on the full-text search has been disclosed by R. L. Haskin and L. A. Hollaar, "Operational Characteristics of a Hardware-Based Pattern Matcher", ACM Trans. on Data Base Systems, Vol. 8, No. 1, 1983.

FIG. 26 shows a character string search system disclosed by the Haskin et al's article. The character string search system 300 is connected to a host computer so that a search request 320 and the result 324 of search are communicated between the system 300 and the host computer. If the search-request 320 is sent from the host computer, a search controller 310 receives the search request to analyze it and sends search control information 321 to a term comparator 313 and a query resolver 314. The search controller 310 also controls a storage controller 311 so that character string data 322 stored in a character string storage device 312 is transferred to the term comparator 313. The term comparator 313 compares the inputted character string data 322 with a preset character string and outputs detection information 323 to the query resolver 312 when the relevant character string is detected. The query resolver 314 examines whether or not the detection information 323 matches with a complex condition such as a proximity between character strings shown by the search request. In the case where the matching is obtained, the query resolver 314 outputs identification information of the corresponding document data or the contents of the document as the result 324 of search which is in turn sent to the host computer.

One way of the full-text search performed by the term comparator 313 is a method which uses a finite state automaton. According to this method, it is possible to make a search by scanning a text once irrespective of the number of keywords. An example of the method using the finite state automaton has been disclosed by A. V. Aho and M. J. Corasick, "Efficient String Matching", Comm, ACM, Vol. 18, No. 6, 175.

Since the method using the finite automaton can also realize a variety of approximate searches such as a search including "don't care" characters or a search including erroneous characters, this method is a technique which is effective for the full-text search. The "don't care" character means an arbitrary character (or any character).

The term "automaton" referred to in the present specification means a machine which makes a transition from a certain state to another state (or to itself) when any given transition condition is inputted.

An algorithm for realizing the high-speed full-text search based on the finite state automaton and a means for implementation of it have been disclosed by, for example, JP-A-63-311530.

The most fundamental system for a search using the finite automaton is a perfect state transition system in which states are allotted for respective transitions associated with characters in a set character string and all possible transition paths are given between the states. In this system, transition processing for one character of an inputted character string data can be surely performed for one machine cycle. However, as the length of a character string increases, the number of states and hence the number of state transition paths increase. Therefore, there arises a problem that an automaton generation time becomes long.

So, A. V. Aho et al have proposed a sequential repetitive fail system into which the concept of a "fail processing" is introduced. The fail processing is a processing performed in the case where a mismatching occurs in a processing for judgement of the matching/mismatching of inputted character string data with a character in a set character string of interest which is to be searched out. According to this system, the number of state transition paths can be greatly reduced. However, there is a problem that it does not always follow that a transition processing for one character of the character string data can be performed in one machine cycle.

An anticipatory fail system disclosed by the above-mentioned JP-A-63-311530 offsets the defects of the perfect state transition system and the sequential repetitive fail system. In the anticipatory fail system, a fail processing as the provision for the case of occurrence of a fail is always performed concurrently with or in parallel with a usual transition processing so that a state of destination for transition is changed in the case whence the occurrence of the fail is detected. This system makes it possible to generate an automaton in a relatively short time and to perform a processing for one character of character string data in one machine cycle.

However, in the conventional full-text search using the finite automaton as mentioned above, a state transition in each cycle is made with continual reference to a state transition table. Usually, the amount of data in the state transition table is large so that the state transition table is stored in a memory of a chip other than a semiconductor integrated circuit which controls the execution of a finite automaton. Therefore, there is a problem that access to the memory is required at every cycle, thereby arresting the improvement of a processing speed.

As has been mentioned above, in the document search relying on the conventional full-text search using the automaton, since a large scale state transition table is required, it is necessary to store the table in a chip other than a semiconductor integrated circuit which controls the execution of the automaton. Accordingly, there is a problem that the improvement of a processing speed cannot be expected since the input/output of data between the automaton executing means and the table memory is always made.

The problem of the input/output of data is avoided by a similar document search apparatus which uses a cellular array. Such an apparatus has been disclosed by, for example, JP-A-62-217321. In this apparatus, however, problems including a circuit delay caused by the increase of the number of character strings and a shift delay caused by the increase of the character string length arise in broadcasting data to be inputted to each cell. Also, when an ambiguous or approximate search such as a search for character strings including "don't care" characters or a search for character strings including erroneous characters is to be realized, the amount of hardware generally has an increasing tendency. Further, since the upper limit of the word length of a settable search character string to be searched out is restricted by the amount of hardware, this apparatus is inferior to the automaton system in the flexibility of the search processing.

Consider, by way of example, the case where "daiyoryo" ("大容" in Japanese and "large capacity" in English) is designated as a character string to be searched out and the error of one character (in Japanese) is allowed for a normal character string "daiyoryo". The designated character string "daiyoryo" consists of three characters of "dai", "yo" and "ryo". In this case, the replacement of one character, the insertion of one character and the omission of one character are allowable. Now provided that any character other than {dai} is indicated by ⌐ {dai}, any character other than {yo} by ⌐ {yo}, any character Other than {ryo} by ⌐ {ryo}, and any one character (or "don't care" character) by ?, the execution of the search allowing the error of one character for the set character string "daiyoryo" requires to search for or search out nine character strings as follows:

$K_1$: diayoryo
$K_2$: daiyo⌐{ryo}
$K_3$: dai⌐{yo}ryo
$K_4$: ⌐{dai}yoryo
$K_5$: daiyo?ryo
$K_6$: dai?yoryo
$K_7$: daiyo $K_8$: dairyo
$K_9$: yoryo.

When a finite automaton (as shown in FIG. 29 which will be explained in later) for making a search for these character strings in accordance with the full-text search is generated, the input of a character including a negation condition appears as a state transition condition. Such a state transition is called an exclusive transition. Accordingly, the ability to detect the exclusive transition condition is required. Thus, the possession of a function of setting the negation condition becomes necessary in order to realize the ambiguous or approximate search such a search which allows erroneous characters.

The possession of the negation condition setting function makes it possible to eliminate unnecessary results of search or to suppress so-called search noises. Now consider by way of example the case where a text including a character string "kinzokugenshi" ("金属" in Japanese and "metal" in English) or "dotai" ("導体" in Japanese and "conductor" in English) is searched. In the collation, however, a text including "hikinzoku" ("非金属" in Japanese and "non-metal" in English) may be detected in connection with the partial character string of "kinzoku" or a text including "handotai" ("半導体" in Japanese and "semiconductor" in English) may be detected in connection with the partial character string of "dotai". Though "hikinzoku" or "handotai" involves the set partial character string of "kinzoku" or "dotai", it is another character string having a meaning different from the set partial character string. Depending on the purpose of a search, such other character strings may appear as unnecessary results of search or so-called search noises in the full-text search. Such search noises can be removed by using a negation condition to make the more restrictive setting of a partial character string as follows:

"kinzoku"→"⌐{hi}kinzoku"

"dotai"→"⌐{han}dotai".

Thereby, it is possible to prevent "hikinzoku" or "handotai" from appearing from the search noise. Many examples of such a setting exist. For example, in connection with "suchishori" (numeric processing) or "teigigo" (defined word), the following setting may be made:

"suchishori"→"⌐{hi}suchishori(non-numeric processing)"

"teigigo"→"⌐{mi}teigigo(undefined work)".

If the negation condition is thus set, it becomes possible to suppress the search noises.

However, the conventional system is not provided with a negation condition setting function. Therefore, there is a problem a one-character error allowable search or a restrictive search for noise suppression is not possible.

SUMMARY OF THE INVENTION

A first object of the present invention is to provide a symbol string search method in which the improvement of a processing speed in a document search based on a full-text search using an automaton is intended by reducing the frequency of input/output of data between automaton executing means and a memory in which a state transition table is stored, to provide an apparatus which realizes such a method and to provide a semiconductor integrated circuit which is contemplated as such an apparatus.

A second object of the present invention is to provide a symbol string search method and apparatus which permit an ambiguous or approximate search.

To attain the first object, the present invention provides a symbol string search method using an automaton in which a judgement is made of whether or not a plurality of symbol strings of interest to be searched for exist in a symbol string to be searched which is composed of symbols represented by codes. The method is characterized in that in making a batch search (where batch search means a process for searching a plurality of character strings at one time during a text scan in a full-text search) for the plurality of symbol strings of interest from the symbol string to be searched, each of the plurality of symbol strings of interest are divided into at least two partial symbol strings at any position thereof. Each of the plurality of symbol strings of interest are subjected to a processing for collation of one partial symbol string of the symbol string of interest with the symbol string to be searched (that is, a leading collation processing). The of those of the plurality of symbol strings of interest which satisfy search conditions on the partial symbol strings subjected to the leading collation processing are subjected to a processing for collation of the remaining partial symbol string(s) of the symbol string of interest with the symbol string to be searched (that is, a following collation processing). The symbol string of interest being judged as having been successfully searched for in the case where it satisfies a search condition on the remaining partial symbol string subjected to the following collation processing.

The symbol string referred to in the above may be arbitrary so long as it is a string of symbols represented by codes. Explanation will now be made taking a code-represented character string by way of example.

For example, a parallel comparator, for performing a parallel and high-speed processing for collation of partial character strings partially taken out of a plurality of character strings (hereinafter referred to as character strings of interest) which are to be searched for from document data with a character string (hereinafter referred to as character string to be searched) in which the document data is arranged sequentially from a leading character, is provided in a front stage of an automaton executing means in a semiconductor integrated circuit. The collation of the remaining portion of the character string of interest with the character string to be searched is performed by the automaton executing means only when the matching with the partial character string set in the parallel comparator is obtained, whereby the frequency of input/output of data between the automaton executing means and a state transition table is lowered, thereby realizing the improvement of a search processing speed.

Also, means capable of setting variable length "don't care" in a partial character string is provided in order to improve the collation processing in the parallel comparator.

Further, in order to eliminate the need for adjustment in the case of simultaneous occurrence of the input of the character string to be searched and the input of data from a memory in which the state transition table is stored and to allow the parallel comparator and the automaton executing means to operate in parallel with each other, independently operative input ports or terminals may be separately provided as interfaces, thereby realizing a high-speed processing.

It is preferable that all of the above-mentioned means or constituent elements of the present invention are integrated on the same chip. In that case, the maximum performance is obtained. This is because a delay caused by the transfer of a signal between chips is eliminated and a delay of a time required for access to the memory is suppressed.

As regards all or some of the above-mentioned means or constituent elements of the present invention, each constituent element may be provided to be plural in number, as required, so that a load of the processing is distributed, thereby improving the total performance by virtue of a parallel processing. Accordingly, there may be the case where two or more identical constituent elements may be integrated on the same semiconductor chip.

In practical terms, since a restriction is imposed on the scale of a circuit which can be formed on the same chip, it does not always follow that it is possible to integrate all of the constituent elements on the same semiconductor chip. Especially, the state transition table requires a memory having a relatively large capacity and the parallel comparator is increased in circuit scale when an attempt is made to enlarge the capacity of a partial character string of a character string of interest which can be set. Accordingly, such a constituent element may be separated from the other constituent elements so that it is constructed as another semiconductor chip.

Now, the function of the present invention will be explained by use of FIGS. 1A and 1B which are diagrams for explaining the principle of the present invention. FIG. 1A is a block diagram showing the fundamental construction of the present invention and FIG. 1B is a diagram showing the concept of an automaton executed in a character string search processing which is performed by the construction shown in FIG. 1A.

In the present invention, as shown in FIG. 1A, a character string 101 to be searched which is taken in through an input buffer 102 is input to a parallel comparison section 10 and a finite automaton execution section 11 concurrently so that it is subjected to processings in the respective sections. The result of search 111 (the corresponding character string of interest and positional information indicative of a position at which the character string of interest is placed in document data) is outputted to the exterior through an output buffer 105.

In FIG. 1B showing the concept of an automaton executed in the above processing, a numbered circle represents each state, a numeral in the circle represents a state number and the size of the circle relatively shows the frequency of transition to the corresponding state. An arrow indicates a state transition and an initial state is 0 (zero).

FIG. 2 shown for comparison with the present invention is a diagram for explaining the principle of the conventional document search based on the full-text search using an automaton. More particularly, (a) of FIG. 2 is a block diagram showing a fundamental construction and (b) thereof is a diagram showing the concept of the automaton executed in a processing which is performed in the construction shown in (a) of FIG. 2.

As shown in FIG. 2, in the conventional apparatus, collation processings in all of the states of a finite automaton 12 are performed by a finite automaton execution section 11. Accordingly, each time one of character codes by which a character string to be searched is converted into an internal format is input, data access to a state transition table 110 from a finite automaton executing unit 104 infallibly occurs, which arrests the improvement of a processing speed.

In the present invention, on the other hand, as shown in FIGS. 1A and 1B, a leading collation processing (i.e., a processing for collation for a leading partial character string which is one division of the character string of interest to be searched for and the length of which may include one or more characters) corresponding to a leading collation automaton 13 is performed in the parallel comparison section 10 provided at a front stage of the finite automaton execution section 11 and a posterior collation processing (i.e., a processing for collation for the remaining partial character string of the character string of interest to be searched out) corresponding to a posterior collation automaton 14 is performed in the finite automaton execution section 11.

As seen from FIG. 1B, the rate of the leading collation to the total amount of processing by the whole of the automaton is very high. This is demonstrated by simulation data shown in FIG. 3.

FIG. 3 shows collected trace data of state transition in the case where search processings were performed for a Japanese document (including 25,408 characters) and an English document (including 11,000 characters) by use of automatons generated in connection with a keyword of ten Japanese characters and a keyword of ten English characters which are randomly extracted. Now, explanation will be made of the term "token" in the ordinate of FIG. 3 and the term "depth of state" in the abscissa thereof. The term "token" is a virtual marking which exists in a state after transition when a state transition occurs, and indicates a state which is the origin of transition when the next character code is inputted. The term "depth of state" is defined as follows. The token starts from an initial state 0. When an inputted character code coincides with a transition condition, the token moves so that a state transition occurs. In this case, a state attainable by a direct transition from the initial state 0 is called a "state of depth 1" and a "state of depth n" is defined as a state attainable by a direct transition from a "state of depth (n−1)" (excepting a transition caused by a fail). The initial state 0 is a "state of depth 0".

Accordingly, each of a "state 1" and a "state 6" in FIG. 1B is a "state of depth 1" each of a "state 2", a "state 4" and a "state 7" is a "state of depth 2" and each of a "state 3" and a "state 5" is a "state of depth 3".

In the state of depth 0, each time a character code is input, the input character code is compared with a character code which represents transition condition to check whether or not a transition condition is satisfied. Therefore, the probability of arrival of the token at the state 0 is 100%. The probability of arrival means the rate (in percentage) of the frequency of transitional arrival at each state to the frequency of input of character code. Since the transition of the token from the state of depth 0 to the state of depth 1 is caused by a character code which constructs a part of the character string of interest, the probability of arrival of the token at the state of depth 1 is about 15% in the case of the Japanese character string (see FIG. 3). If an anti-coincidence occurs in the course of a processing for collation of the character string to be searched with the character string of interest to be searched out so that the token cannot make a direct transition, the token returns to the state 0 and the collation or check at the state 0 is made again. Thus, as the depth of state becomes greater, the probability of arrival is lowered. It is seen from FIG. 3 that the probability of arrival becomes high with the decrease of the depth of state. Namely, it can be understood that the amount of processing by the leading collation bears a large rate to the total amount of processing by the whole of the automaton. Accordingly, the execution of the leading collation by the parallel comparison section 10 causes a considerable decrease of the amount of processing at the finite automaton execution section 11 and the number of times of access to a state transition table 110 is correspondingly reduced. On the other hand, the processing by the parallel comparison section 10 does not require the input/output of data to/from the table. Therefore, the number of times of the input/output of data to/from the table in the whole of the search processing is remarkably reduced as compared with that in the conventional method. As a result, the improvement of the search processing speed becomes possible.

Further, since the probability of arrival of the token is lower as the depth of state becomes greater, as seen from FIG. 3, the probability of transition of the token to states included in the posterior collation automaton is further lowered if the number of characters of a partial character string to be subjected to batch collation in the parallel comparison section 10 is made large. Accordingly, the amount of processing at the finite automaton execution section 11 is decreased more by making the number of characters of a partial character string large. As a result, it becomes possible to further improve the search processing speed.

Also, a valid flag register capable of designating the validity or invalidity of a partial character string set in the parallel comparator 106 at any position and with a variable length is provided, thereby making it possible to introduce a plurality of "don't care" characters into the partial character string at any position and to render the word length of the partial character string variable. Thereby, an ambiguous or approximate search function can be realized and the nullification or restortion of the set character string of interest to be searched for can be made through only the operation of the valid flag register without erasing or rewriting the partial character string.

To attain the above-mentioned second object of the present invention, the parallel comparison section 10 performing the leading collation processing is provided with a negation condition flag register 410 (see FIG. 27) as means capable of setting a negation condition in addition to a valid flag register 400 as means capable of setting "don't care" at any position in a partial character string set in the parallel comparator 106.

The leading collation processing at the parallel comparator 106 is performed referring to the registers 400 and 410. Thereby, the flexibility of the leading collation processing can be enhanced. Therefore, even the parallel comparison section 10 can make a more ambiguous or approximate search such as a one-character error allowable search or a restrictive search similar to that performed by the finite automaton execution section 11. Further, it becomes possible to effect the nullification or restortion of the character string of interest through only the operation of the "don't care" setting means or the negation condition setting means without erasing or rewriting the partial character string and to render the word length of the partial character string variable.

BRIEF DESCRIPTION OF THE DRAWINGS

FIG. 26 is a block diagram showing the whole construction of the conventional character string search system;

FIG. 27 is a block diagram showing an example of a parallel comparator for explaining another embodiment of the present invention; and FIGS. 28 to 45 show further embodiments of the present invention, more particularly, FIG. 28 being a view for explaining an example of development of a character string of interest for which the error of one character is allowed, FIG. 29 being a diagram for explaining an automaton for making a search for the character strings of interest shown in FIG. 28, FIG. 30 being a block diagram for explaining a parallel comparator and a posterior collation automaton for making a search for the character strings of interest shown in FIG. 28, FIG. 31 being a diagram for explaining collation flag registers for realization of a search for partial character strings at the parallel comparator shown in FIG. 30 and an example of setting of the partial character strings, FIG. 32 being a block diagram for explaining an embodiment of a parallel comparator using a CAM, FIG. 33 being a block diagram for explaining a manner in which a partial character string of interest is set to the parallel comparator using the CAM, FIG. 34 being a block diagram for explaining a manner in which a partial character string of interest including a negation condition is set to the parallel comparator using the CAM, FIG. 35 being a block diagram for explaining a manner in which a partial character string of interest is set to a parallel comparator using a CAM and having a function of giving notice of detection of a character string of interest including a negation condition, FIG. 36 being a block diagram for explaining a manner in which a partial character string of interest including a negation condition is set to the comparator using the CAM and having the function of giving notice of detection of a character string of interest including a negation condition, FIG. 37 being a block diagram for explaining an embodiment of a parallel comparator using registers and comparators, FIG. 38 being a block diagram for explaining a manner in which a partial character string of interest is set to the comparator using the registers and the comparators, FIG. 39 being a block diagram for explaining a manner in which a partial character string including a negation condiction is set to the parallel comparator using the registers and the comparators, FIG. 40 being a block diagram for explaining a manner in which a partial character string of interest is set to a parallel comparator using registers and comparators and having a function of giving notice of detection of a character string of interest including a negation condition, FIG. 41 being a block diagram for explaining a manner in which a partial character string of interest including a negation condition is set to the parallel comparator using the registers and the comparators and having the function of giving notice of detection of a character string of interest including a negation condition, FIG. 42 being a block diagram for explaining a construction in which an input terminal for setting of partial character strings of interest, an input terminal for setting of valid flag registers, an input terminal for setting of negation condition flag registers and an input terminal for a character string to be searched are provided by one common terminal in a parallel comparator using a CAM, FIG. 43 being a block diagram for explaining a construction in which an input terminal for setting of partial character strings of interest, an input terminal for setting of valid flag registers, an input terminal for setting of negation condition flag registers and an input terminal for a character string to be searched are provided by one common terminal in a parallel comparator using registers and comparators, FIG. 44 being a block diagram for explaining a collation flag register setting circuit based on a command system, and FIG. 45 being a schematic block diagram showing an example in which the command system shown in FIG. 44 is applied to a parallel comparator.

DESCRIPTION OF THE PREFERRED EMBODIMENTS

Embodiments of the present invention will now be explained by virtue of the accompanying drawings. Though the following embodiments are explained in conjunction with the case where a character string represented by codes is taken as an example of a symbol string represented by codes, the present invention is of course applicable to a general symbol string which is not limited to a character string.

Figure 4:
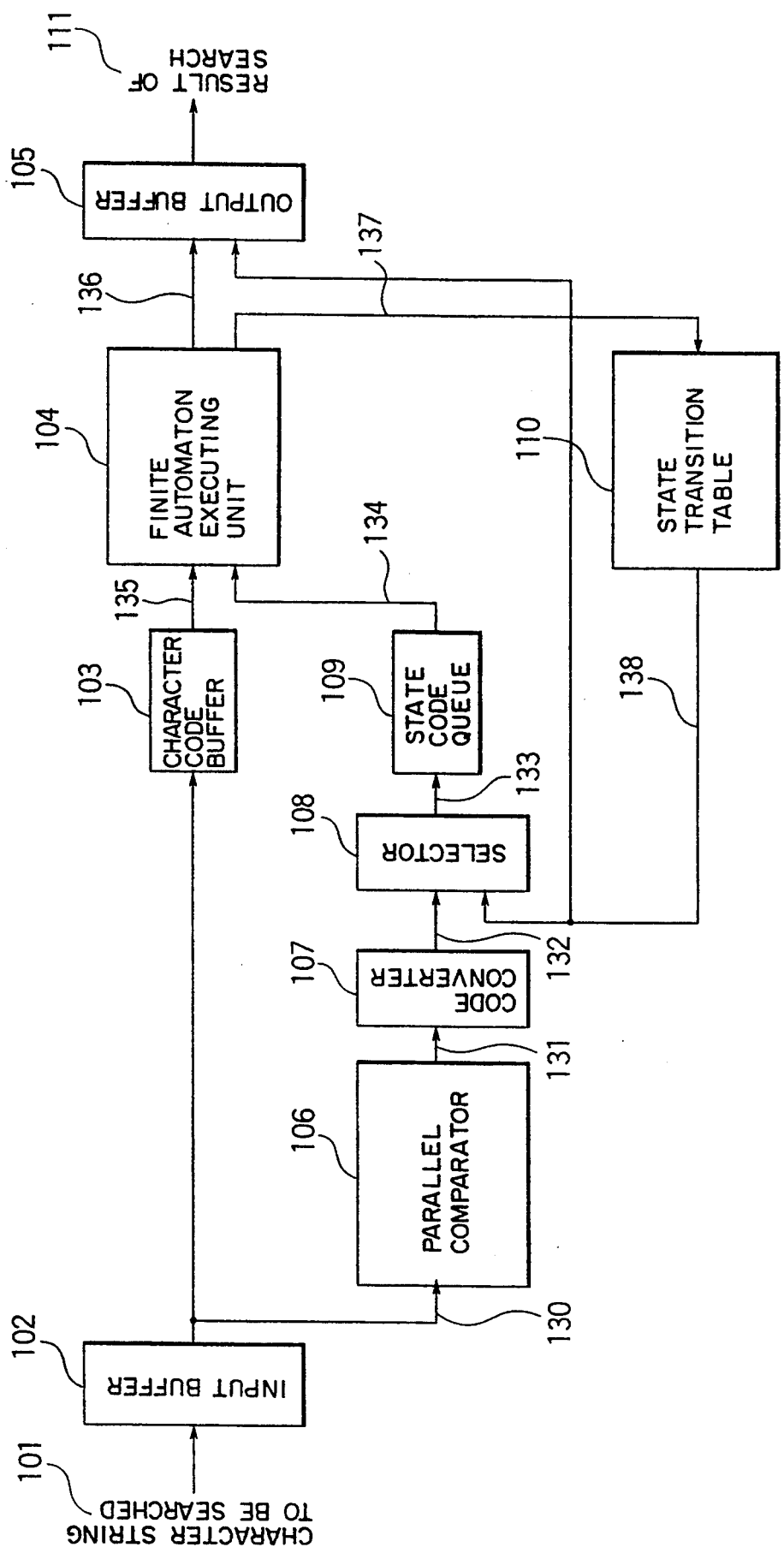
FIG. 4 is a block diagram showing the construction of a first embodiment of the present invention.

FIG. 4 is a block diagram of a first embodiment of the present invention. The present embodiment is composed of an input buffer 102 which takes in a character string 101 to be searched, and a parallel comparator 106 which makes a batch collation or comparison of an input character code 130 and partial character strings of a plurality of preset character strings of interest with each other. Also included is a code converter 107 by which a coincidence signal 131 (giving notice of detection of the coincidence between the character string to be searched and the partial character string of the character string of interest as the result of comparison in the parallel comparator 106) is converted into an identification code (hereinafter referred to as state code) 132 associated with each state of an automaton. Further included is a state code queue 109 which holds an effective state (hereinafter referred to as current state) in which a token to be processed for the next input character code, an input selector 108 which selects a state code 133 to be input to the state code queue 109, a finite automaton executing unit 104 which controls a state transition operation of the automaton, a character code buffer 103 which stores a character code 135 to be input to the finite automaton executing unit 104, a state transition table 110 in which control information of the state transition of the automaton is stored, and an output buffer 105 which holds the result 111 of search to be outputted therefrom.

In operation, document data in a data base is input to the input buffer 102 in units of one character or plural characters as the character string 101 to be searched. In the input buffer 102, the data width of the character string 101 is converted into a bit size conformable to a data transfer bus for input to the parallel comparator 106 and the input character code buffer 103. The converted character string is transferred to the character code buffer 103 at a front stage of the finite state automaton executing unit 104 and the parallel comparator 106 concurrently and synchronously.

Leading portions of the character strings of interest are preliminarily stored or set as partial character strings in the parallel comparator 106. Each time one character or plural characters is sent from the input buffer 102, the parallel comparator 106 collates the one character or plural characters with the partial character strings of all of the character strings of interest concurrently.

If a coincidence between the character string to be searched and the partial character string of the character string of interest to be searched for is detected, a coincidence signal is converted by the code converter 107 into an identification code or state code 132 which is associated with each state and indicates the detection of each character string of interest. This code is coordinated with a state code set in the state transition table 110 and is handled as a state code in the finite automaton executing unit 104 as it is.

The state code 132 outputted from the code converter 107 is selected by the selector 108 and is then stored into the state code queue 109.

On the other hand, character code data in the character code buffer 103 is subjected to a processing by the finite automaton executing unit 104 concurrently with the above parallel comparison. The character code buffer 103 makes compensation for a difference between the character code transferring speed of the input buffer 102 and the processing speed of the finite automaton executing unit 104.

Inputs of the finite automaton executing unit 104 are character code data in the character code buffer 103 and a current state code stored in the state code queue 109.

The finite automaton executing unit 104 takes out the current state code from the state code queue 109 to produce an access address 137 of the state transition table 110 from the current state code and the character code data in the character code buffer 103. The content of the corresponding address is a state 138 of destination for transition (hereinafter referred to as next state) of the current state of the finite automaton and is stored into the state code queue 109 through the selector 108. When the current state code has been processed, the next character code data is taken out from the character code buffer 103.

In the case where the result 138 of state transition of the automaton takes a state indicating the detection of the character string of interest as the result of the above processing, there results in that a character string coincident with the character string of interest has been detected or searched out. The corresponding result 111 of search is written into the output buffer 105.

A consecutive processing for one character or plural characters inputted as the character string 101 to be searched is performed as mentioned above. Namely, each time a character code is inputted, the inputted character code is collated with partial character strings of interest in the parallel comparator 106 and the activation of the automaton for the current state code stored in the state code queue 109 is made concurrently with the collation. Accordingly, in the case where no effective current state is present and hence no state code is present in the state code queue 109, the automaton is not activated but the character string 101 to be searched is successively processed by only the comparative collation in the parallel comparator 106. When a coincidence is detected as the result of collation, the automaton is activated in performing a processing for the next character code.

Thus, the processing is always started from the input of the character string 101 to be searched and the leading collation processing.

In the case where the collation processing is performed by only the finite automaton executing unit 104 as in the conventional apparatus, access to the state transition table 110 must be made each time a character code is input. The state transition table 110 correlates a current state and a state of destination for transition thereof with each other in accordance with a transition condition and is usually stored in a large capacity of memory. Therefore, a time in which the finite automaton executing unit 104 makes access to the state transition table 110 occupies the greater part of a collation processing time, thereby arresting the processing speed. However, if the processing by only the parallel comparator is performed until the coincidence between the partial character string of the character string of interest to be searched for and the character string to be searched is detected, as in the present embodiment, a very great portion of a character string search processing can be performed by only the comparison processing with no access to the table. The comparison processing can be realized by a relatively small capacity of hardware since it is restricted to the partial character portion. Accordingly, if the parallel comparator and its peripheral circuit are formed by one chip or a high-speed and small-capacity memory is used, it becomes possible to perform the character string search processing in a time which is very short as compared with that required in the conventional apparatus making access to the state transition table each time a character code is inputted. As a result, the speed of the overall search processing can be improved.

Figure 5:
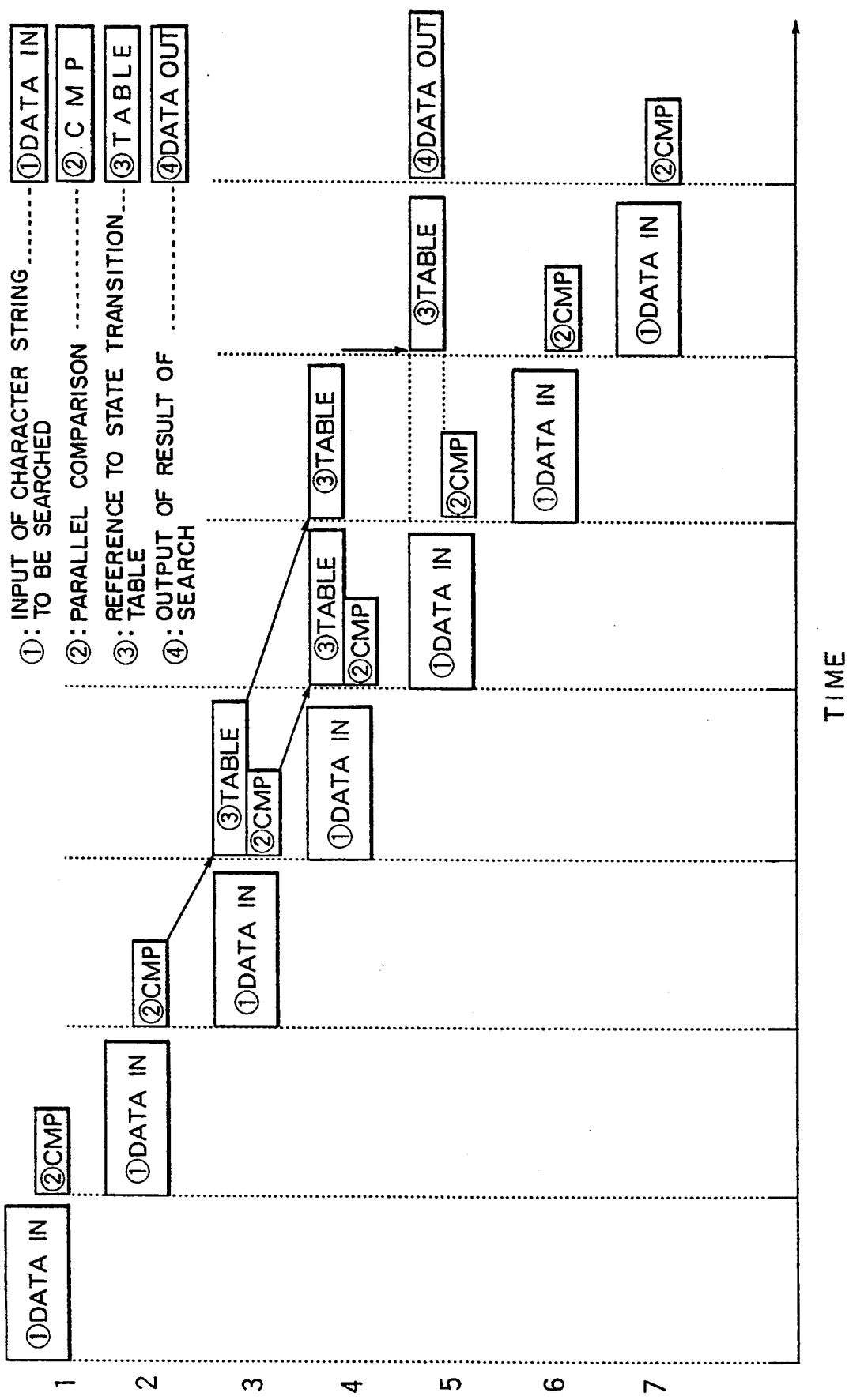
FIG. 5 shows a time chart of a parallel processing performed in the first embodiment of the present invention.

FIG. 5 is a time chart of a search processing for explaining the parallel operation in the present embodiment. As shown in FIG. 5, the consecutive processing is performed in the order of ① the input of a character string 101 to be searched (DATA IN), ② the parallel comparison with partial character strings of a plurality of character strings of interest to be searched for (CMP), ③ the reference to the state transition table (TABLE) and ④ the output of the result 111 of search (DATA OUT). However, the step ③ is not executed if no effective current state is present and the step ④ is not executed if a search condition on the character string of interest is not satisfied. Accordingly, the processing for the input of one character or plurality of characters of the character string 101 to be searched is composed of the steps ① and ② each of which is one in number of times of execution, the step ③ executed in times the number of which is equal to the number of effective states in the state code queue 109, and the step ④ which is zero or one in number of times of execution. But, the number of times of execution of the step ④ may be plural depending on the system of the automaton since there is the case where a single state corresponds to the concurrent detection of a plurality of character strings of interest to be searched out.

Figure 6:
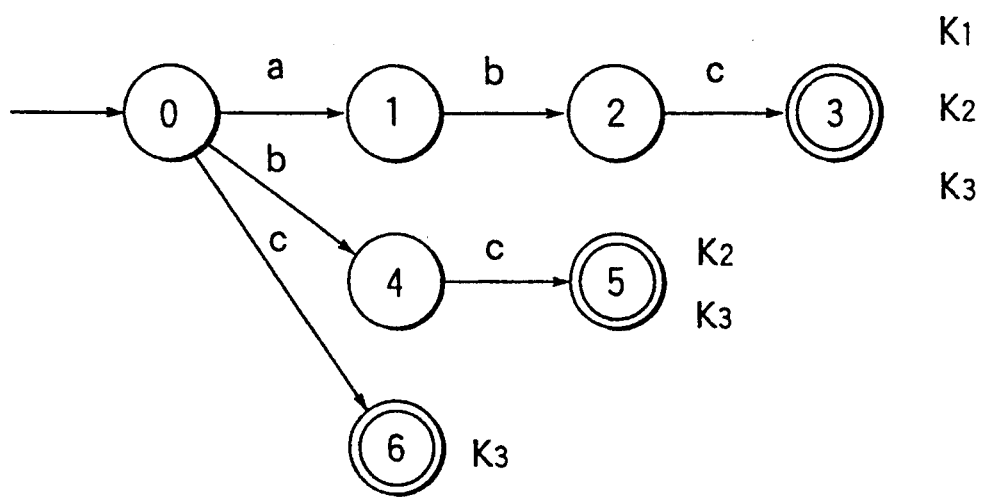
FIG. 6 is a diagram showing an example of setting of a character string of interest in which a plurality of character strings of interest are detected for the same input character string.

FIG. 6 is a diagram showing the concurrent detection of the plurality of character strings of interest to be searched for. An automaton as shown in FIG. 6 is generated in the case where three kinds of character strings of interest (K: abc, K: bc, K: c) are set. When a character string to be searched including "abc" is inputted, all of the character strings of interest to be searched for will be detected at the state 3.

The execution time of each processing step is roughly estimated as follows.

Step ①: Since one input from the character string 101 to be searched (or the input of characters which correspond in number to the bus width) is concerned, the step ① requires an execution time corresponding to at least one memory access.

Step ②: The execution time of the step ② in which the collation for the partial character strings by the parallel comparator 106 is executed but there is no input/output from/to the exterior of the chip, corresponds to a delay time of a logic gate circuit used.

Step ③: The step ③ requires an execution time corresponding to the sum of a delay time of a logic gate circuit corresponding to the automaton executing unit 104 and a time for access to the state transition table 110 for a current state code stored in the state code queue 109.

Step ④: In the step ④, the result 111 of search is outputted each time the character string of interest is detected. The execution time of the step ④ is determined corresponding to the number of times of access to the output buffer 105 per one output of the result 111 of search which number is determined depending on the number of times by which the total number of bits of the result 111 of search is increased as compared with the bit size of the data transfer bus. In actual, the execution time of the step ④ can be regarded as corresponding to at longest several times of memory access.

The above steps ① to ④ are executed by a pipeline processing as shown in FIG. 5. The abscissa of FIG. 5 represents the lapse of time and the ordinate thereof represents the input of character codes (the first character code, the second character code, the third character code, - - - ). The steps ② and ③ for the i-th input character code and the step ① for the (i+1)th input character code are executed in parallel with each other in every cycle. However, it does not always follow that the step ③ is always executed.

If the depth of each of the input buffer 102 and the character code buffer 103 in FIG. 4 is increased, the proportion of the parallel execution of the input and the processing can be increased since it is not necessary to stop the input of the character string to be searched (or the DATA IN step ①) even if the processing cycle of the automaton expands. As a result, it becomes possible to improve the overall processing speed.

The parallel operation in the present embodiment minimizes a time wastefully consumed in taking the character string 101 to be searched into the input buffer 102 or a time of a wait for taking-in of the next data because of the incompletion of the processing by the automaton. Therefore, it is possible to realize the improvement of the speed of the whole of the search processing.

Figure 7:
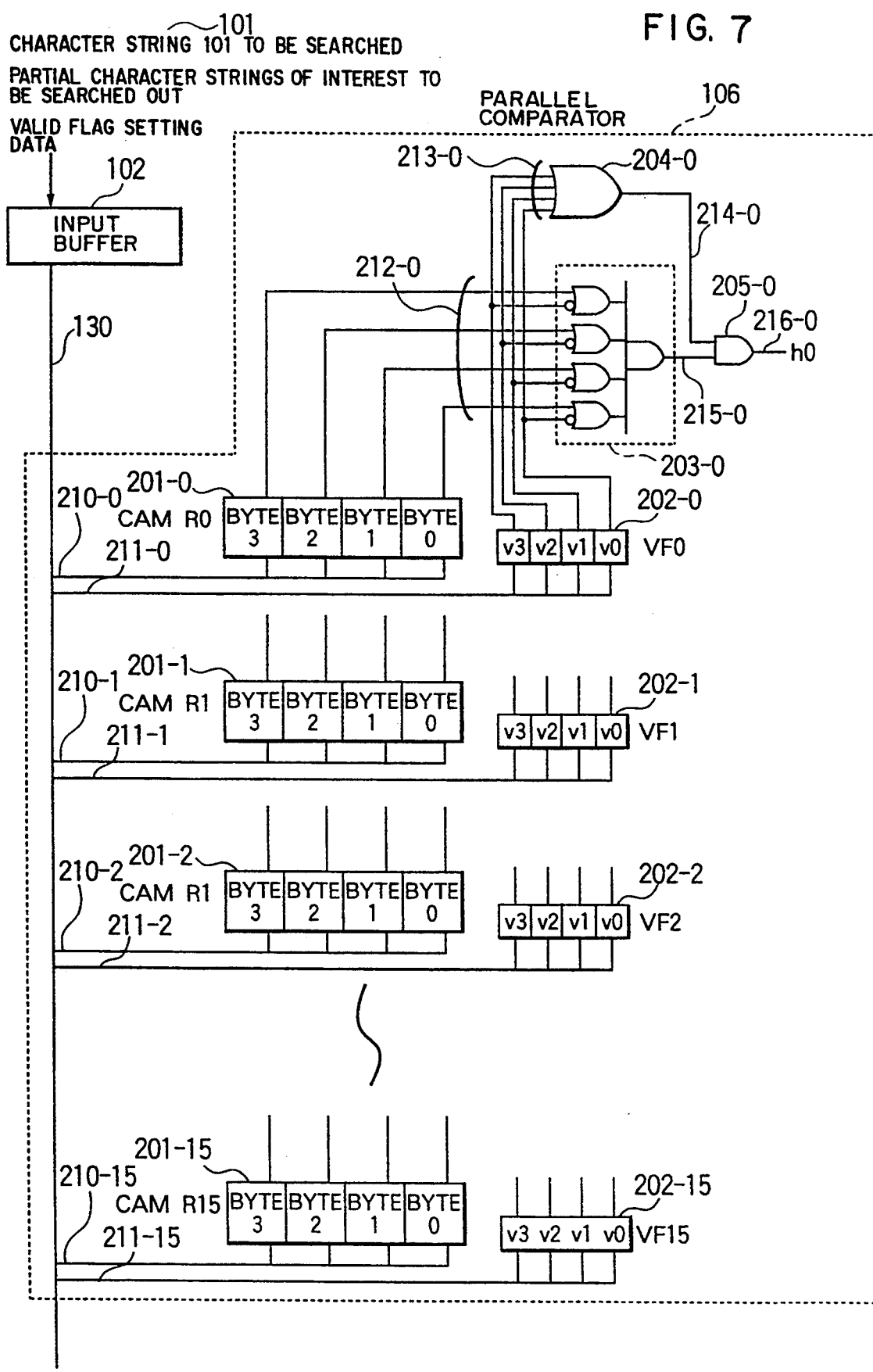
FIG. 7 is a block diagram of an embodiment of a parallel comparator using a content addressable memory (CAM)

FIG. 7 is a block diagram showing an embodiment of a parallel comparator in which an associative memory having an associating function or a content addressable memory (CAM) is used.

In the present embodiment, one word is provided by a four-byte CAM register and the whole is composed of 16 words (CAM registers R0 to R15).

In the present embodiment, it is possible not only to selectively transfer a character string taken in the input buffer 102 to any CAM register in order to set it as a partial character string (set mode) but also to concurrently transfer a taken-in character string 101 to be searched to all of the CAM registers in order to make a parallel collation thereof with a plurality of partial character strings (compare mode).

In the present embodiment, the individual partial character string comparing circuits have the same construction. Therefore, the following explanation will also be appropriate for other such circuits.

The partial character string comparing circuit includes a CAM register (R0) 201-0 which stores the first partial character string of interest set in the parallel comparator 106. Also included are a valid flag register (VF0) 202-0 indicates the validity for each byte of data set in the CAM register (R0) 201-0, and a logic circuit portion 203-0 outputs the result of comparative collation for each byte in the CAM register (R0) 201-0 as being "valid" in a case where the corresponding bit of the valid flag register (VF0) 202-0 is set (or is "1"). The logic circuit also outputs the result of comparative collation for each byte in the CAM register (R0) 201-0 as being "invalid" or always outputs "1" in the case where the valid flag register (VF0) 202-0 is reset (or is "0") or which combines the results of comparative collation for the respective bytes in the CAM register (R0) 201.0. The logic circuit also includes a logic circuit portion 204-0 detects the invalidity of all in the partial character string in the case where it is designated by the valid flag register (VF0) 202-0, a logic circuit portion 205-0 which obtains the final result of comparative collation of the partial character string by combining the results 214-0 and 215-0 of the logic circuit portions 203-0 and 204-0, and a coincidence signal line (h0) 216-0 which provides the output of the logic circuit portion 205-0. Sixteen hardware arrangement, each having the above-mentioned construction for one word are combined to construct the whole of the parallel comparator 106.

The byte construction and word construction of the CAM register and the construction of the valid flag register in the present embodiment can be easily extended and may be arbitrary. Access to any one of the CAM registers (R0~R15) 202 can be made through the input buffer 102. Also, there may be employed a construction in which data buses for the exclusive use of the individual registers are provided.

In operation, partial character strings and the contents of valid flag registers 202 necessary for a search are set first of all. Thereafter, an unnecessary CAM register(s) including no partial character string set therein is invalidated by resetting the associated valid flag register(s) 202. Thereby, a comparative collation processing for an unnecessary portion always results in mismatching so that a coincidence signal is fixed to a disable condition.

After the above initialization processing, a character string 101 to be searched is transferred to all of the CAM registers 201 concurrently through the input buffer 102. Each CAM register 201 is in a compare mode and collates the transferred input character code with the preset partial character string. The collation is made bit by bit and the results of collation are combined by producing a logical product for every byte. Namely, a complete coincidence is detected in units of one alphanumeric character. The results of comparative collation for the respective bytes and the corresponding bits of the valid flag register 202 are inputted to the logic circuit portion 203 which combines the results of comparison for the respective bytes. As regards a byte including a "don't care" character set by the valid flag register 202 in a partial character string, a value indicative of a coincidence is always outputted. In the logic circuit portion 203, a logical product is produced or the result 215 of comparison for one word of the partial character string is obtained.

If a logic circuit is constructed by only the logic circuit portion 203, the collation shows a coincidence for any input character code when all of the four bytes are designated to be invalid. Therefore, in the case where all of the bits of the valid flag register 202 in the same word are reset, it is required that a coincidence signal is always disabled. The logic circuit portions 204 and 205 in FIG. 7 are provided for that purpose.

As apparent from the foregoing, the present embodiment makes it possible not only to perform a comparative collation processing for a plurality of partial character strings in parallel with each other and at a high speed but also to set a "don't care" character at any position in a partial character string. Also, in the case where a partial character string has a word length shorter than one word of the parallel comparator 106, it becomes possible to set a partial character string of any length in units of one byte by setting a "don't care" character in an unnecessary portion or resetting the bit of the valid flag register 202 corresponding to the unnecessary portion. This provides an effect that a flexible processing for parallel comparative collation can he realized. Further, there is an effect that the nullfication or restortion of the previously set partial character string can be effected at a high speed through only the operation of the valid flag register 202.

Figure 8:
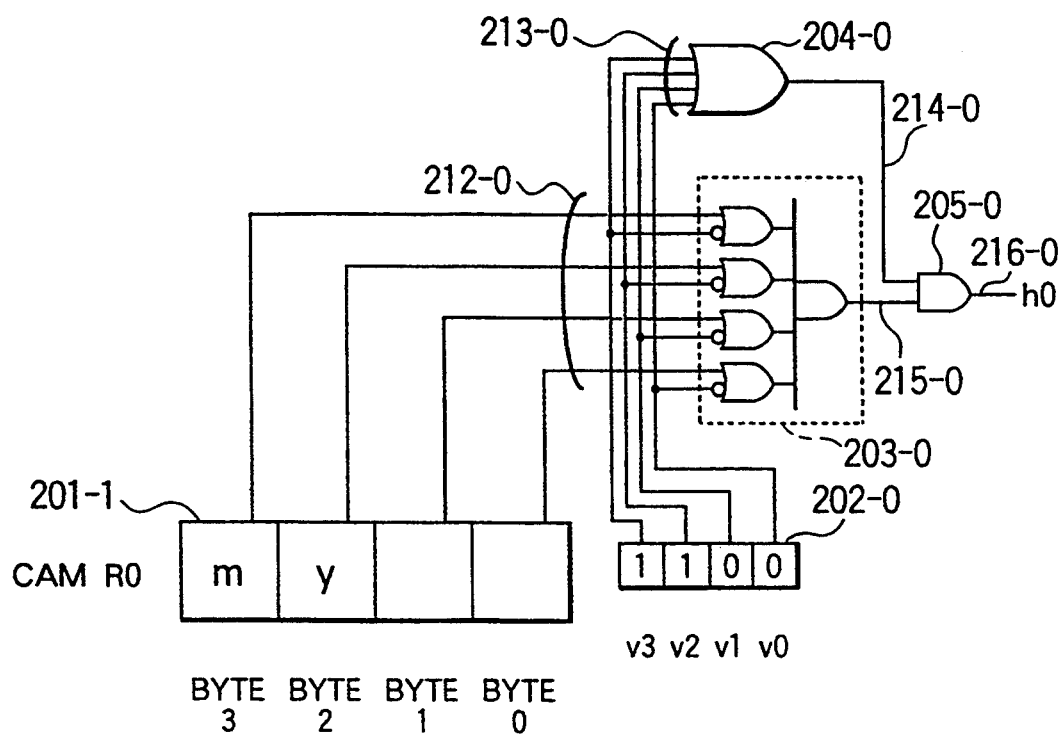
FIG. 8 is a block diagram showing an example in which a partial character string of interest is set to the parallel comparator using the CAM.

FIG. 8 is a block diagram for explaining an example of the setting of a partial character string to the CAM register and the valid flag register shown in FIG. 7. In the shown example, a character string of interest of "my" is set.

In the case where the character string of interest of "my" is to be set, valid flag bits v3, v2, v1 and v0 are set to "1", "1", "0" and "0" respectively so that "my" is set to bytes 3 and 2 and the blanks of bytes 1 and 0 are invalidated. Thereby, the result of collation for each of the bytes 1 and 0 in which no character string of interest to be searched out are set always gives "1" and hence the output of the coincidence signal line is defined by only the result of collation for "my" in the bytes 3 and 2.

Figure 9:
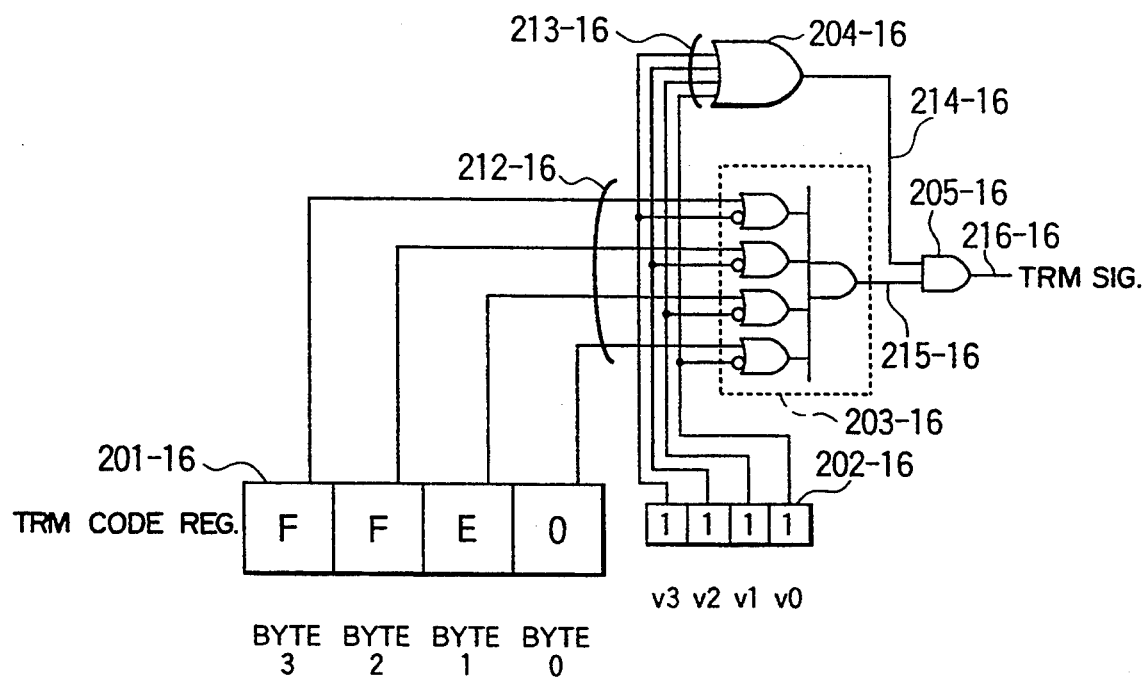
FIG. 9 is a block diagram showing an example in which a termination code is set to the parallel comparator using the CAM.

FIG. 9 is a block diagram showing an embodiment of termination code detecting means in the parallel comparator using the CAM.

The construction of the present embodiment, the manner of setting of a termination code and the operation of the present embodiment are similar to those of the parallel comparator. However, in the termination code detecting means, a termination signal (trm sig.) 216-16 corresponding to the coincidence signal in the parallel comparator is transferred to a control logic block.

In the example shown in FIG. 9, a termination code of "FFE0" is set. In the case where the number of effective characters of this termination code is to be changed or the termination code is not used at all, the purpose can be attained by changing the setting of a valid flag register 202-16.

Figure 10:
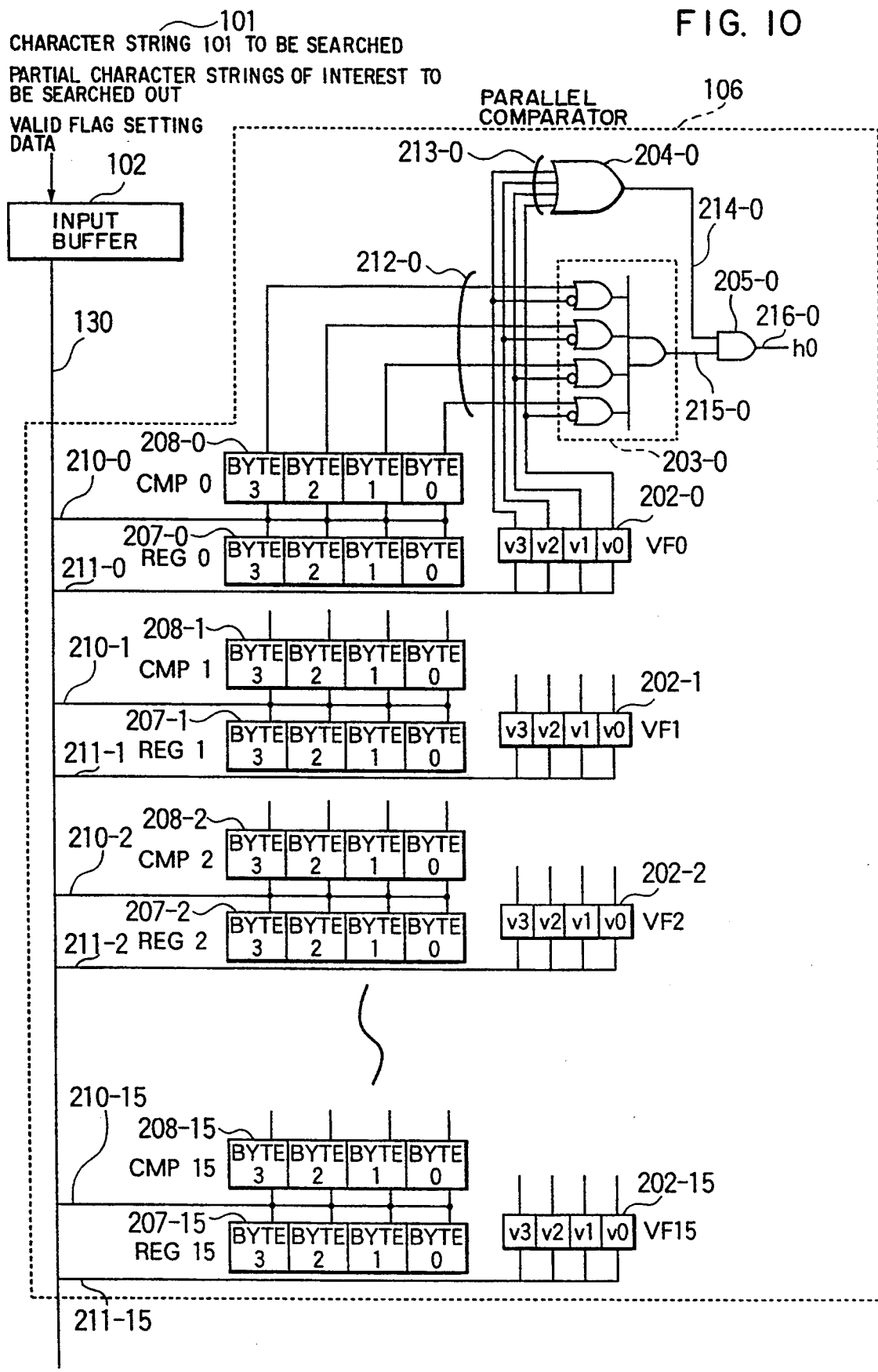
FIG. 10 is a block diagram of an embodiment of a parallel comparator using registers and comparators.

FIG. 10 is a block diagram showing a second embodiment of the parallel comparator in which registers 207 and comparing circuits 208 are used in place of the CAM registers.

In the present embodiment, after partial character strings taken in the input buffer 102 have been stored in the registers 207 once in a set mode, data are sent from the registers 207 and the input buffer 102 to the comparing circuits 208 in a compare mode to make a comparative collation. The operation of comparative collation in each comparing circuit 208 is made in byte parallel and the results 212 of comparative collation for the respective bytes are sent to a logic circuit portion 203 which combines the results of collation.

The operation of the valid flag register 202, the operation of the logic circuit portion 203 for combining the results of collation for the respective bytes in accordance with the output signal of the valid flag register 202, the operation of a logic circuit portion 204 for detecting the designation of the invalidity of all of the bytes of the partial character string and the operation of a logic circuit 205 for obtaining the final result of collation for the partial character string are similar to those in the embodiment shown in FIG. 7. Namely, the embodiment shown in FIG. 10, too, provides an effect that a partial character string having an arbitrary length can be set and a "don't care" character having a variable length can be set in a partial character string, thereby making it possible to realize a flexible processing for parallel comparative collation.

Figure 11:
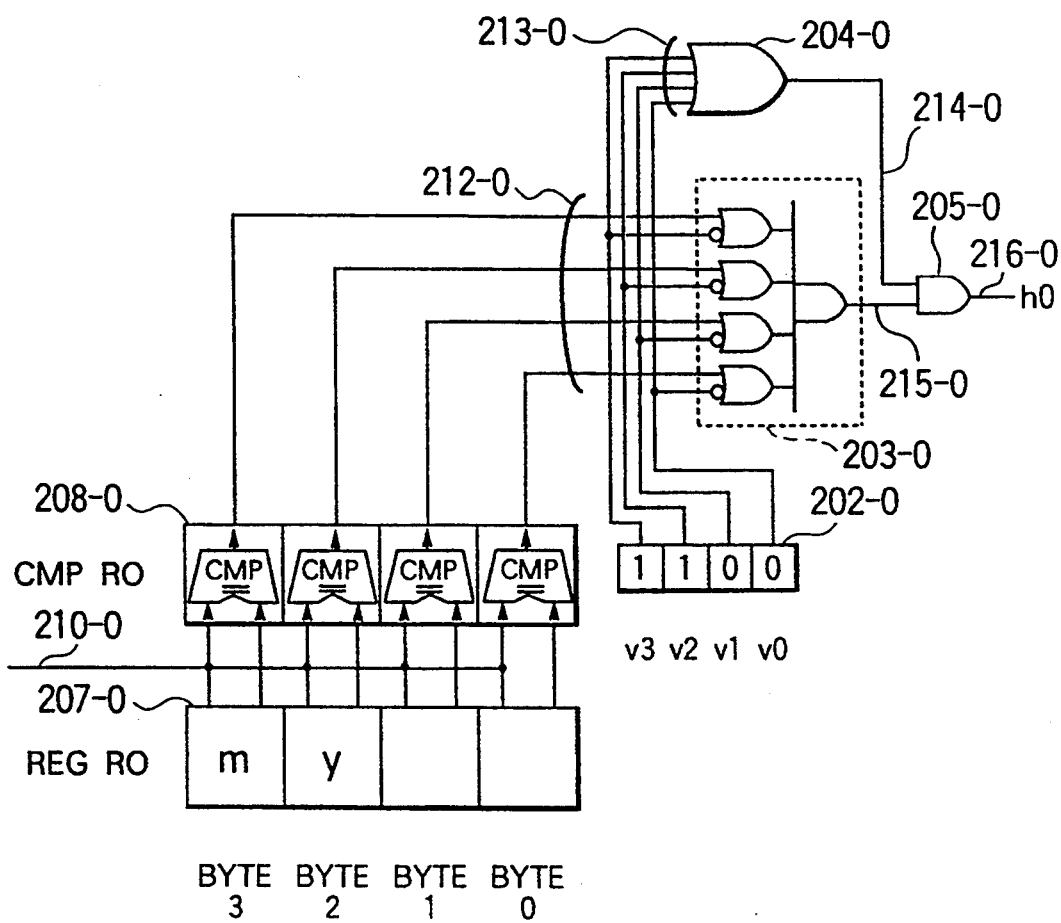
FIG. 11 is a block diagram showing an example in which a partial character string of interest is set to the parallel comparator using the registers and the comparators.

FIG. 11 is a block diagram showing an example of the setting of a partial character string to the register 207 and the valid flag resister 202. In the shown example, a character string of interest of "my" is set, like the example shown in FIG. 8.

In the case where the character string of interest of "my" is to be set, valid flag bits v3, v2, v1 and v0 are set to "1", "1", "0" and "0" respectively so that "my" is set to bytes 3 and 2 and the blanks of bytes 1 and 0 are invalidated. Thereby, the result of collation for each of the bytes 1 and 0 in which no character string of interest to be searched out is set always gives "1" and hence the output of the coincidence signal line is defined by only the result of collation for "my" in the bytes 3 and 2.

Figure 12:
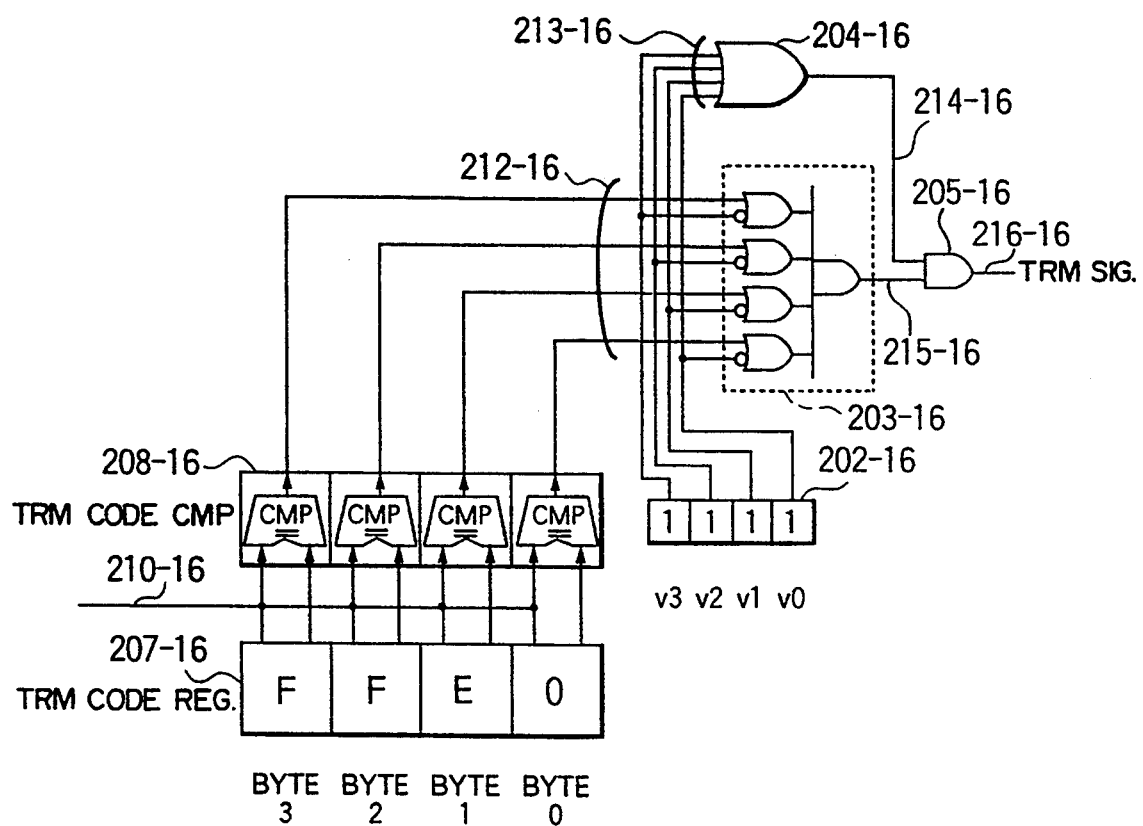
FIG. 12 is a block diagram showing an example in which a termination code is set to the parallel comparator using the registers and the comparators.

FIG. 12 is a block diagram showing an embodiment of termination code detecting means in the parallel comparator using the registers and the comparing circuits.

The construction of the present embodiment, the manner of setting of a termination code and the operation of the present embodiment are similar to those of the parallel comparator using the registers and the comparing circuits. However, in the termination code detecting means, not a coincidence signal in the parallel comparator but a termination signal (trm sig.) 216-16 is transferred to a control logic block.

In the example shown in FIG. 12, a termination code of "FFE0" is set. In the case where the number of effective characters of this termination code is to be changed or the termination code is not used at all, the purpose can be attained by changing the setting of a valid flag register 202-16.

Figure 13:
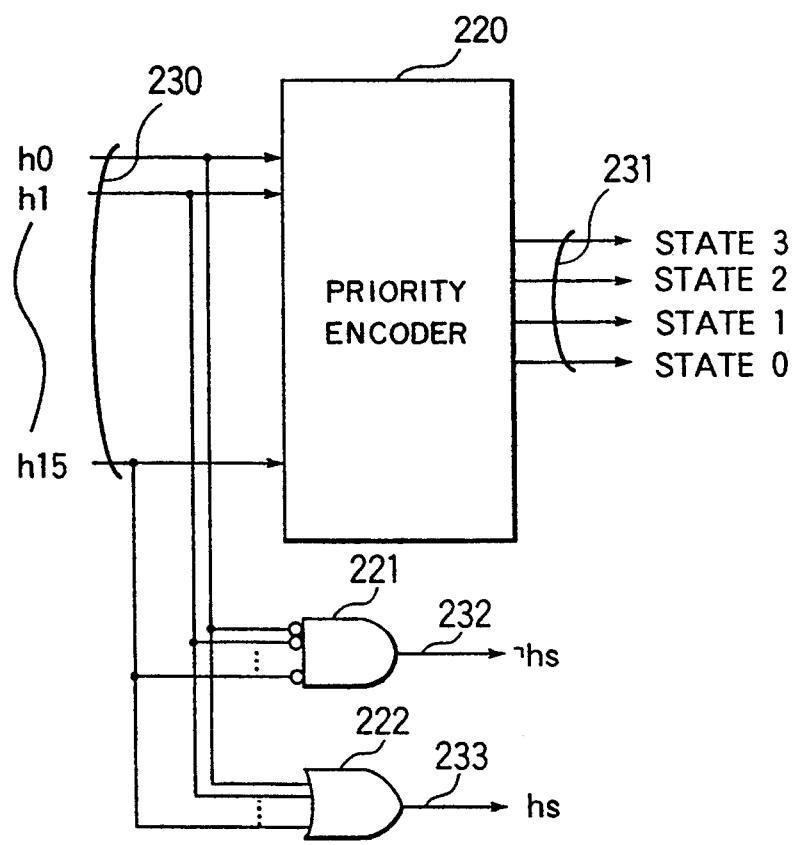
FIG. 13 is a block diagram of an embodiment of a code converter.

FIG. 13 is a block diagram of an embodiment of the code converter 107.

The present embodiment is composed of a priority encoder 220 for receiving coincidence signals (h0~h15) 230 from the parallel comparator 106 (see FIG. 7 or 10) as input signals to convert them into state codes 231, a logic circuit portion 221 for receiving the coincidence signals 230 as input signals to detect whether or not all of the coincidence signals are disabled, that is, none of the partial character strings of interest to be searched out are found out in the character string to be searched, and a logic circuit portion 222 for receiving the coincidence signals 230 as input signals to detect whether or not at least one of the coincidence signals 230 is enabled or at least one of the partial character strings of interest to be searched for is found out in the character string to be searched.

The priority encoder 220 is an encoder for encoding the coincidence signals (h0~h15) 230 while allotting a priority order to them. In the case where a plurality of coincidence signals take enable conditions, as in the example shown in FIG. 6, the priority encoder 220 encodes or converts the coincidence signals one by one in accordance with a priority order into a state code 231. The state code 231 is stored in the state code queue 109 (see FIG. 4) once and is then sent to the finite automaton executing unit 104 (see FIG. 4) in which a comparative collation with the latter or remaining portion of the character string of interest to be searched for is performed.

The outputs 232 and 233 of the logic portions 221 and 222 which monitor the conditions 230 of concurrent detection are used for judgement of a condition on transfer of the state code 231 to the selector 108. Namely, when a hit signal 233 indicating the detection of at least one of the partial character strings is "1", the state code 231 is transferred to the selector 108. The logical product of the hit signal 232 and a non-hit signal 233 indicating the detection of none of the partial character strings becomes "1" in each cycle (and is reset upon termination of each cycle) and is therefore used as a timing signal to perform a synchronous control of data transfer.

Figure 14:
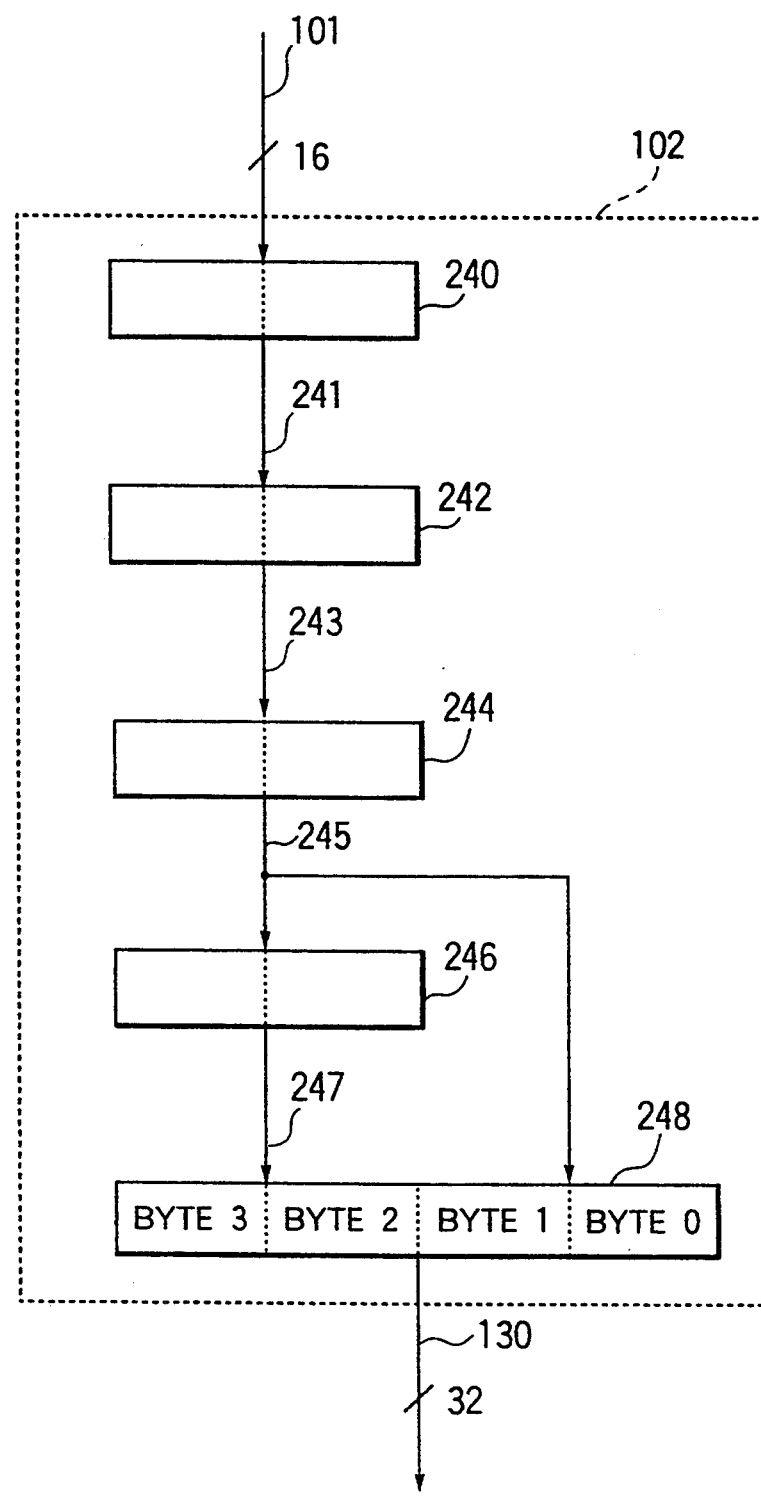
FIG. 14 is a block diagram of a first embodiment of an input buffer.

FIG. 14 is a block diagram of a first embodiment of the input buffer 102.

The present embodiment is composed of two stages of registers 240 and 242 for buffering, two stages of registers 244 and 246 for data width conversion, a register 248 for storage of data after conversion, and data paths 241, 243, 245 and 247 between the registers. If the capacity of the input buffer 102 is increased by additionally inserting a register(s) between the registers 240 and 242 for buffering to increase the number of stages, it is possible to enhance the effect of buffering with the input speed of the character string 101 to be searched being kept at the highest possible value.

New data are successively supplied from the registers 244 and 246 for data width conversion to the lower level portion (byte 1 and byte 0) and the upper level portion (byte 3 and byte 2) of the register 248 for storage of data after conversion through the data paths 245 and 247. As a result, a character string 101 to be searched which is inputted in units of two bytes, seems to move from the lower level portion of the register 248 for storage of data after conversion toward the upper level portion thereof in units of two bytes. In other words, in the register 248 for storage of data after conversion, the text stream shifted in units of two bytes is cut out or extracted by means of a four-byte window. The four extracted bytes are transferred to the parallel comparator 106 in which they are compared with a partial character string. Thereby, the character string to be searched which is inputted in units of two bytes, can be collated with the partial character string of four bytes in each cycle. Since the collation with the character string of four bytes involves a more strict matching condition as compared with the collation with a character string of two bytes, the probability with which the coincidence signal is outputted in an enable condition as the result of comparison processing is lowered, thereby reducing the frequency of access of the finite automaton executing unit 104 to the state transition table 110.

Figure 15:
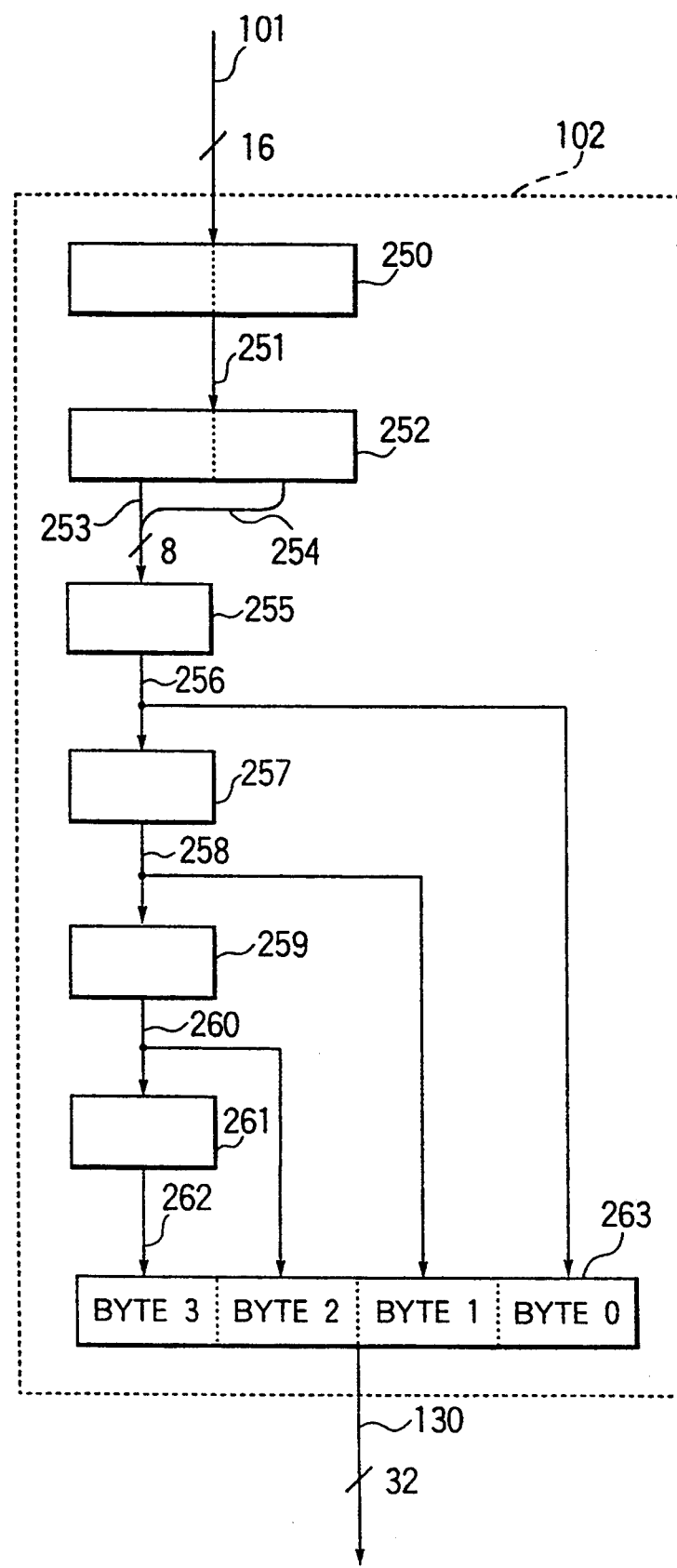
FIG. 15 is a block diagram of a second embodiment of the input buffer.

FIG. 15 is a block diagram of a second embodiment of the input buffer 102.

The present embodiment is composed of two stages of registers 250 and 252 for buffering, four stages of registers 255, 257, 259 and 261 for data width conversion, a register 263 for storage of data after conversion, and data paths 251, 253, 254, 258, 260 and 262 between the registers. As has been mentioned in conjunction with the embodiment shown in FIG. 14, a registers(s) may be additionally inserted between the registers 250 and 252 for buffering to increase the number of stages in order to enhance the buffering effect.

New data are always supplied from the registers 255, 257, 259 and 261 for data width conversion to the lower level portion (byte 1 and byte 0) and the upper level portion (byte 3 and byte 2) of the register 263 for storage of data after conversion through the data paths 256, 258, 260 and 262. As a result, a character string 101 to be searched, which is inputted in units of two bytes, seems to move from the lower level portion of the register 263 for storage of data after conversion toward the upper level portion thereof in units of one byte. Namely, in the register 263 for storage of data after conversion, the text stream shifted in units of one byte is cut out or extracted by means of a four-byte window. The four extracted bytes are transferred to the parallel comparator 106 in which they are compared with a partial character string. Like the embodiment shown in FIG. 14, thereby, the frequency of access of the finite automaton executing unit 104 to the state transition table 110 is reduced.

Figure 16:
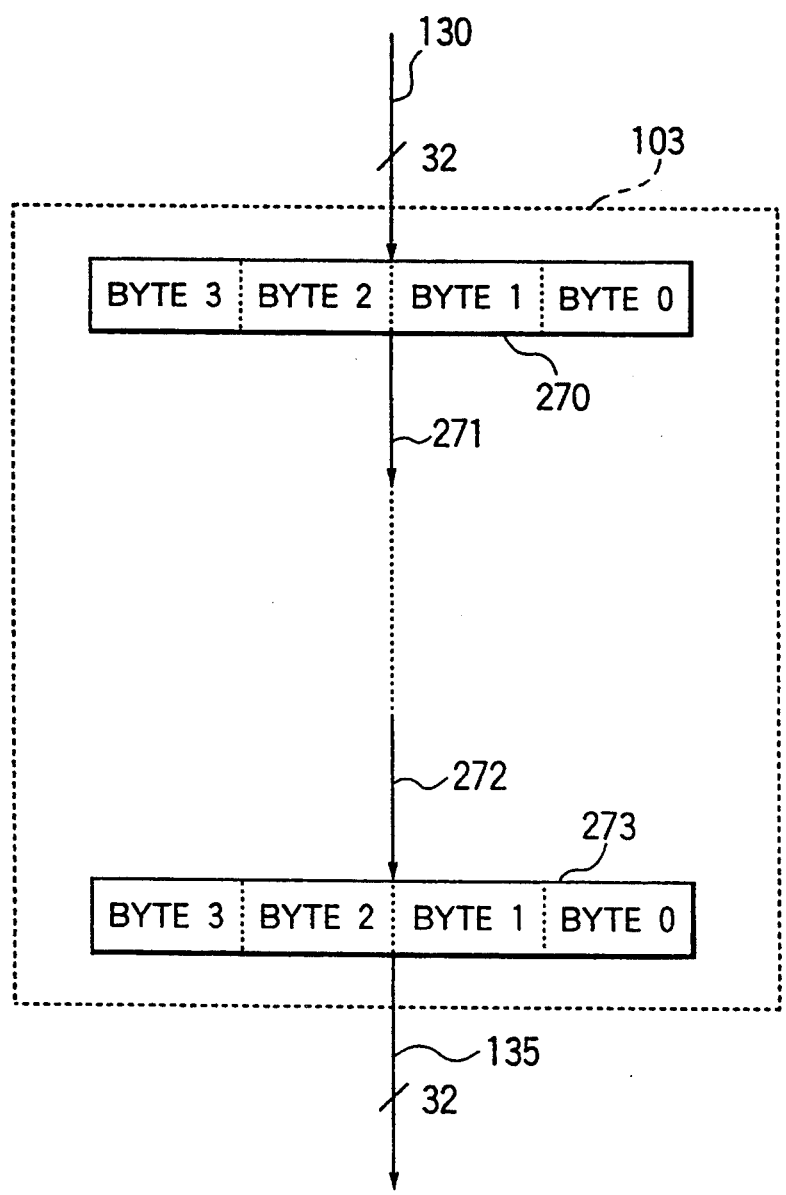
FIG. 16 is a block diagram of an embodiment of a character code buffer.

FIG. 16 is a block diagram of an embodiment of the character code buffer 103.

The present embodiment is composed of two stages of registers 270 and 273 for buffering and data paths 271 and 272 between the registers. As has been mentioned in conjunction with the embodiments shown in FIGS. 14 and 15, a register(s) may be additionally inserted between the registers 270 and 273 to increase the number of stages in order to enhance the bufferring effect.

In the present invention, prior to a search processing, partial character strings of character strings of interest to be searched for are set into the parallel comparator 106 and control information for controlling the state transition of an automaton developed from the character strings of interest to be searched for is set into the state transition table 110. A method of setting the partial character strings into the parallel comparator 106 will now be explained taking by way of example the case where two leading characters of the character string of interest to be searched for is set as the partial character string.

Figures 17, 18:
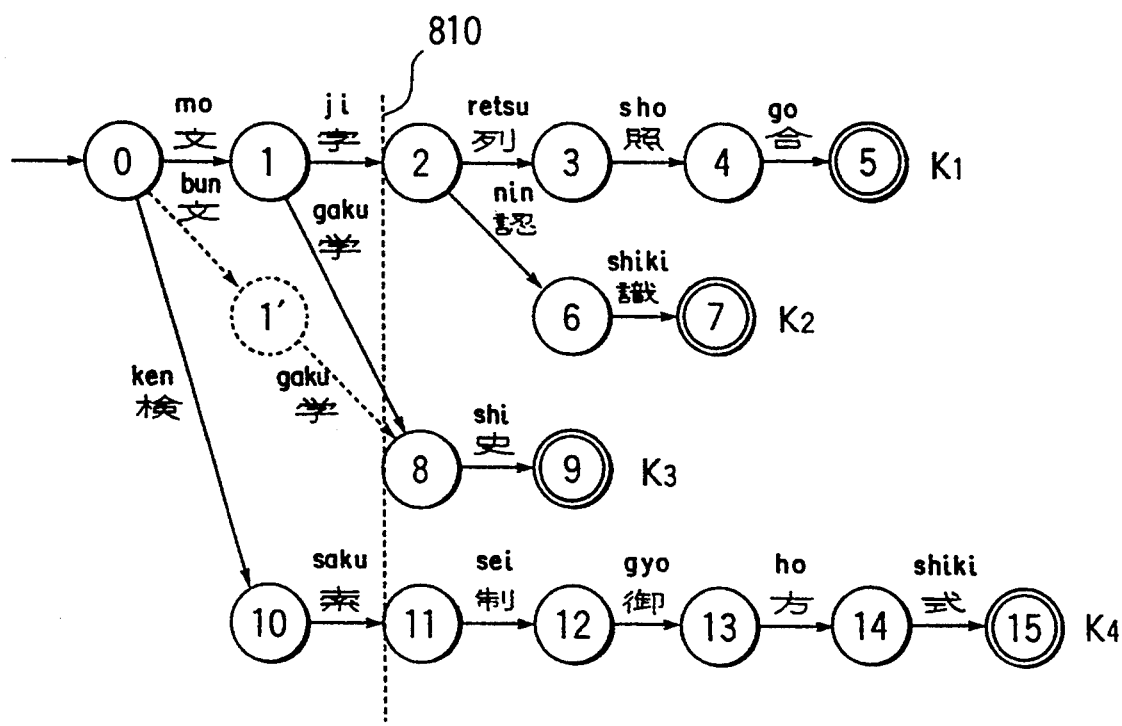
FIG. 17 shows examples of those portions of character strings of interest which are to be subjected to a leading collation processing.
FIG. 18 is a diagram showing an automaton for making a search for the character strings of interest shown in FIG. 17.

As shown in FIG. 17, four words of $K_1$: "mojiretsu-shogo" ("    " in Japanese and "character string collation" in English), $K_2$: "mojininshiki" ("    " in Japanese and "character recognition" in English), $K_3$: "bungaku-shi" ("    " "history of literature" in English) and $K_4$: "kensakuseigyohoshiki" ("    " in Japanese and "search control system" in English) are given as character strings of interest to be searched for. In this example, since two leading characters (in Japanese) are used as a partial character string, the two characters enclosed by a rectangle in FIG. 17 are set into the parallel comparator 106. There may be the case where different character strings of interest have partial character strings thereof identical with each other as in "moji" of the words $K_1$ and $J_2$ shown in FIG. 17. In such a case, the identical partial character strings are set together as one partial character string into the parallel comparator 106. Since a collation processing for the remaining portion of the character string of interest to be searched for is performed by the finite automaton executing unit 104, this portion is set as a state code into the state transition table 110.

FIG. 18 is a diagram showing an automaton for searching the text for the four character strings of interest shown in FIG. 17.

In FIG. 18, a numbered circle represents each state and a numeral written in the circle represents a state number. An initial state is a state 0 and a double circle is a state indicating the detection of a character string of interest to be searched for. An arrow represents a state transition and the state transition occurs when a character described around the arrow is inputted. In the case where the other character is inputted or a state of destination for transition is not described as in the state represented by the double circle, a transition to the initial state occurs. This is called fail.

A broken line 810 bisecting the automaton indicates the position of division of the automaton in the case where the two leading characters of the character strings of interest to be searched out are set into the parallel comparator. Accordingly, the transition until states 2, 8 and 11 is effected by the parallel comparator 106 and the subsequent transition is effected by the finite automaton executing unit 104 and the state transition table 110.

The latter portion of the automaton after division thereof can be regarded as the assembly of three automatons the initial states of which are the states 2, 8 and 11, respectively. Into the parallel comparator 106 are set partial character strings in which represent conditions of transition from the state 0 to the state 2, 8 and 11 and each of which is developed over two characters. Accordingly, a state transition in the case where "moji" (￥￥) is inputted is 0→1→2. A state transition in the case where "bungaku" (￥￥) is inputted is 0→1→8. Namely, the transition of 0→1 based on the input of "bun" ( ￥ ) is the same as that based on the input of "mo" ( ￥ ) but the transition based on the input of "gaku" ( ￥ ) causes a branch to the state 8. Since this state transition of 0→1→8 can be regarded as a state transition of 0→1→8 due to continuous appearance of two characters, as shown by dotted arrow in FIG. 18, the partial character string of "bungaku" (￥￥) is set into the parallel comparator independent of the partial character string of "moji" (￥￥).

Figure 19:
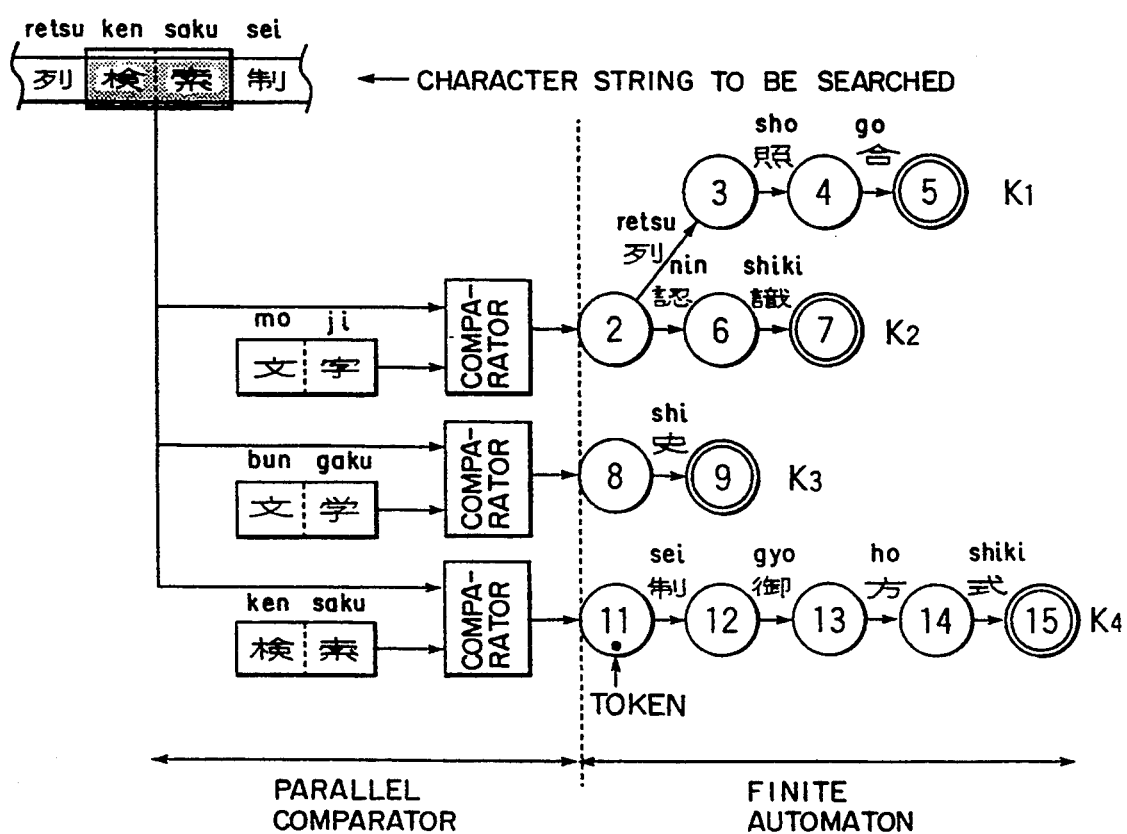
FIG. 19 is a block diagram of a parallel comparator and a posterior collation automaton for making a search for the character strings of interest shown in FIG. 17.

FIG. 19 is a conceptual diagram in which the automaton is shown in FIG. 18 is constructed by the parallel comparator 106 and an automaton generated for posterior collation.

In FIG. 19, a coincidence signal from the parallel comparator 106 turns into a token which fires an initial state of the automaton. Subsequently, a state transition occurs in accordance with the state transition table so that a processing for collation with the character string 101 to be searched is successively performed. Thus, the processing as a whole is equivalent to the execution of the automaton shown in FIG. 18.

Figure 20:
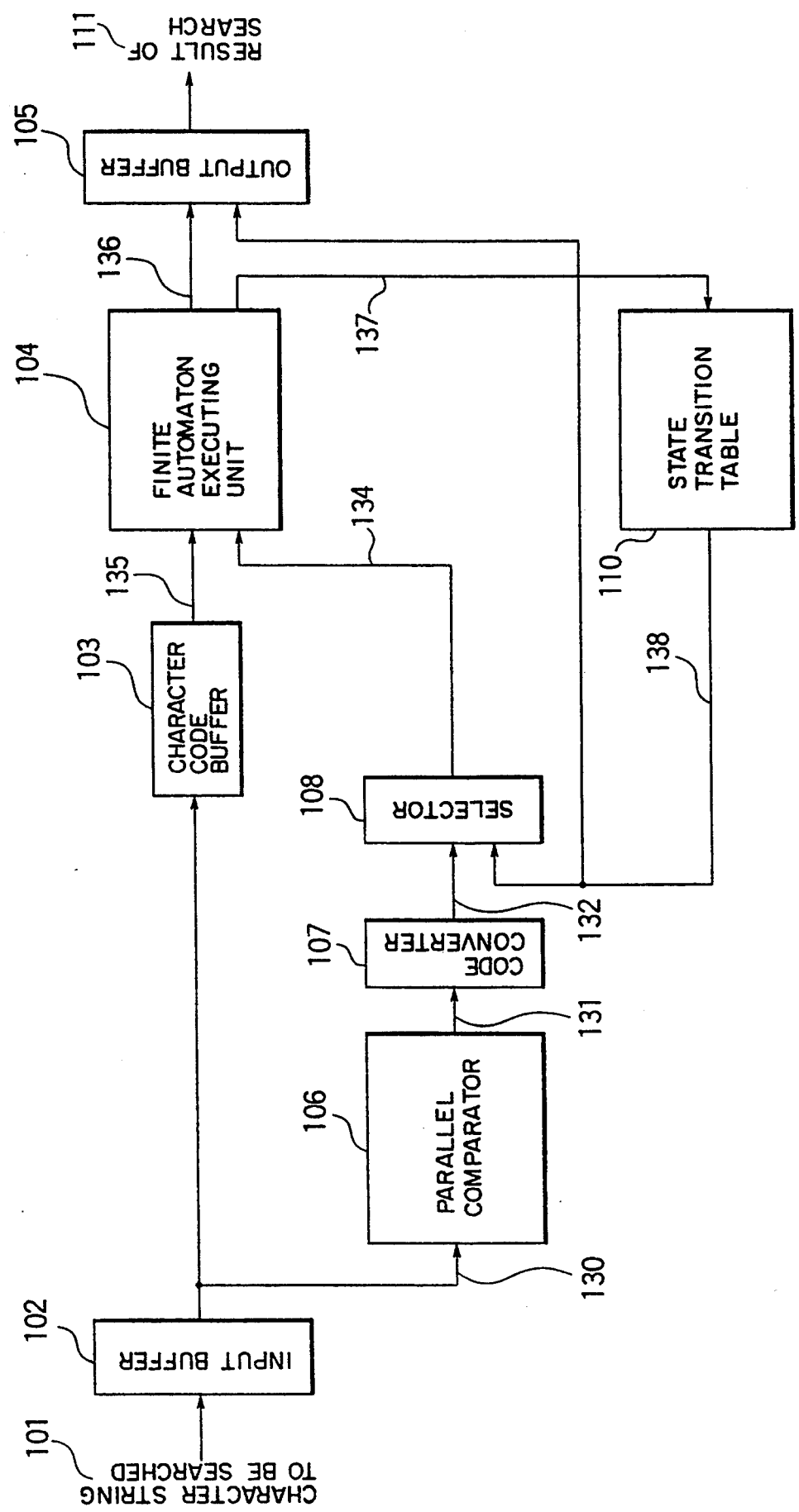
FIG. 20 is a block diagram showing the construction of a second embodiment of the present invention.

FIG. 20 is a block diagram of a second embodiment of the present invention in which the state code queue 109 included in the first embodiment shown in FIG. 4 is omitted.

The present embodiment is composed of an input buffer 102 which takes in a character string 101 to be searched, and a parallel comparator 106 which makes a collation or comparison of an input code 130 of the character string 101 to be searched and partial character strings of a plurality of character strings of interest with each other. Also included is a code converter 107 by which a coincidence signal 131 giving notice of detection of the coincidence with the partial character string of the character string of interest, as the result of comparison, is converted into a state code 132; an input selector 108 which selects a state code 134 to be inputted to a finite automaton executing unit 104, the finite automaton executing unit 104 which realizes an automaton operation, and a character code buffer 103 which stores a character code 135 to be inputted to the finite automaton executing unit 104. A state transition table 110 is also included in which control information of the state transition of the automaton is stored, and an output buffer 105 which holds the result 111 of search to be outputted therefrom.

The operation of the present embodiment is substantially similar to that of the first embodiment shown in FIG. 4. Accordingly, like the first embodiment, it is possible to make a processing by only the parallel comparator until the coincidence between the character string to be searched and the partial character string of the character string of interest to be searched for is detected, thereby making possible to perform the very great portion of a character string search processing without access to the state transition table and through only a comparison processing. Therefore, it becomes possible to improve the speed of the whole of the search processing.

In the present embodiment, the detection of a coincidence between the character string to be searched and the partial character string of the character string of interest to be searched for is first made by the parallel comparator 106. If the coincidence is detected, a coincidence signal 131 is converted into a state code 132 and is thereafter transferred to the finite automaton executing unit 104 through the selector 108. As for the subsequently input character string to be searched, the reference to the result of comparison by the parallel comparator 106 is not made and the automaton is executed by the finite automaton executing unit 104 and the state transition table 110. The selector 108 selects the next state code 138 from the state transition table 110 and transfers it to the finite automaton executing unit 104. The above operation is successively repeated for the input character codes to make a posterior collation. On the other hand, in the case where the character string of interest is searched for or the case where a fail causing the transition to the initial state occurs, the leading collation processing by the parallel comparator is performed again.

The execution of the above consecutive operation is inferior to the first embodiment with regard to the benefit of parallel processing. However, in the case where the rate of the leading collation processing to the whole is high, the effect of the improvement in the processing speed can be satisfactorily attained even in the present embodiment. Further, there is an effect that the state code queue 109 can be omitted and hence the amount of hardware necessary for controlling the state code queue 109 can be removed or reduced and an effect that the processing speed can be improved owing to the simplification of the control system. Though it is the most preferable that all of the constituent elements are integrated on the same semiconductor chip, it does not always follow because of a restriction by the circuit scale that it is possible to integrate all of the constituent elements on the same semiconductor. Therefore, a construction in which some of the constituent elements are integrated on another semiconductor chip may be considered. According to the present embodiment, since the control system is simple, it becomes easy to cut out the parallel comparator 106, the state transition table 110 and various buffers as individual chips and to construct the whole in a multi-chip configuration.

Figure 21:
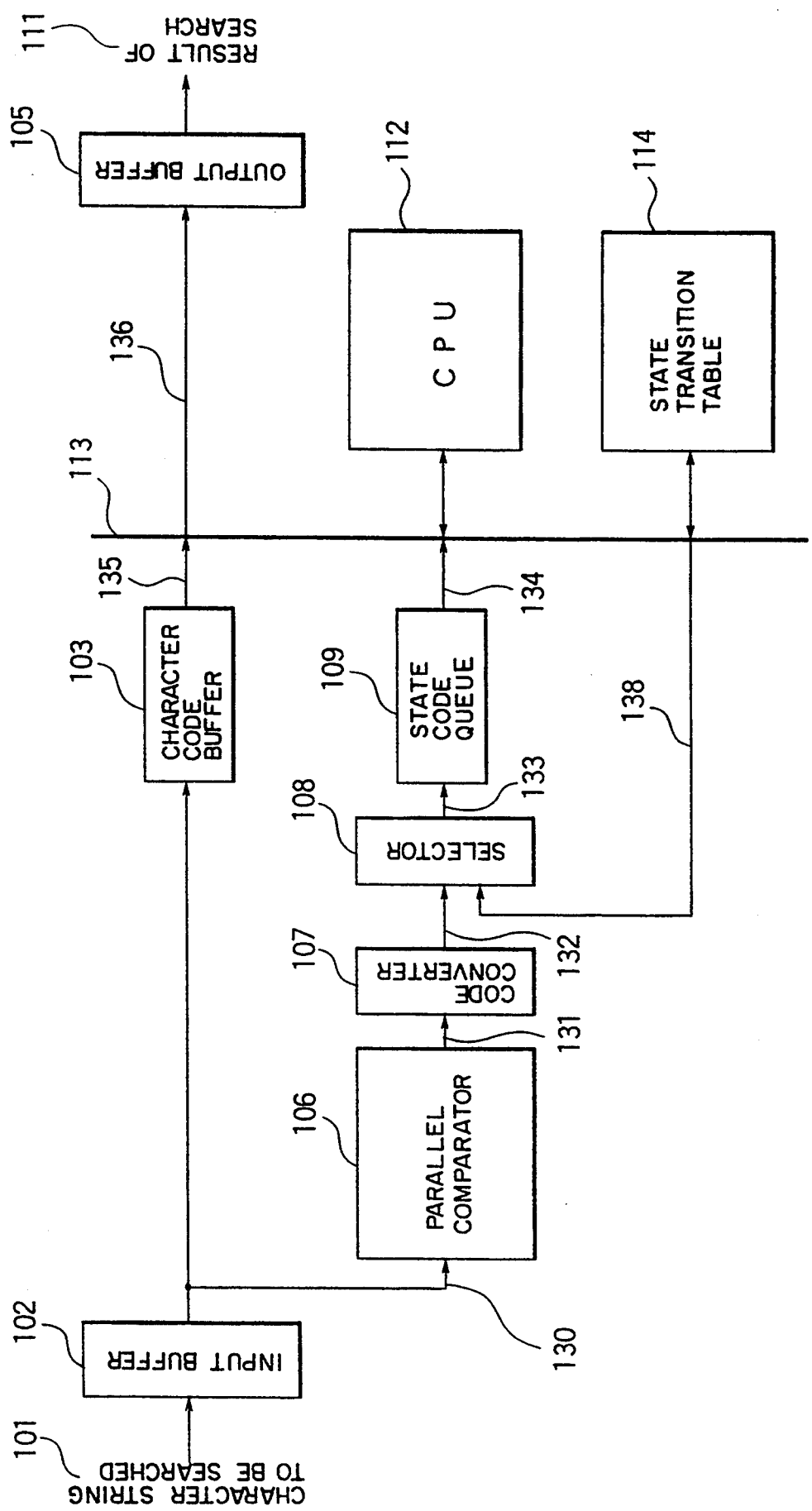
FIG. 21 is a block diagram showing the construction of a third embodiment of the present invention.

FIG. 21 is a block diagram of a third embodiment of the present invention in which a CPU is used as the finite automaton executing unit 104 in the first embodiment shown in FIG. 4.

The construction of the present embodiment including an input buffer 102, a character code buffer 103, a parallel comparator 106, a code converter 107, an input selector 108 and state code queue 109 is similar to that of the first embodiment. However, since a CPU 112 is used as automaton executing means, the outputs of the character code buffer 103 and the state code queue 109 are connected to an internal bus 113 and are connected to a data bus of the CPU 112 through the internal bus 113. Access to a state transition table 114 in which control information of an automaton executed by the CPU is stored is made by designating an address. As a result, the next state which is the content of the table is returned to the internal bus 109 and is stored into the state code queue 113 through the selector 108. At this time, if a state indicating the detection of a coincidence with the character string of interest to be searched out is obtained, the corresponding result 111 of search is written from the CPU 112 into an output buffer through the internal bus 113.

In the above processing, the control of the whole of the system, the control of the internal bus 113, and the setting of data into the parallel comparator 106 and the state transition table 114 are made by the CPU 112.

The CPU 112 is integrated together with the other constituent elements on the same semiconductor chip. However, because of a restriction imposed on the circuit scale or since there is the case where the existing CPU chip is used, there may be considered a construction in which the constituent elements including the CPU 112 are provided on different chips.

Like the first embodiment, the present embodiment provides an effect that the speed of the whole of a search processing can be improved since a comparison processing for the partial character strings by the parallel comparator is performed without access to the state transition table.

Figure 22:
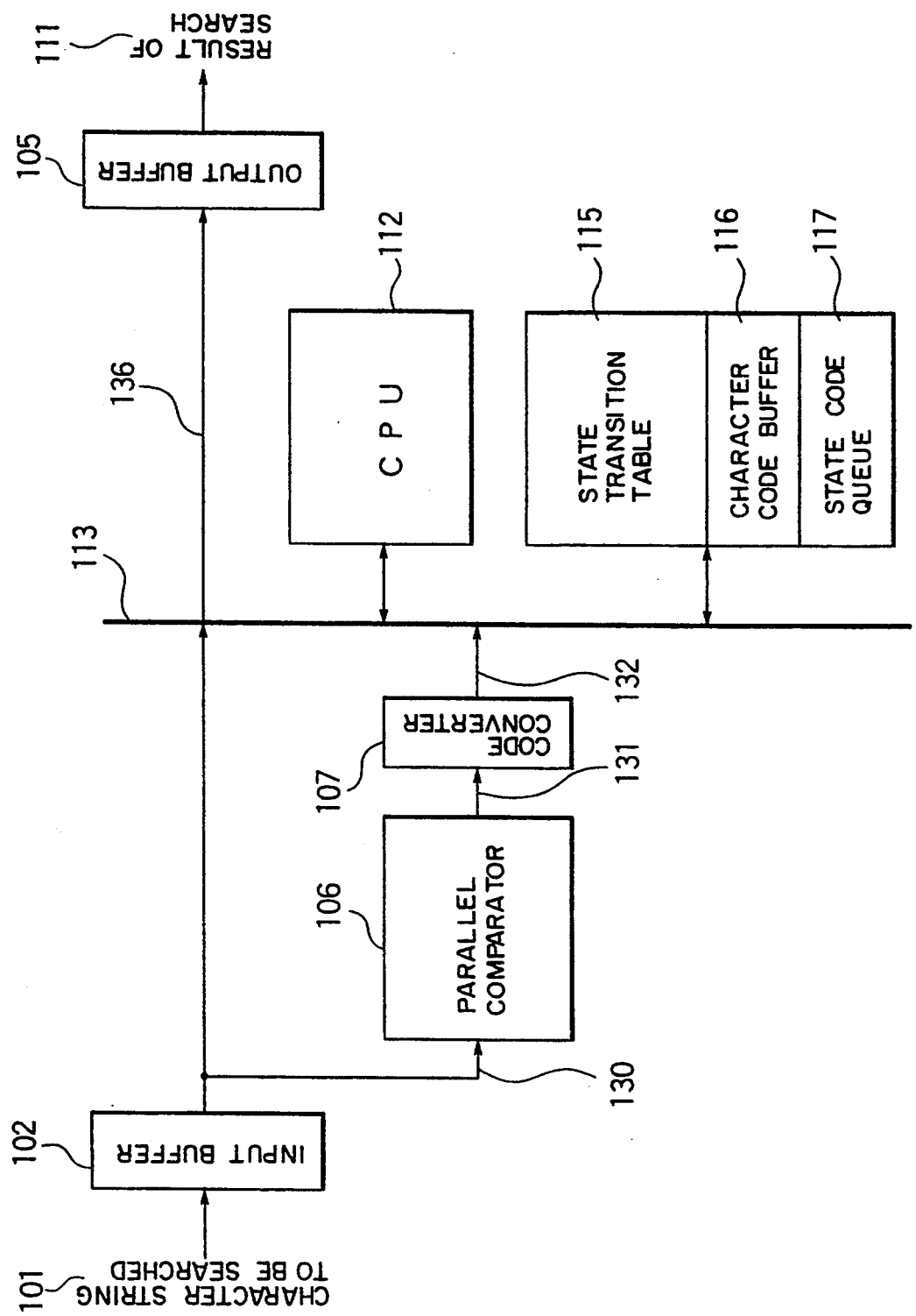
FIG. 22 is a block diagram showing the construction of a fourth embodiment of the present invention.

FIG. 22 is a block diagram of a fourth embodiment of the present invention in which the character code buffer 103, the state code queue 109 and the state transition table 114 in the third embodiment shown in FIG. 21 are allotted to a memory space which is under the control of the CPU 112.

The construction of the present embodiment including an input buffer 102, a parallel comparator 106 and a code converter 107 is similar to that in the third embodiment. However, each of the connection to the internal bus 113 through the character code buffer 103 and the connection to the internal bus 113 through the input selector 108 and the state code queue 109 in the third embodiment is replaced by the direct connection to the internal bus 113. A character code buffer 116 and a state code queue 117 are arranged as a part of the memory space including a state transition table 115. Access to the state transition table 115, the character code buffer 116 and the character code queue 117 can be made by address designation from the CPU 112 through the internal bus 113.

A consecutive processing for comparative collation of a character string 101 to be searched with character strings of interest to be searched for is performed in a manner similar to that in the third embodiment. The control of the internal bus 113 in that case is made by the CPU 112.

Like the first, second and third embodiments, the present embodiment provides an effect that the speed of the whole of a search processing can be improved since a comparison processing for partial character strings by the parallel comparator 106 is performed without access to the state transition table.

Figure 23:
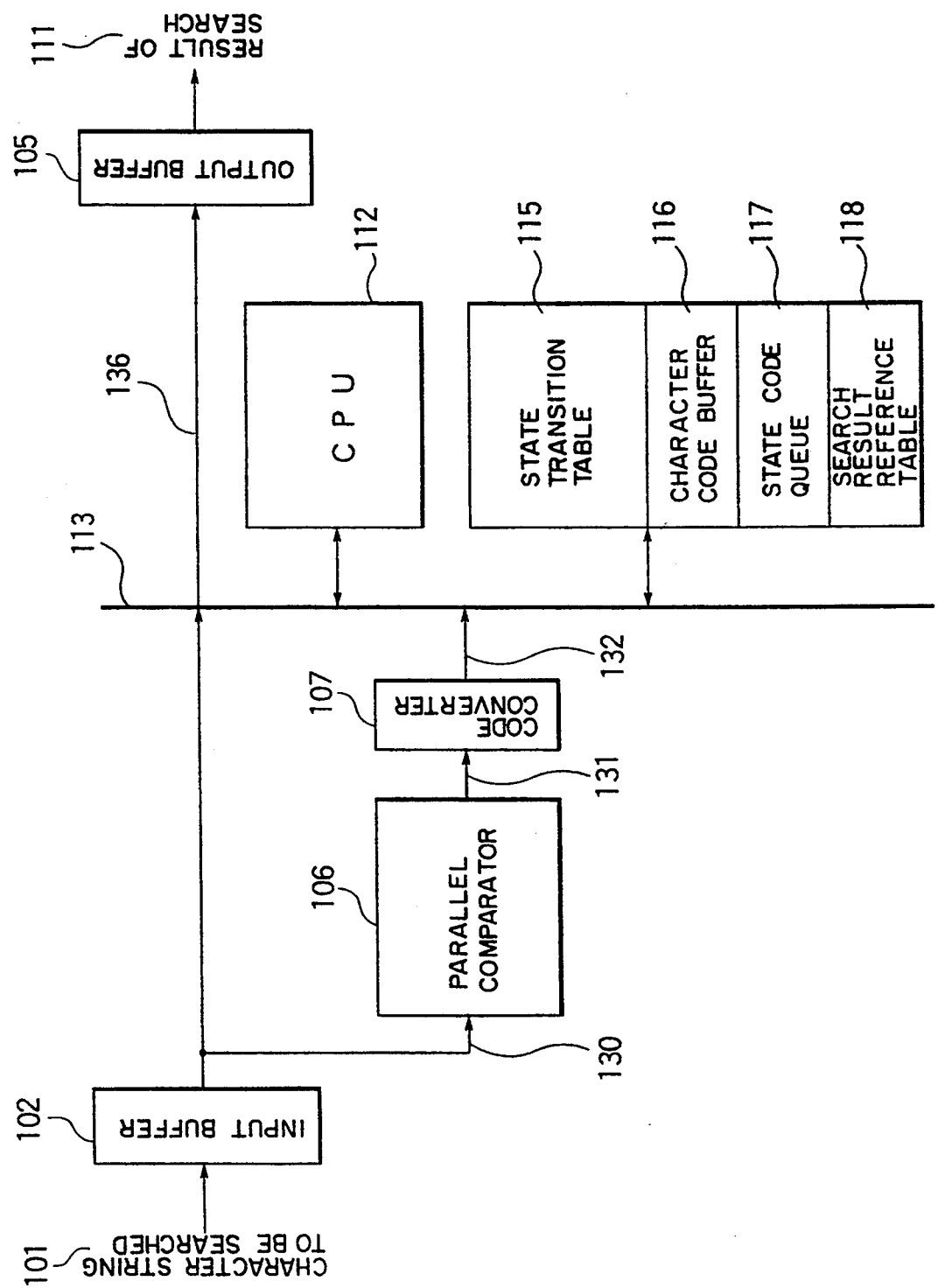
FIG. 23 is a block diagram showing the construction of a fifth embodiment of the present invention.

FIG. 23 is a block diagram of a fifth embodiment of the present invention in which a search result reference table 118 is added to the fourth embodiment shown in FIG. 22.

Like a state transition table 115, a character code buffer 116 and a state code queue 117, the search result reference stable 118 is arranged in a memory space which is under the control of a CPU 112, and access to the search result reference table 118 can be made by addressing from the CPU 112.

In the present embodiment, in the case where a state indicating the detection of a coincidence between a character string 101 to be searched and a character string of interest to be searched out is obtained by a comparative collation processing, information to be added as a part of the result 111 of search is acquired by the CPU 112 from the corresponding address of the search result reference table 118 and is written into an output buffer 105. A terminator giving notice of the termination of a consecutive search processing and various control information to be delivered to a hardware connected in the subsequent stage are stored in the search result reference table 118 and these information are written into the output buffer 105, as required.

Also, if the contents of the search result reference table 118 are made rewritable, a table capable of being programmed by a user can be provided. Therefore, it is possible to arbitrarily set the contents of the table for each of different processings or for each of different chips.

Accordingly, in the present embodiment, since it is possible to arbitrarily set the data format and/or the contents of the result 111 of search, there is obtained an effect that the present embodiment can flexibly cope with various system constructions or interfaces. Further, like the first, second, third and fourth embodiments, the present embodiment provides an effect that the speed of the whole of a search processing can be improved since a comparison processing for partial character strings by a parallel comparator 106 is performed with no table access.

Figure 24:
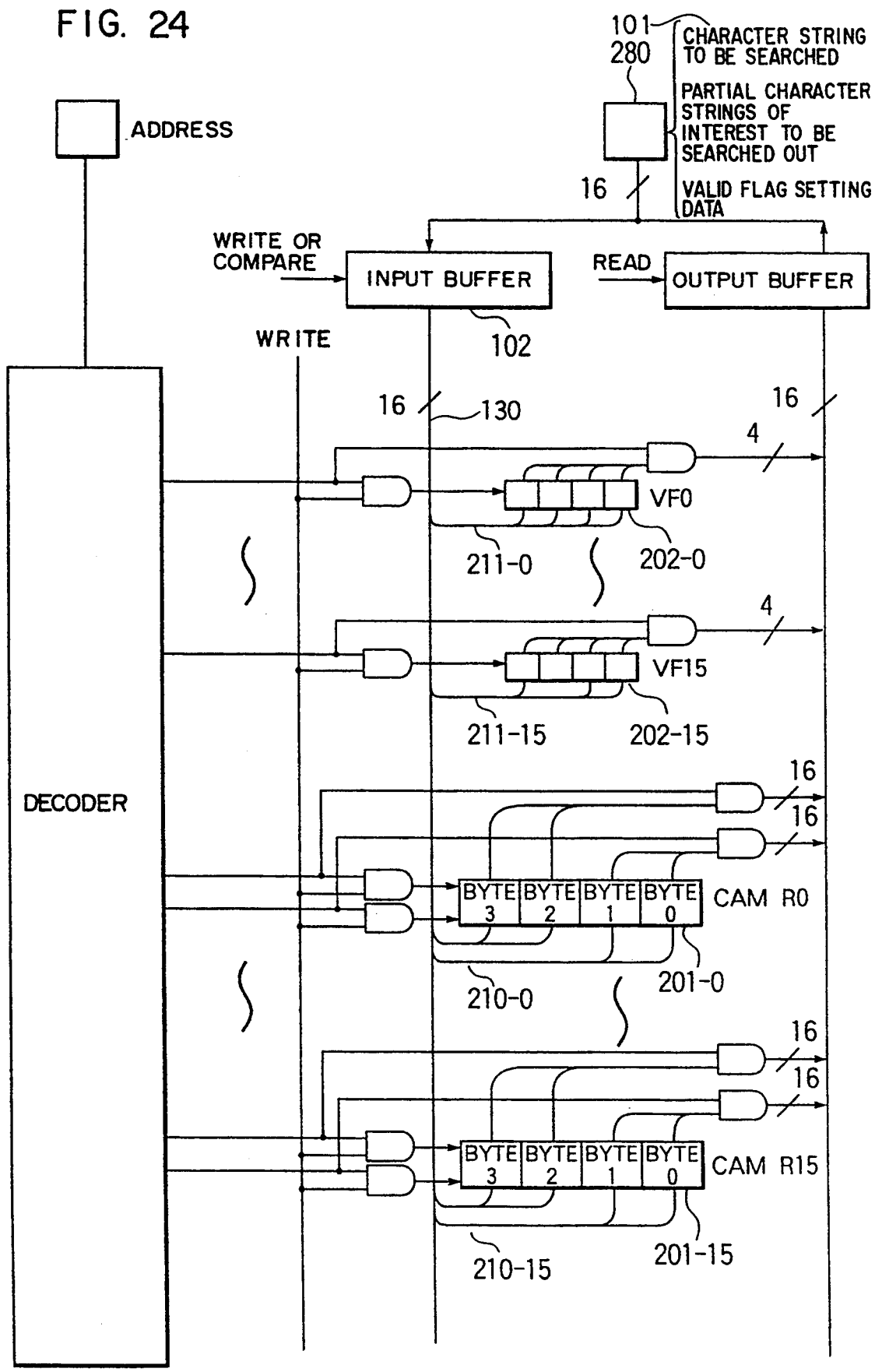
FIGS. 24 and 25 are block diagrams of t different embodiments of a construction in which an input port or terminal is held in common.

FIG. 24 is a block diagram showing a first embodiment of a construction in which an input terminal for setting of partial character strings, an input terminal for setting of valid flag registers and an input terminal for a character string to be searched are provided by a common terminal.

In FIG. 24, there are three kinds of access modes which include the read of data from CAM registers CAM R0 to CAM R15 and valid flag registers VF0 to VF15 (read mode), the write of data into those registers (write mode or set mode) and the collation of a character string to be searched with partial character strings of interest to be searched for (compare mode). A terminal 280 serves as a data output terminal in the read mode and serves as a data input terminal in the write mode and the compare mode. The CAM registers and the valid flag registers are addressed so that any one thereof can be selected by an address input from the exterior in the read mode and the write mode.

The read mode includes designating any one of the CAM registers or the valid flag registers is designated by an address so that the contents of the designated CAM register or valid flag register are placed onto an output data bus, and opening the gate of an output buffer to read data.

The write or set mode includes opening the gate of an input buffer to place data onto an input data bus, and designating any CAM register or valid flag register by an address to latch data on the input data bus into the CAM register or valid flag register.

The compare mode includes opening the gate of the input buffer to place data onto the input data bus, and setting addresses so as to cause no selection a specified CAM register or valid flag register or so as to transfer data on the input data bus to all of the CAM registers so that the collation with partial character strings latched in the CAM registers is made.

In the present embodiment, since the three kinds of modes mentioned above hold the terminal 280 in common, it is possible to reduce the number of pads required on the semiconductor integrated circuit. Accordingly, the present embodiment is effective as a measure to counter the increase in area of a chip or the increase in number of pins.

Figure 25:
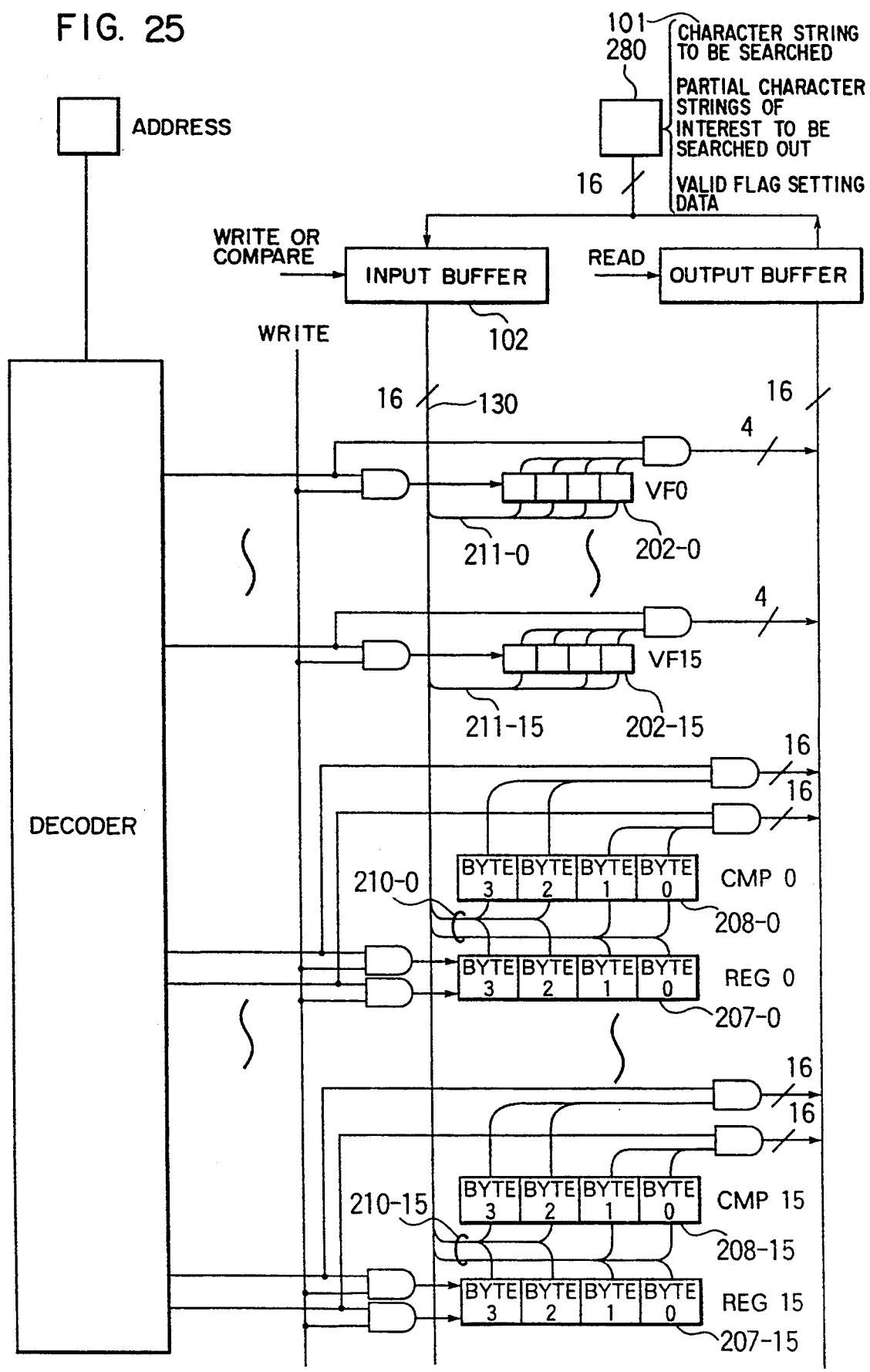

FIG. 25 is a block diagram showing a second embodiment of a construction in which an input terminal for setting of partial character strings, an input terminal for setting of valid flag registers and an input terminal for a character string to be searched are provided by a common terminal.

In this embodiment, registers REG0 to REG15 and comparing circuits CMP0 to CMP15 are used in place of the CAM registers CAM R0 to CAM R15 in the embodiment shown in FIG. 24. The operation and effect of the present embodiment are similar to those of the embodiment of FIG. 24 and the present embodiment is effective as a measure to counter the increase in area of a chip or the increase in number of pins.

According to the foregoing embodiment of the present invention, in a document search using an automaton, a parallel comparator is disposed in a front stage of finite automaton executing means to make comparison of a character string to be searched and partial character strings of interest to be searched for and a processing by the finite automaton executing means is performed only in the case where a coincidence is obtained as the result of comparison. Thereby, the number of times of input/output between the finite automaton executing means and a state transition table can be reduced. As a result, there is obtained an effect that the search processing speed can be improved.

Also, if the number of characters in the partial character string of interest set in the parallel comparator is increased, it is possible to further reduce the number of times of input/output between the finite sutomaton executing means and the state transition table, thereby providing an effect that the search processing speed can be further improved. Especially, in the case where a coincidence with the partial character set in the parallel comparator is not detected at all, the processing speed becomes the maximum or a time required for the search processing is approximately equal to a time required for the input of a text.

Further, by providing valid flag registers in the parallel comparator, it becomes possible to set partial character strings which have different word lengths or partial character strings which include "don't care" characters. Thereby, there is obtained an effect that a high-speed search can be realized without harming a flexibility which is possessed by the search using the automaton.

Next, further embodiments of the present invention will be explained. In these embodiments, the parallel comparator 106 in each of the first, second, third, fourth and fifth embodiments shown in FIGS. 4, 20, 21, 22 and 23 is provided with a construction as shown in FIG. 27.

In FIG. 27, a collation control register 40 (including a valid flag register 400 and a negation condition flag register 410) in the parallel comparator 106 has the following function.

When set, the valid flag register 400 renders the result of collation of a set character at the corresponding position with an input character valid as it is. When reset, the valid flag register 400 makes a designation of "don't care" so that the result of collation of a set character at the corresponding position and an input character is always rendered coincident irrespective of the input character.

When set, the negation condition flag register 410 provides an enable output upon collation of a set character at the corresponding position and an input character in the case where both the characters coincides with each other and provides a disable output in the case where both the characters do not coincide with each other. On the other hand, the negation condition flag register 410 is reset, the logic of the result of collation is inverted or the negation condition flag register provides a disable output in the case where a set character at the corresponding position and an input character coincide with each other and provides an enable output in the case where both the characters do not coincide with each other.

The provision of the collation control register 40 in addition to the leading collation system makes it possible to realize a high-speed collation processing which allows an ambiguous search having a high flexibility.

Now, the ambiguous search realized in the present invention will be explained on the basis of embodiments.

FIG. 28 shows an example of the development of a character string in the case where K ("abc") is given as the character string of interest to be searched out and an ambiguous search allowing various errors of one character for the character string of interest is conducted. The setting of a negation condition is represents by "¬" and the setting of "don't care" is represented by "?".

In character strings K1 to K9 developed from the character string K, K1 corresponds to a perfect coincidence, K2 to K4 the replacement of one character, K5 and K6 the insertion of one character, and K7 to K9 the deletion or omission of one character. It is necessary to make all of the character strings the object of search.

Figure 29:
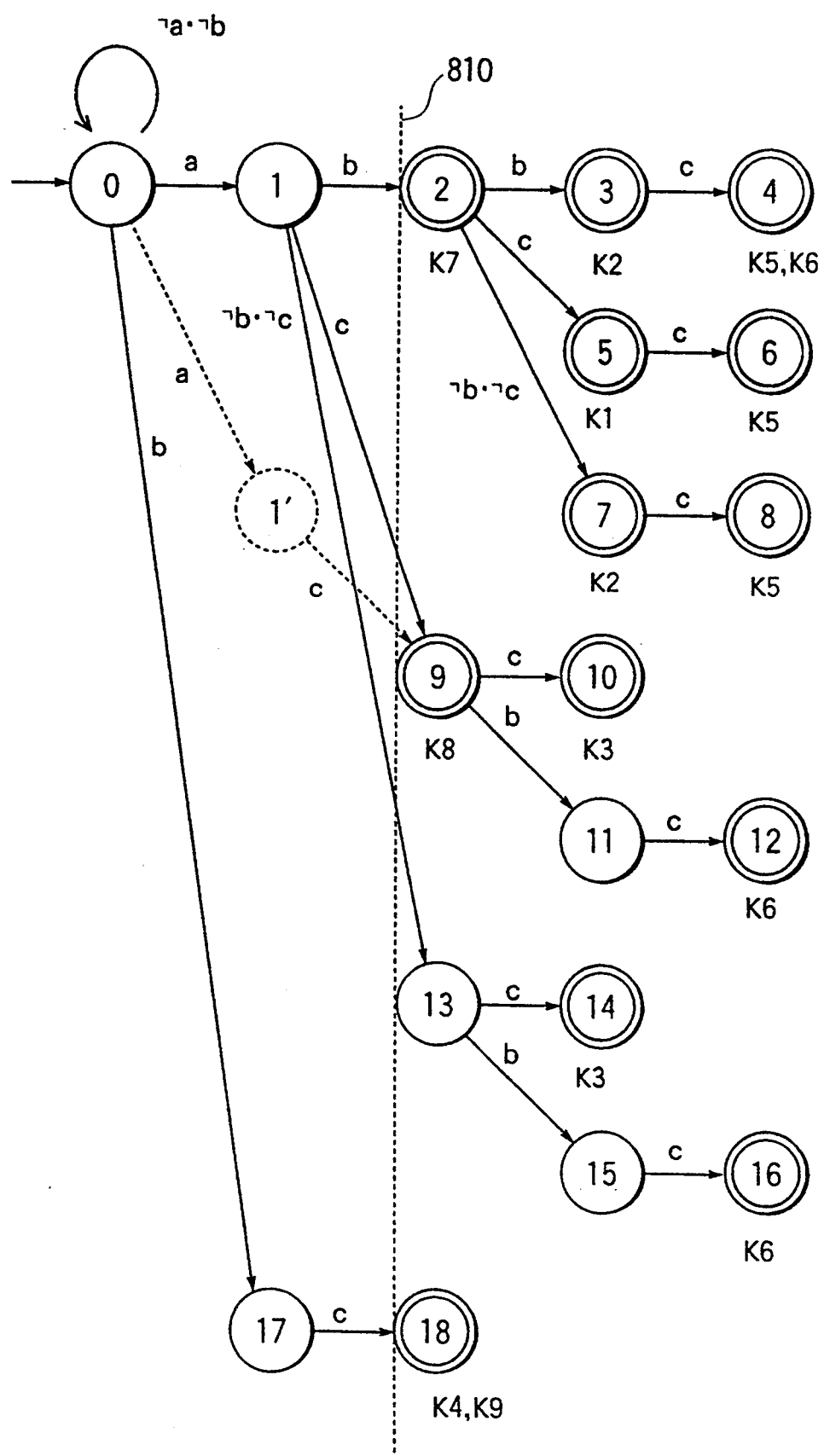

FIG. 29 shows one example of an automaton for searching out K1 to K9 as the object of search (or the character strings of interest) shown in FIG. 28 from a character string to be searched. In FIG. 29, a numbered circle represents each state and a numeral in the circle represents a state number. An initial state is a state 0 and a double circle is a state indicating the detection of a character string of interest to be searched out. A symbol below the double circle is an identifier for character string of interest corresponding to the character string of interest detected. An arrow represents a state transition and the state transition occurs when a character described around the arrow is inputted. In the case where the other character is inputted or a state of destination for transition is not described as in the states of some of the double circles, a transition to the initial state 0 occurs. (This is called fail.)

In the present invention, prior to a search processing, partial character strings of character strings of interest to be searched out are set into the parallel comparator 106. Also, control information for controlling the state transition of an automaton developed from the character strings of interest to be searched out is set into the state transition table 110.

The case of setting two leading characters of the automaton as the partial character strings of the character strings of interest to be searched for will now be explained as an example.

Figure 1A:
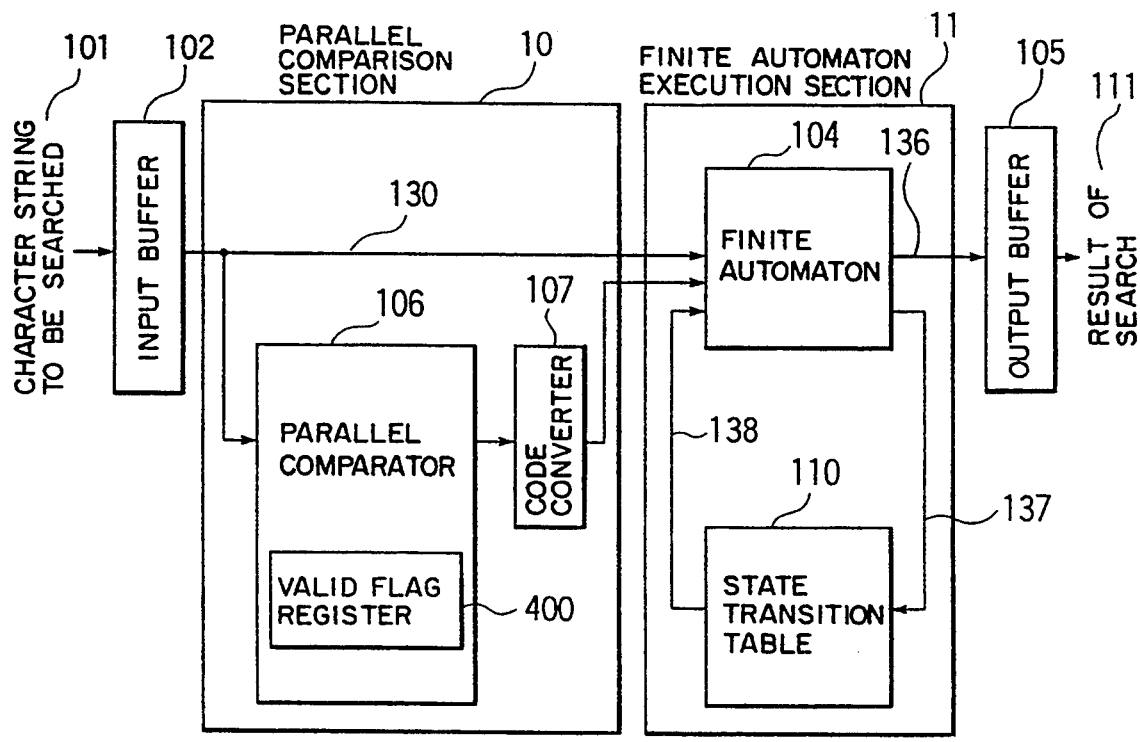
FIGS. 1A and 1B are block diagrams for explaining the principle of a character string search according to the present invention in which a finite automaton is used.
Figure 1B:
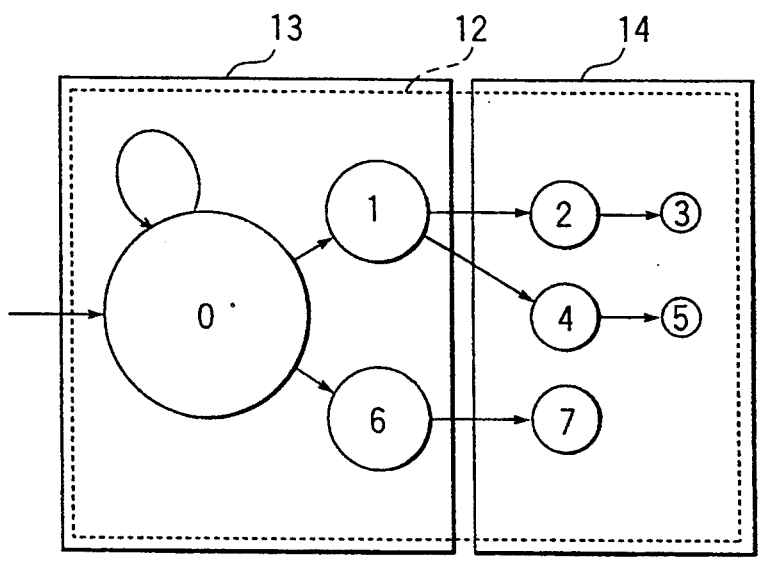
Figure 2:
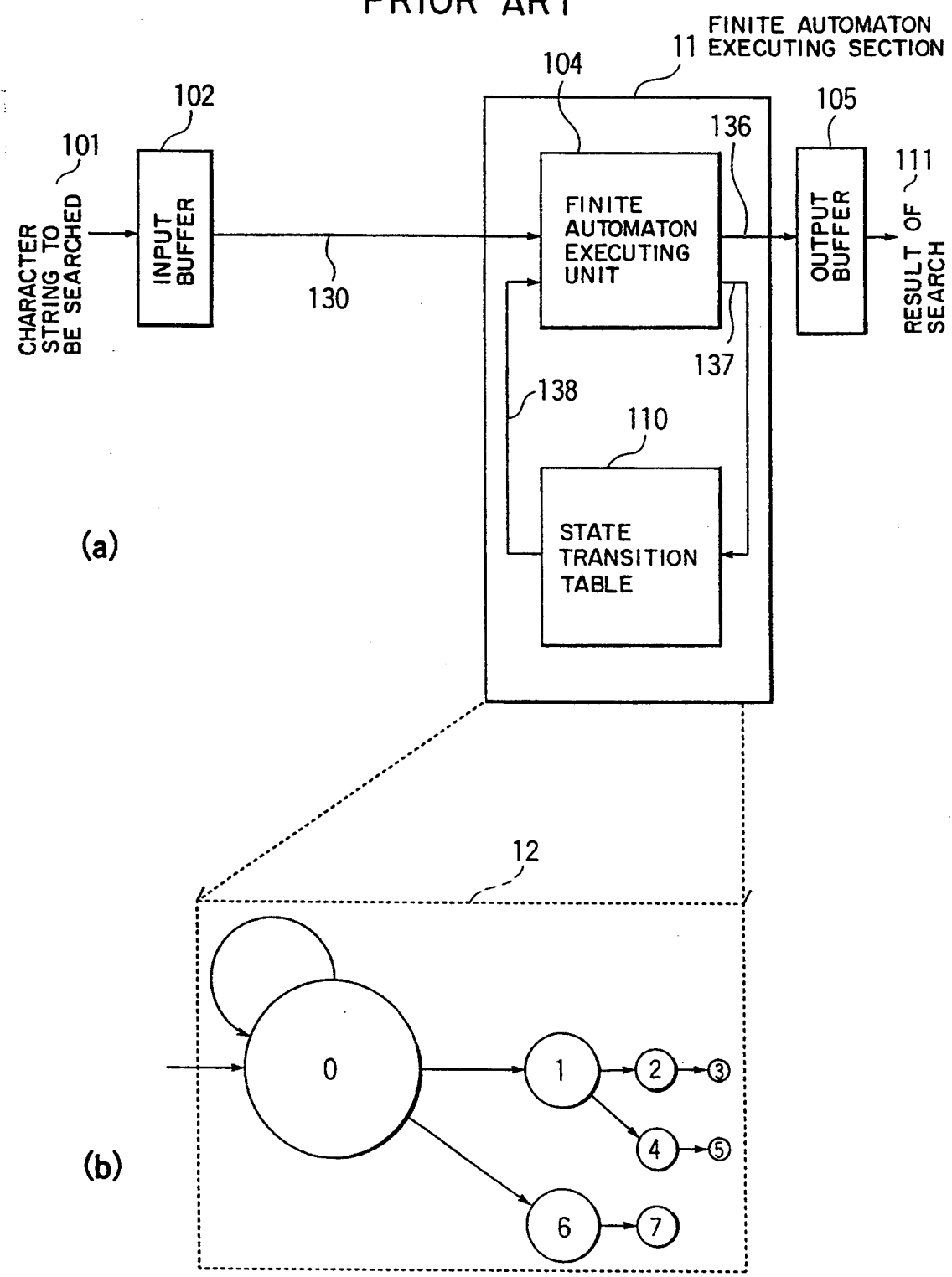
FIG. 2 is a block diagram for explaining the principle of the conventional character string search in which a finite automaton is used.
Figure 3:
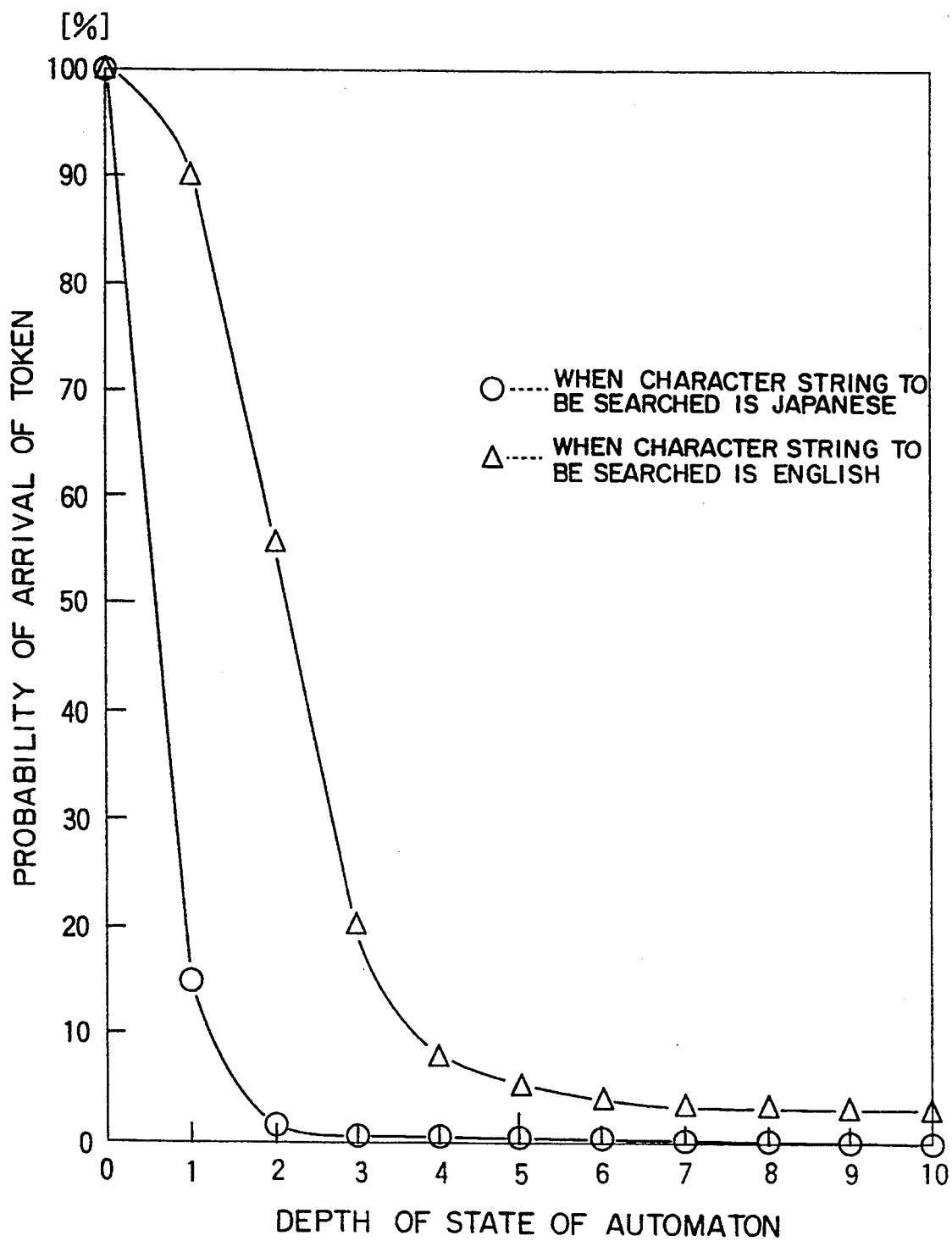
FIG. 3 is a graph showing a relation between the depth of state and the probability of arrival in an automaton for character string search.

In FIG. 2a, a broken line 810 bisecting the automaton indicates the position of division of the automaton in the case where the two leading characters are set into the parallel comparator. Accordingly, the transition until states 2, 9, 13, 18 and 19 is effected by the parallel comparator 106 and the subsequent transition is effected by the finite automaton executing unit 104 and the state transition table 110. The latter portion of the automaton after division thereof can be regarded as the assembly of four automatons the initial states of which are the states 2, 9, 13 and 18, respectively. Into the parallel comparator 106 are set partial character strings which represent conditions of transition from the state 0 to the states 2, 9, 13 and 18 and each of which is developed over two characters. Accordingly, for example, a state transition in the case where "ab" is inputted is 0→1→2. Also, a state transition in the case where "ac" is inputted is 0→1→9. Namely, the state transition of 0→1 based on the input of "a" is common to both the case of the input of "ab" and the case of the input of "ac" but the transition based on the input of "c" causes a branch to the state 9. Since this state transition of 0→1→9 can be regarded as a state transition of 0→1'→9 due to continuous appearance of two characters, as shown by dotted line in FIG. 29, the partial character string of "ac" is set into the parallel comparator independent of the partial character string of "ab".

Figure 30:
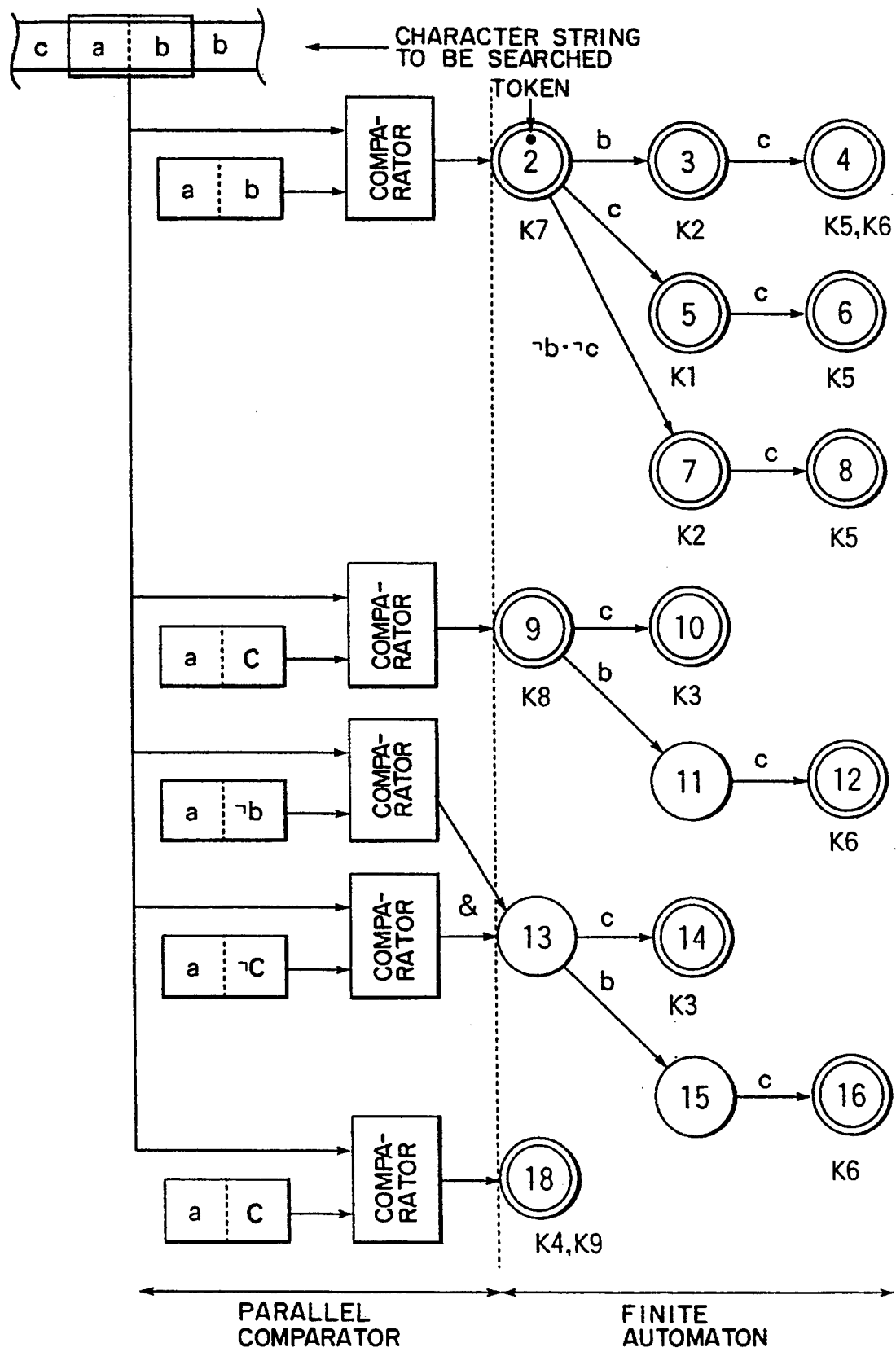

.FIG. 30 is a conceptual diagram in which the automaton shown in FIG. 29 is constructed by the parallel comparator 106 and an automaton generated for posetrior collation. A coincidence signal from the parallel comparator 106 causes a transition of the automaton from an initial state thereof. Subsequently, a state transition occurs in accordance with the state transition table so that a processing for comparative collation with a character string 101 to be searched is successively performed. The state 13 is fired only in the case where both the result of collation of "a¬b" with the character string to be searched and the result of collation of "a¬c" with the character string to be searched indicate a coincidence (represented by "&" in FIG. 30). Thus, the processing as a whole is equivalent to the execution of the automaton shown in FIG. 29.

FIG. 31 shows an embodiment of the setting of partial character strings and the setting of data to the collation control registers 40 for realizing a leading collation in the parallel comparator. In FIG. 31 are shown partial character strings to be set into the parallel comparator 106 and data to be set into the valid flag registers 400 and the negation condition flag registers 410.

As for the partial character, two characters shown in FIG. 30 are set. In the valid flag register 400, "1" is set to each of flags corresponding to the setting positions of the two characters and the other flags which are not used are reset (or set with "0"). In the negation condition flag register 410, "1" indicating that a negation condition is not set is set as an initial value and only a flag corresponding to a character in the partial character string which is to be set together with a negation condition is reset (or set with "0").

Accordingly, the setting of the partial character strings "ab", "ac", "a¬b", "a¬c" and "bc" shown in FIG. 30 into the parallel comparator may be attained by setting the respective items as shown in FIG. 31. A mark of Δ in the column of "partial character string" is a portion which is designated in units of one byte as an invalid region by the valid flag register and it is not necessary to set anything into that portion. FIG. 31 shows one example of the setting. For example, each item can be set at any address so long as the combination of the partial character string, the valid flag register and the negation condition flag register is the same. However, in the case where a plurality of partial character strings are searched out concurrently, the processing sequence is determined by a priority encoder which is disposed at a rear stage of the parallel comparator and will be explained in later.

Figure 32:
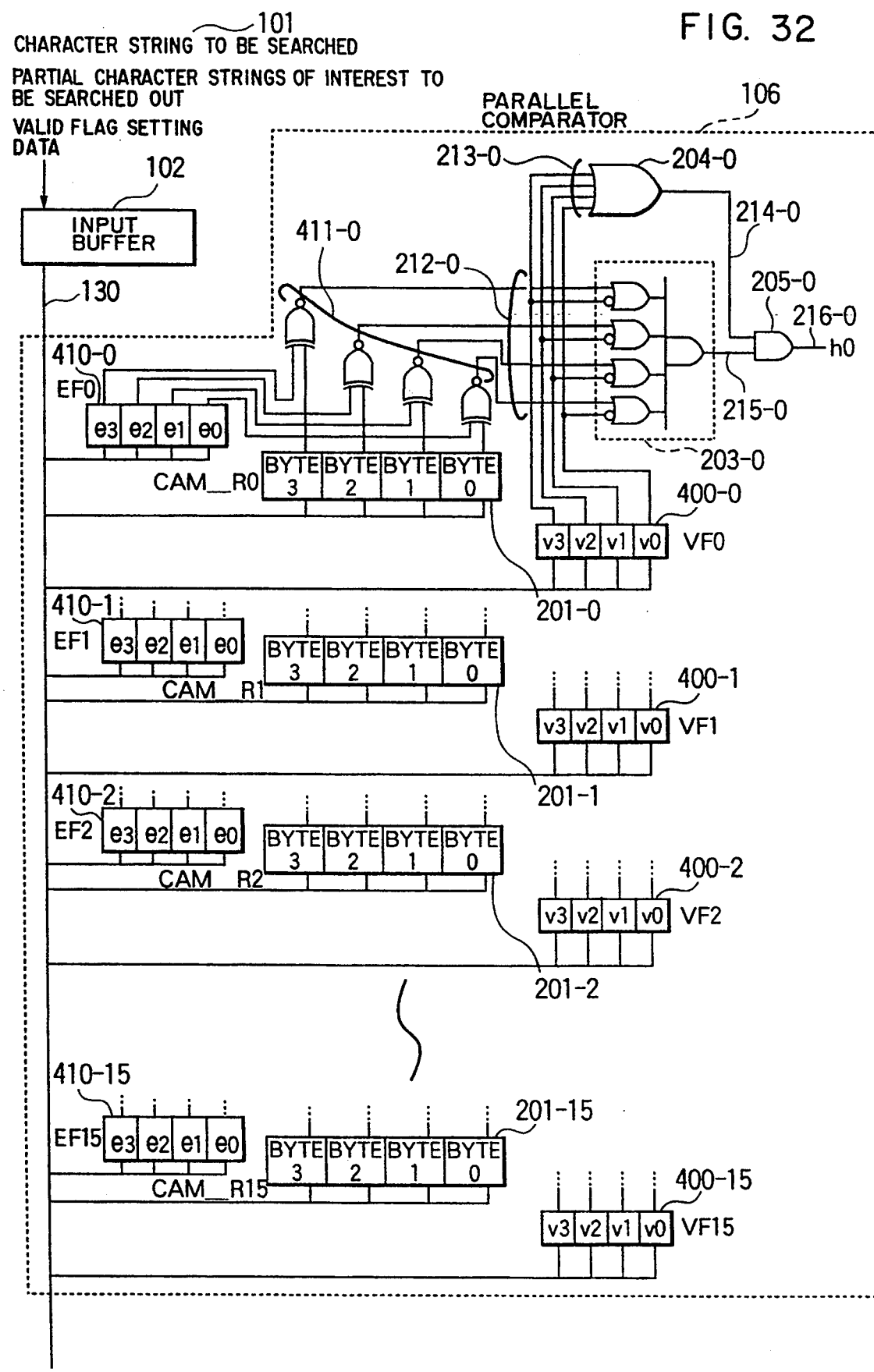

An embodiment shown in FIG. 32 is one in which the embodiment shown in FIG. 7 is supplemented by a negation condition flag register (EF0) 410-0 for enabling the setting of a negation condition and a logic circuit portion 411-0 for outputting the result of comparative collation for each byte in a CAM register (R0) 201-0 as being valid as it is in the case where the negation condition flag register (EF0) 410-0 is set ("1") and outputting a logical inversion of the result of comparative collation for each byte in the CAM register (R0) 201-0 as the result of comparative collation for a set negation condition in the case where the negation condition flag register (EF0) 410-0 is reset ("0"). the other construction shown in FIG. 32 is the same as that shown in FIG. 7.

Access to any one of the CAM registers (R0~R15) 201, any one of the valid flag registers (VF0~VF15) 400 and any one of the negation condition flag registers (EF0~EF15) 410 can be made through an input buffer 102. Also, there may be employed a construction in which data buses for the exclusive use of the individual registers are provided.

After partial character strings and the contents of valid flag registers 400 and negation condition flag registers 410 necessary for a search for the designated character strings have been set, an unnecessary CAM register(s) 201 including no partial character string set therein is invalidated by resetting the associated valid flag register(s) 400. Thereby, a comparative collation processing in the unnecessary CAM register always results in an anti-coincidence by virtue of a logic circuit portion 204 so that a coincidence signal is fixed to a disable condition.

As apparent from the foregoing, the present embodiment makes it possible not only to a comparative collation processing for a plurality of partial character strings in parallel with each other and at a high speed but also to set a negation condition character and a "don't care" character at any positions in a partial character string.

Figure 33:
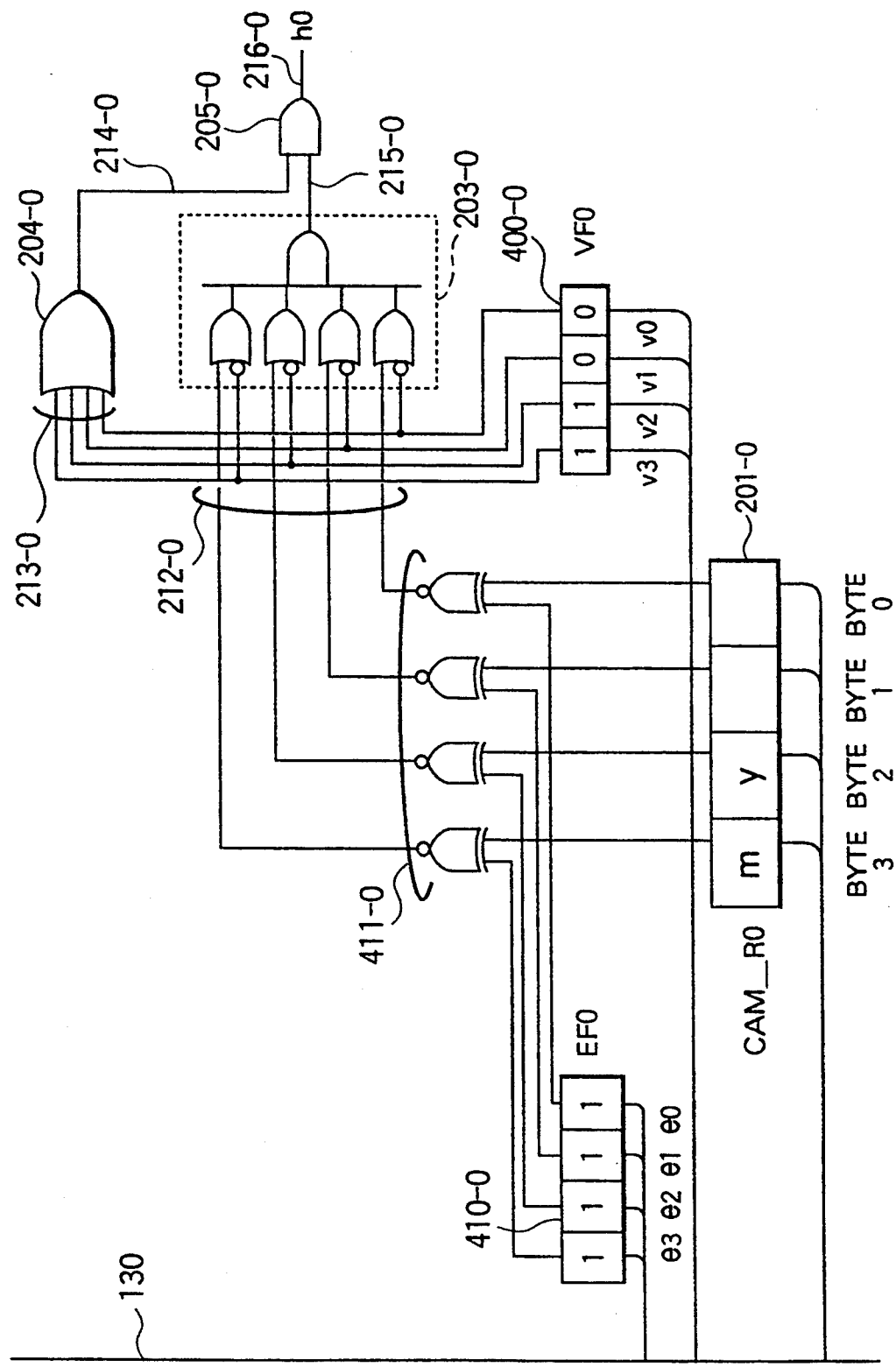

FIG. 33 is similar to FIG. 8 and shows an embodiment in the present invention in the case where a partial character string is set. A character string of interest of "my" and valid flag setting data "1100" are set. Further, in this embodiment, since there is not the setting of a negation condition, "1111" is set in the negation condition flag register EF0 so that a logical inversion of the result of collation in the CAM register is not made.

Figure 34:
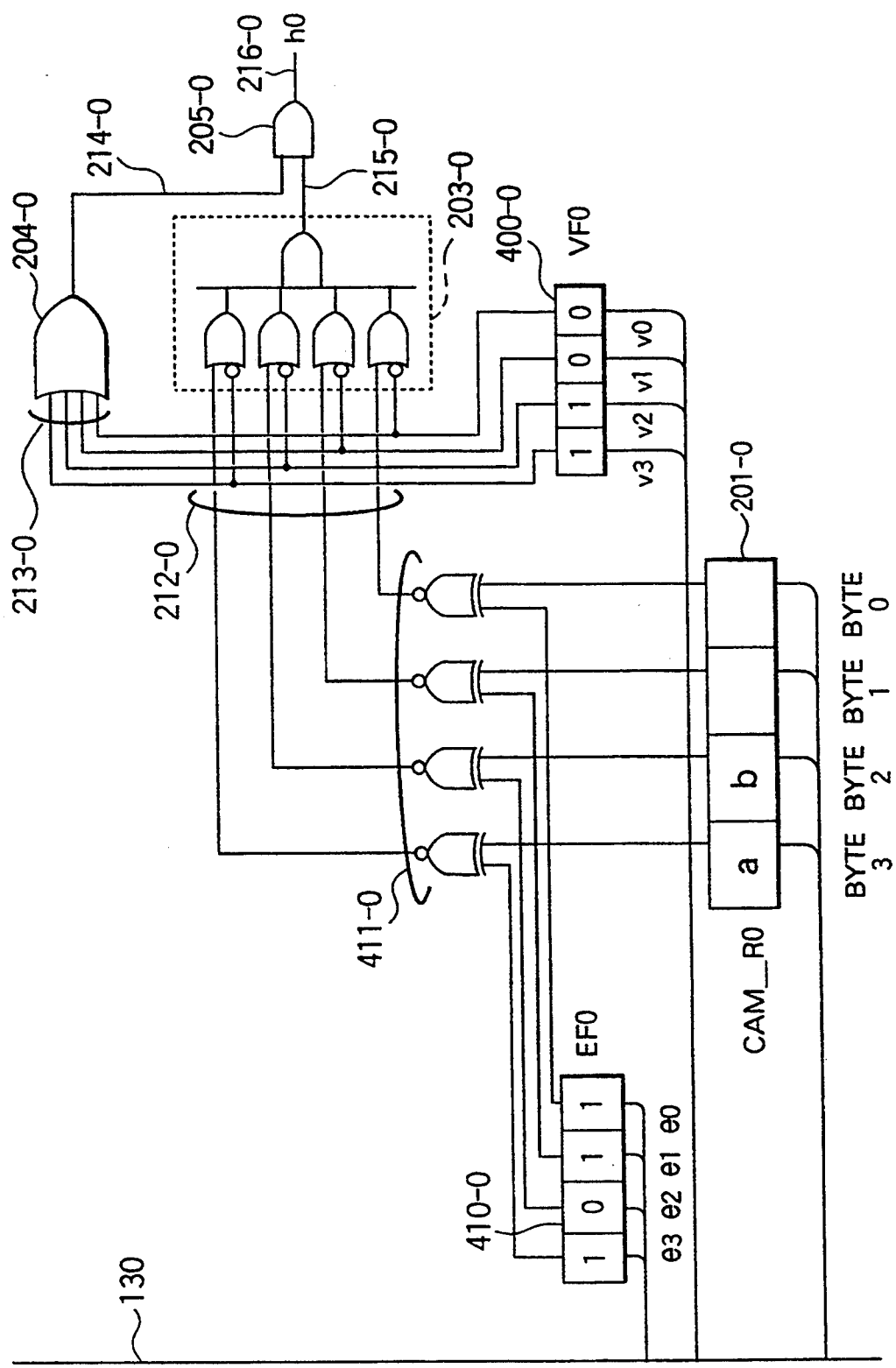

FIG. 34 shows an embodiment in the present invention in the case where a partial character string including a negation condition is set. By way of example will now be shown the case where the partial character string of "a¬b" set in the parallel comparator in FIG. 30 is to be actually set.

First, a partial character string of "ab" excluding a negation condition is set into bytes 3 and 2 of a CAM register. In order to invalidate the blanks of bytes 1 and 0, "1100" is set into the valid flag register. In order to add the negation condition to the byte 2, "1011" is set into the negation condition flag register. In the present invention, since the logical inversion of the result of comparison of the partial character string with the character string to be searched can be arbitrarily made in units of one byte by the above-mentioned setting, it becomes possible to realize the collation of the partial character string of "a¬b" including a negation condition which collation could not be realized in the conventional apparatus.

Figure 35:
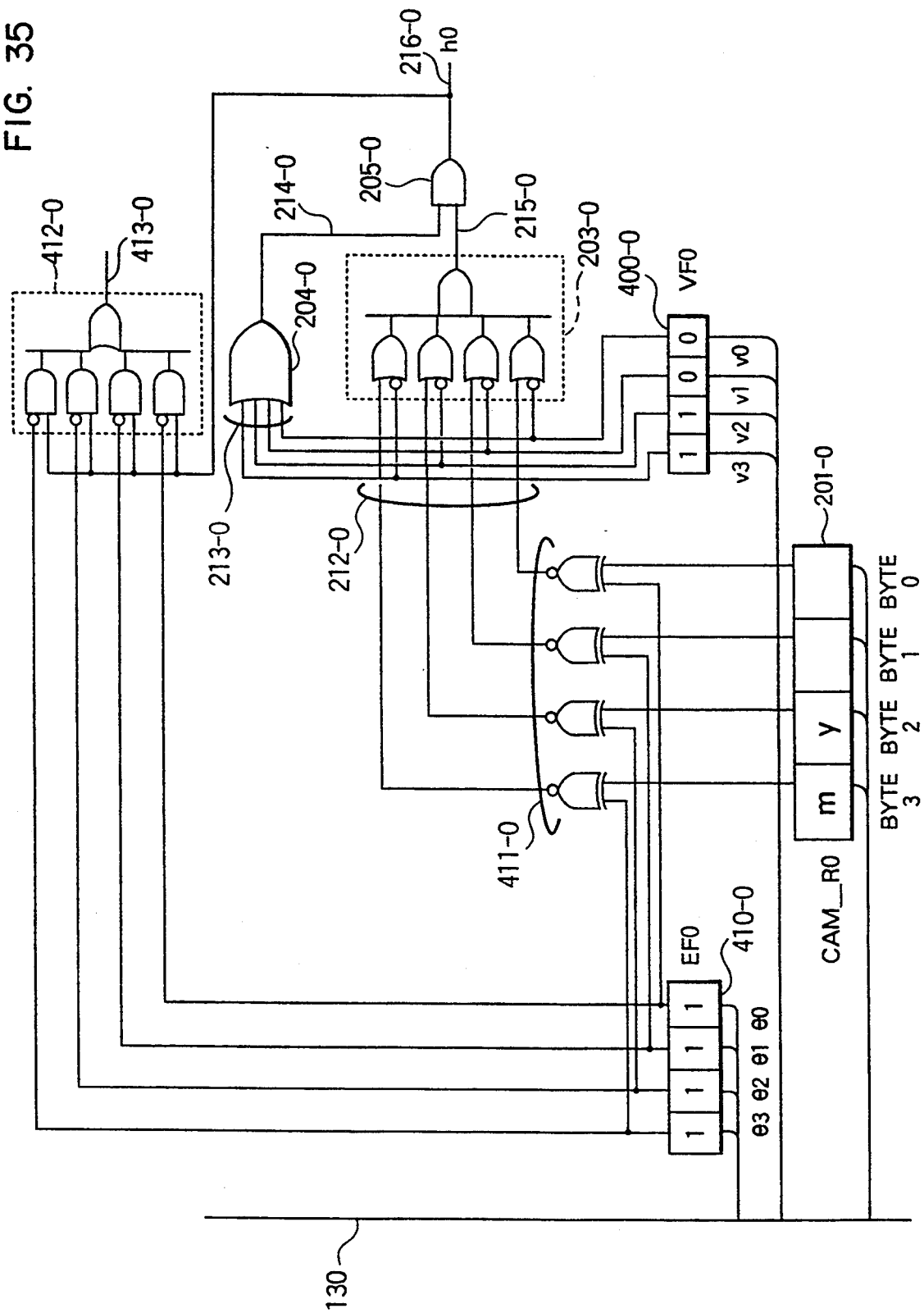

FIG. 35 shows an embodiment in which a function of detecting the presence of the setting of a negation condition in a detected partial character string is added.

In the present embodiment, in the case where a partial character string is detected so that a coincidence signal line 216-0 provides h0=1, the output 413-0 of a logic circuit portion 412-0 detecting the searching-out of a partial character string including the setting of a negation condition is enabled if at least one "0" exists in the contents of the negation condition flag register, that is, if the negation condition is set at any position in the partial character string. In the embodiment shown in FIG. 35, a character string of interest of "my" is set, like the embodiment shown in FIG. 33. In this case, since the setting of a negation condition is not made, "1111" is set into the negation condition flag register so that the logical inversion of the result of comparison in the CAM register is not made. Accordingly, the output 413-0 of the logic circuit portion 412 detecting the searching-out of a partial character string including the setting of a negation condition is always disabled.

Figure 36:
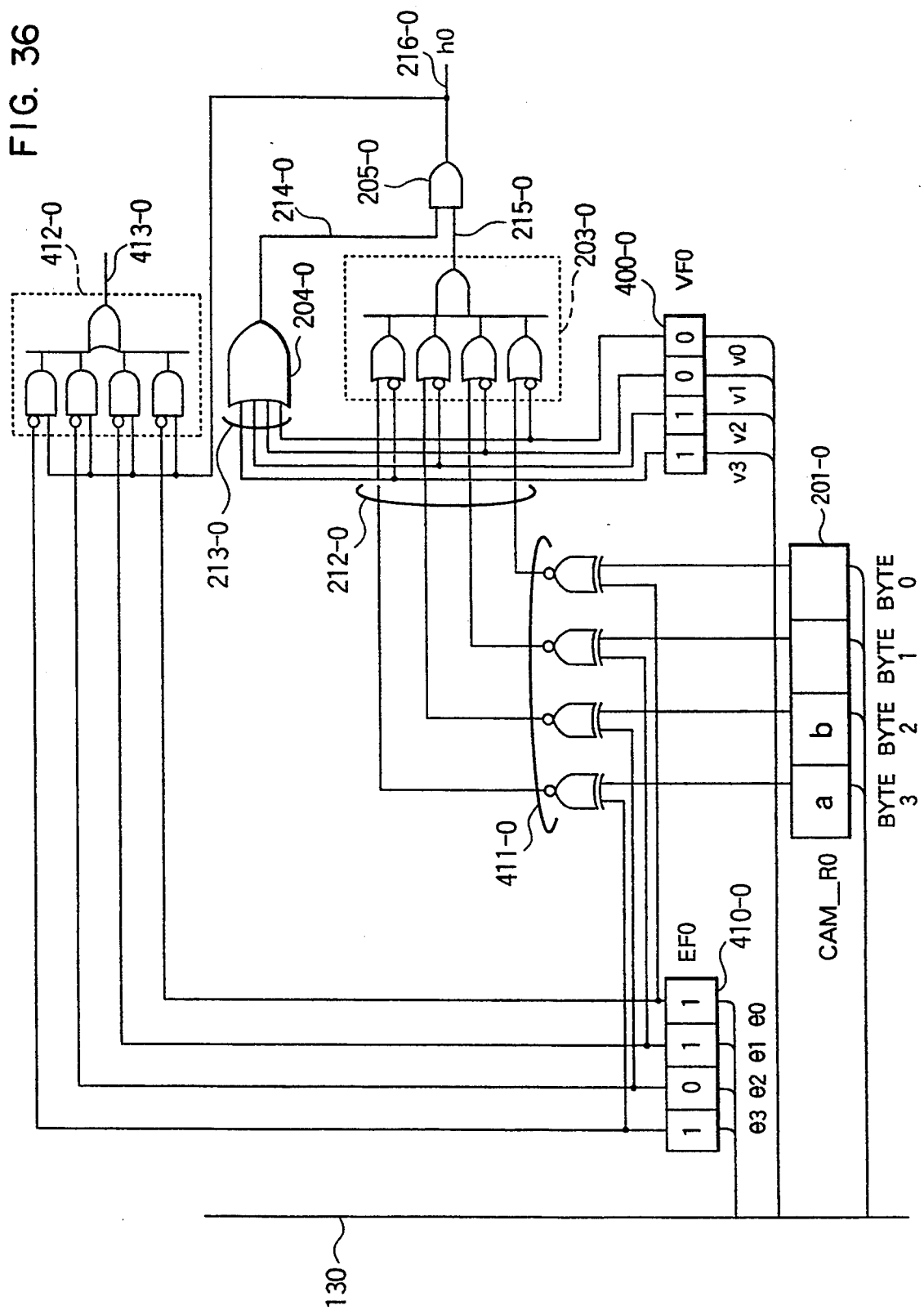

FIG. 36 shows an example in which a partial character string including a negation condition is set in the embodiment of FIG. 35 in which the function of detecting the presence of the setting of a negation condition is added. Like the example shown in FIG. 34, the case of actually setting "a¬b" as a partial string is shown by way of example. Since "1011" is set in a negation condition flag register, the output 413-0 of a logic circuit portion 412-0 detecting the setting of a negation condition is enabled if the partial character string is searched out.

Figure 37:
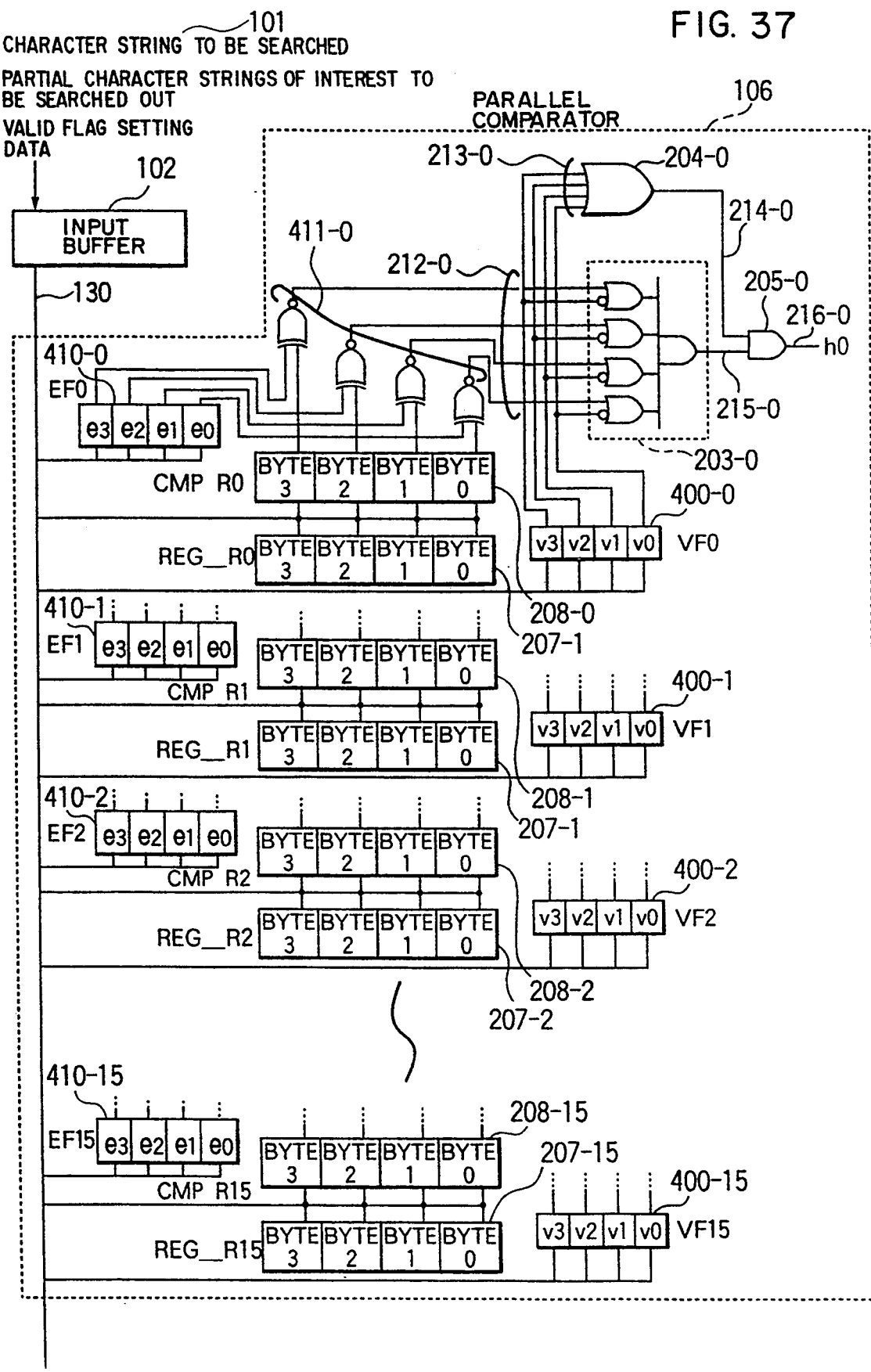

FIG. 37 shows an embodiment in which negation condition flag registers 410-0 to 410-15 and logic circuit portions 411-0 to 411-15 (only 411-0 of which is shown) for outputting the results of comparative collation for set negation conditions are added to the embodiment shown in FIG. 10. The other construction of the present embodiment is the same as that of the embodiment shown in FIG. 10. Namely, the present embodiment provides an effect that a partial character string having an arbitrary length can be set and a character including a negation condition or a "don't care" character having a variable length can be set in a partial character string, thereby making it possible to realize a flexible processing for parallel comparative collation.

Figure 38:
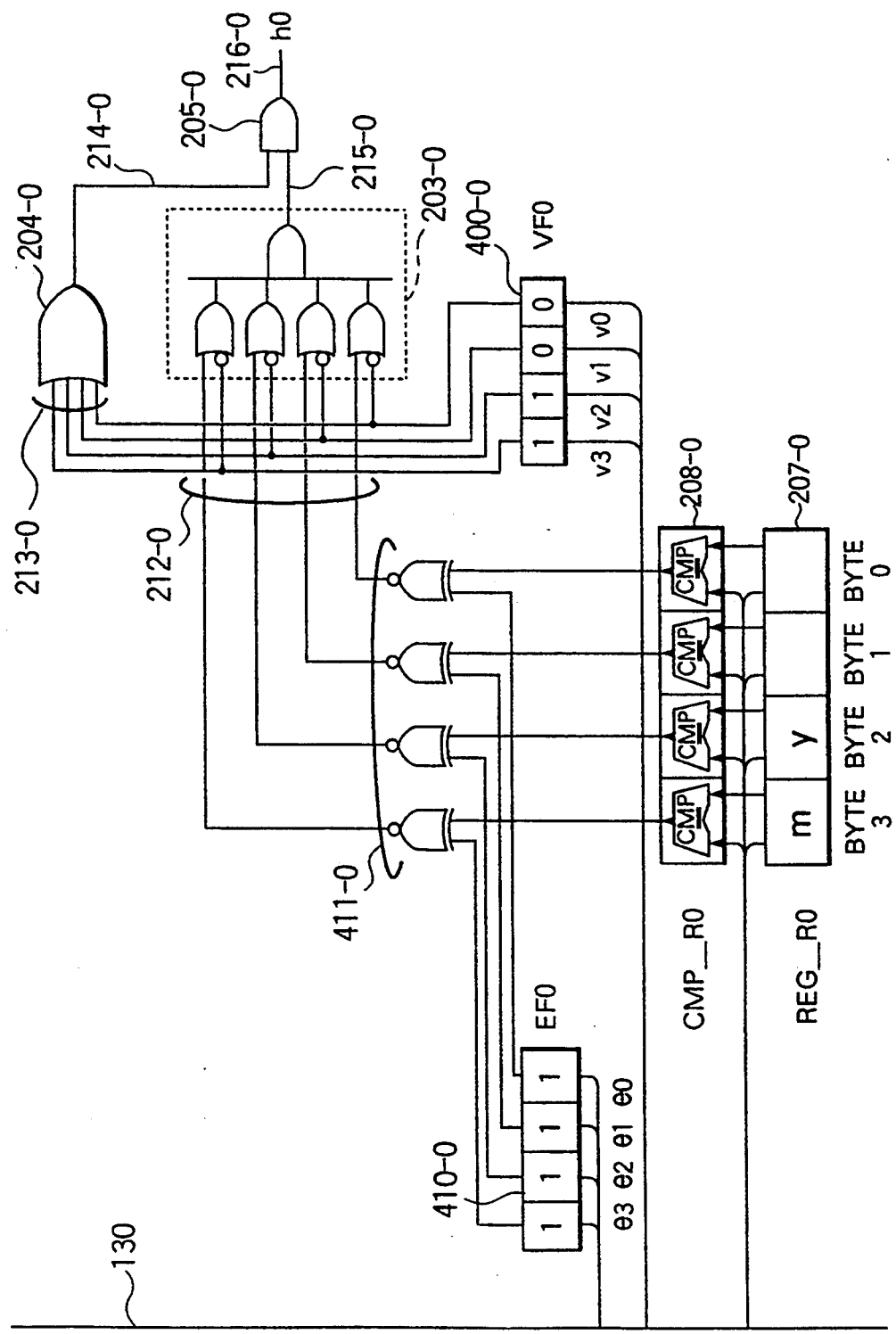

FIG. 38 shows an embodiment in which a negation condition register EF0 and a logic circuit portion 411 are added to the construction shown in FIG. 11. The other construction of the present embodiment is the same as the construction shown in FIG. 11. In FIG. 38, a character string of interest of "my" and valid flag setting data "1100" are set. Further, in this case, since the setting of a negation condition is not made, "1111" is set into the negation condition flag register (EF0) 410-0 so that the logical inversion of the result of collation in a comparating circuit is not made.

Figure 39:
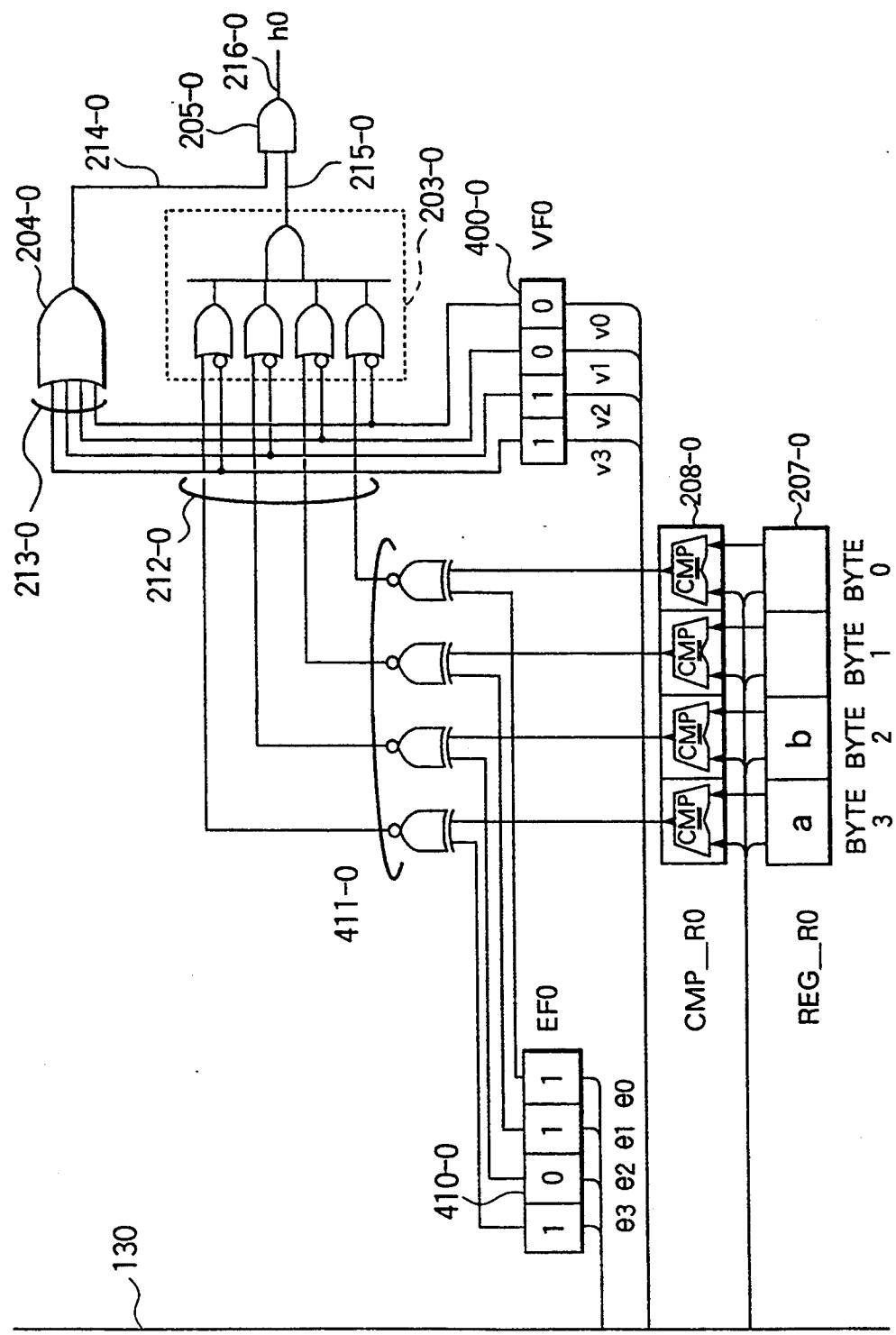

FIG. 39 is a diagram for explaining the case where a partial character string including a negation condition is set in the embodiment of the parallel comparator shown in FIG. 38. By way of example will now be shown the case where the partial character string of "a¬b" set in the parallel comparator in FIG. 30 is to be actually set.

First, a partial character string of "ab" excluding a negation condition is set into bytes 3 and 2 of a register 207-0. In order to invalidate the blanks of bytes 1 and 0 of the register 207-0, "1100" is set into a valid flag register (VF0) 400-0. By making such a setting, the present invention makes it possible to realize the collation of the partial character string of "a¬b" including a negation condition which collation could not be realized in the conventional apparatus.

Figure 40:
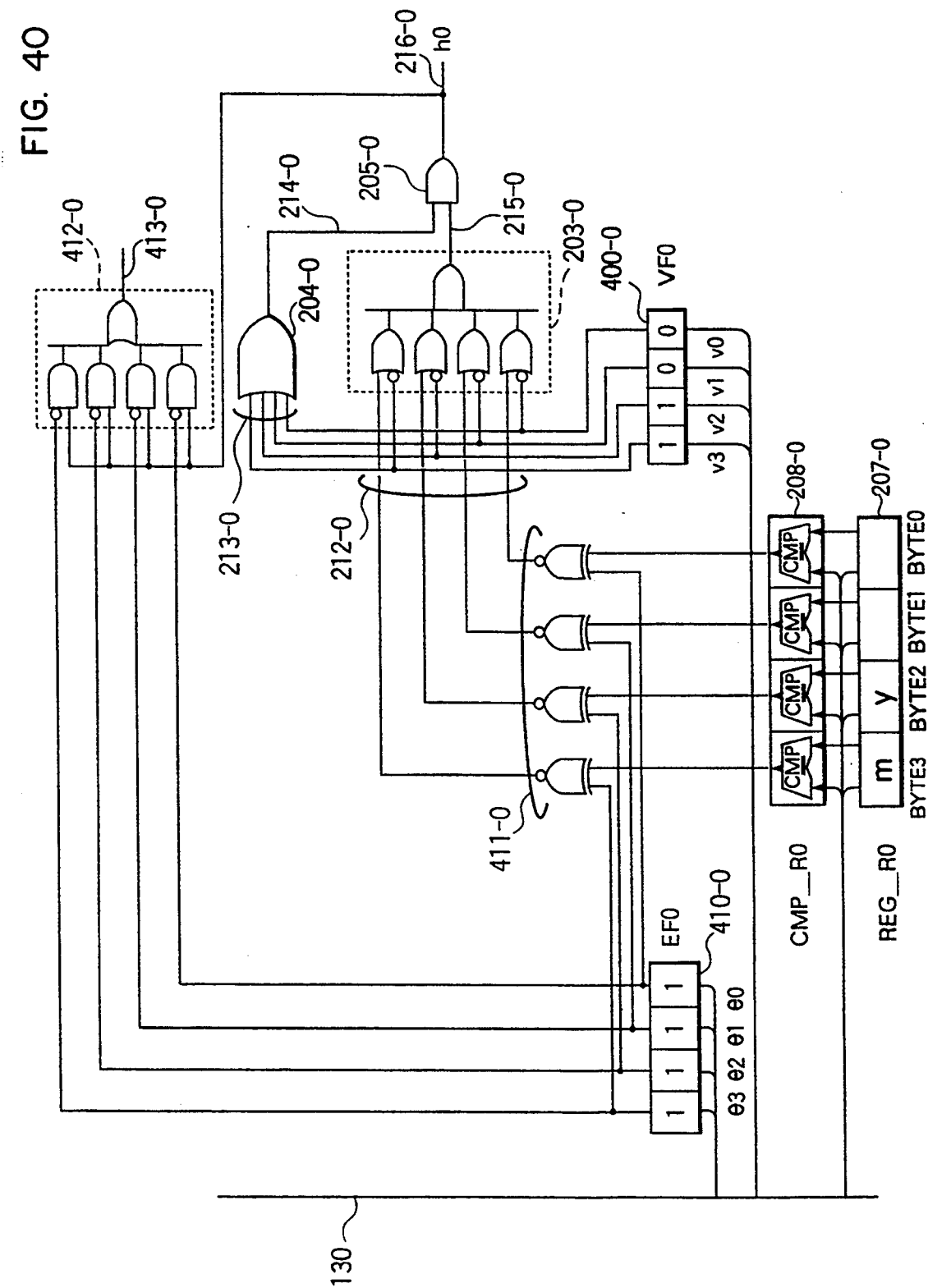

FIG. 40 shows an embodiment in which a function of detecting the presence of the setting of a negation condition in a partial character string searched out is added to the embodiment of the parallel comparator shown in FIG. 38.

In the present embodiment, in the case where a partial character string is detected so that a coincidence signal line 216-0 provides h0=1, the output 413-0 of a logic circuit portion 412-0 detecting the searching-out of a partial character string including the setting of a negation condition is enabled if at least one "0" exists in the contents of a negation condition flag register (EF0) 410-0, that is, if the negation condition is set at any position in the partial character string. In the embodiment shown in FIG. 40, a character string of interest of "my" is set, like the embodiment shown in FIG. 36. In this case, since the setting of a negation condition is not made, "1111" is set into the negation condition flag register (EF0) 410-0 so that the logical inversion of the result of comparison in a comparing circuit is not made. Accordingly, the output 413-0 of the logic circuit portion 412-0 detecting the searching-for of a partial character string including the setting of a negation condition is always disabled.

Figure 41:
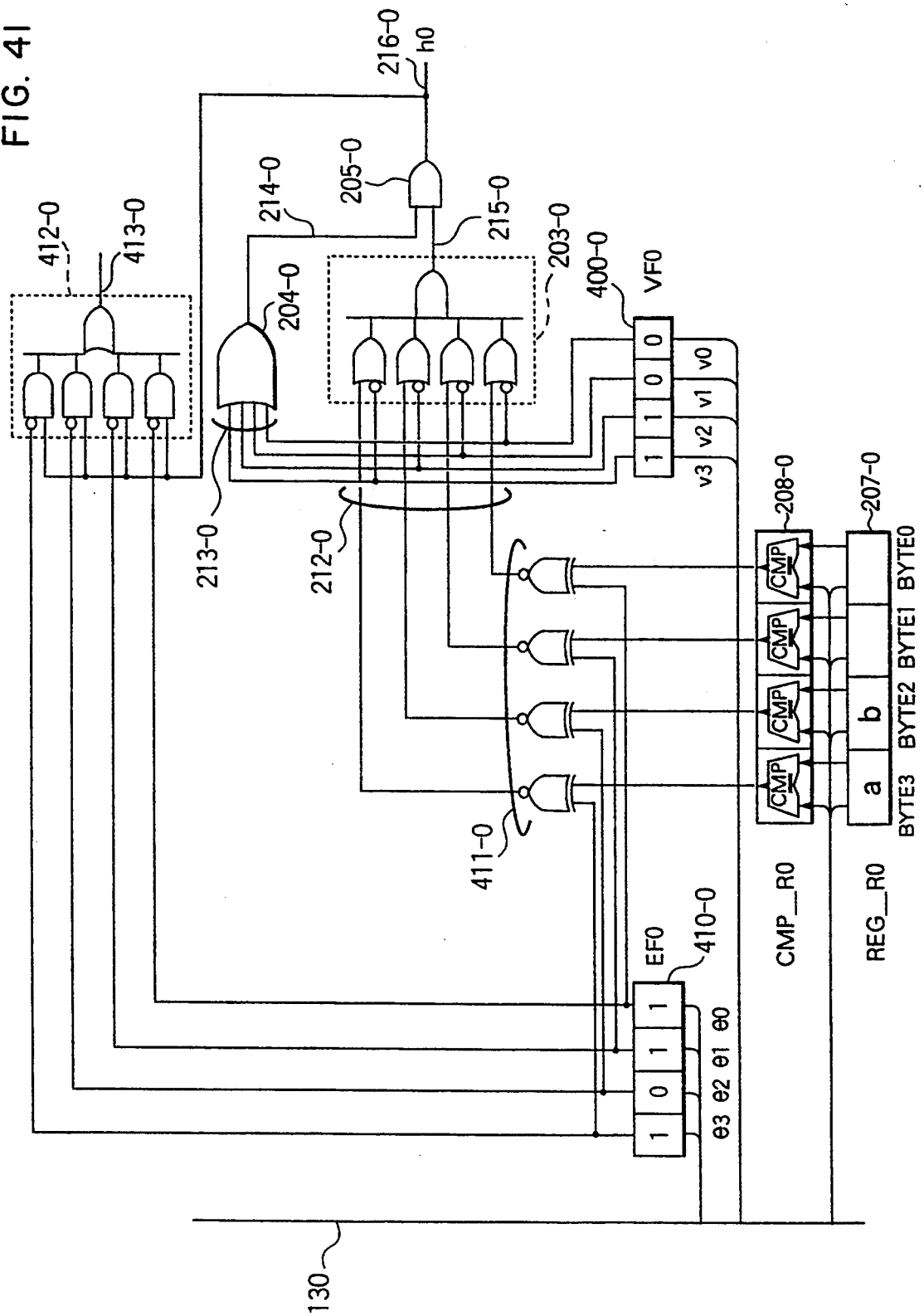

FIG. 41 shows an example in which a partial character string including a negation condition is set in the embodiment of FIG. 40 in which the function of detecting the presence of the setting of a negation condition is additionally provided. Like the example shown in FIG. 39, the case of actually setting "a¬b" as a partial character string is shown by way of example. Since "1011" is set in a negation condition flag register, the output 413-0 of a logic circuit portion 412-0 detecting the setting of a negation condition is enabled if the partial character string is detected.

An embodiment of termination code detecting means in the parallel comparator using the registers and the comparing circuits may be constructed with slight modifications of the structure shown in FIG. 12. The construction of this embodiment is the manner of setting of a termination code and the operation of the present embodiment are similar to those of the parallel comparator using the registers and the comparing circuits, excepting that a negation condition flag register is provided. However, in the termination code detecting means, not a coincidence signal in the parallel comparator but a termination signal (trm sig.) 216-16 is transferred to a control logic block.

In the example shown in FIG. 12, "EFE0" is set as a termination code. In the case where the number of effective characters of this termination code is to be changed or the termination code is not used at all, the purpose can be attained by changing the setting of a valid flag register 202-16.

Figure 42:
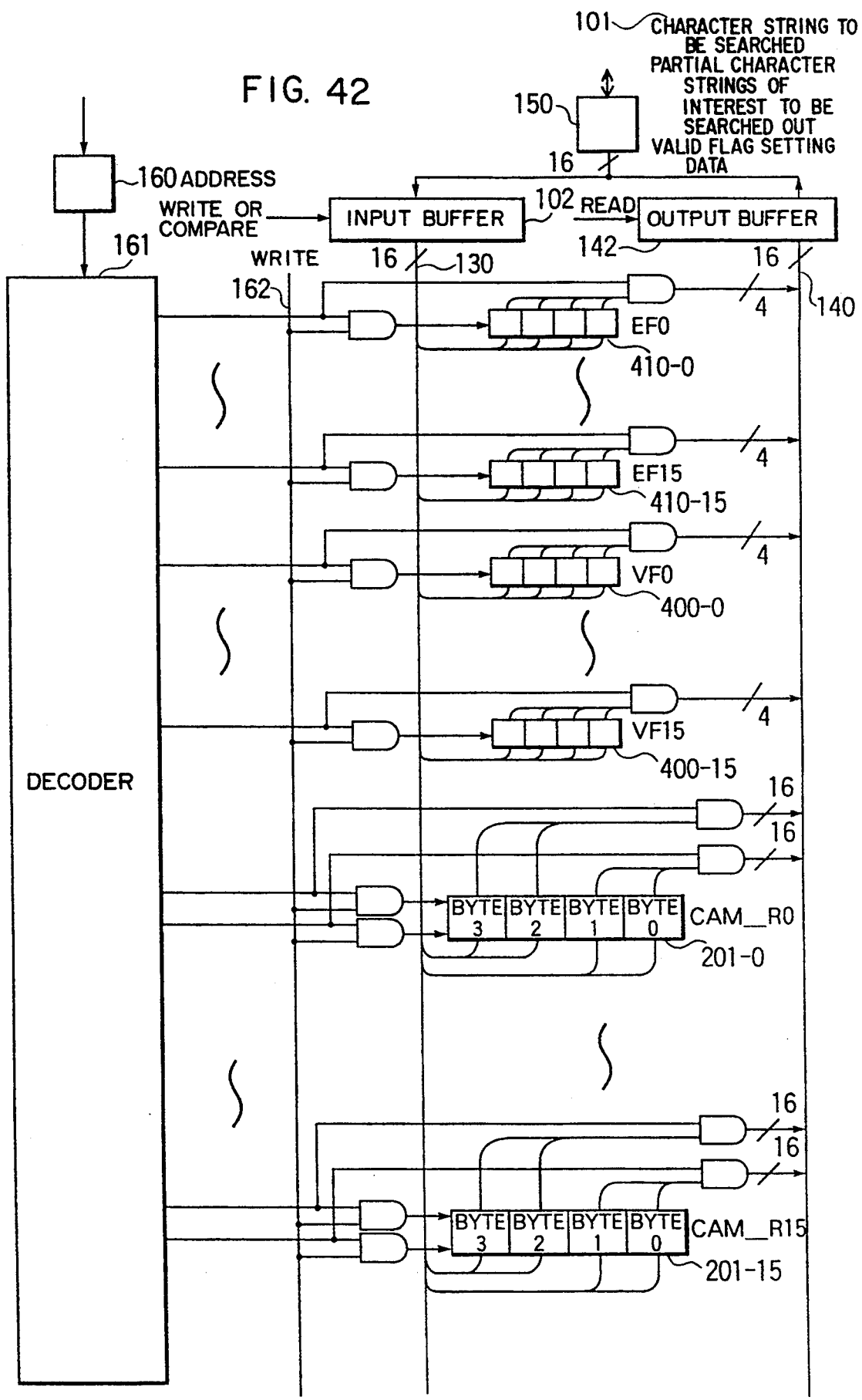

FIG. 42 shows a first embodiment of a construction in which an input terminal for setting of partial character strings, an input terminal for setting of valid flag registers, an input terminal for setting of negation condition flag registers, and an input terminal for a character string to be searched are provided by a common terminal. In FIG. 42, negation condition flag registers 410-0 to 410-15 are added to the construction shown in FIG. 24.

There are three kinds of access modes which include the read of data from CAM registers 201, valid flag registers or negation condition flag registers (read mode), the write of data into those registers (write mode or set mode) and the collation of a character string to be searched with partial character strings of interest (compare mode). A data terminal 150 serves as a data output terminal in the read mode and serves as a data input terminal in the write mode and the compare mode. The CAM registers 201-0 to 201-15, the valid flag registers 400-0 to 400-15 and the negation condition flag registers 410-0 to 410-15 are addressed so that any one thereof can be selected through a decoder 161 by an address input from an address terminal 160 in the read mode and the write mode.

Next, the flow of data in each mode will be explained. In the read mode, any one of the CAM registers 201-0 to 201-15, the valid flag registers 400-0 to 400-15 or the negation condition flag registers 410-0 to 410-15 is designated by an address to place the contents of the designated register onto an output data bus, and the gate of an output buffer 142 is opened to read data 140.

In the write mode, the gate of an input buffer 102 is opened to place data onto an input data bus, and any one of the CAM registers 201-0 to 201-15, the valid flag registers 400-0 to 400-15 and the negation condition flag registers 410-0 to 410-15 is designated by an address to latch data 130 on the input data bus into the register.

In the compare mode, the gate of the input buffer 102 is opened to place data 130 onto the input data bus, and addresses are set so as to cause no selection of a specified one(s) of the CAM registers 201-0 to 201-15, the valid flag registers 400-0 to 400-15 or the negation condition flag registers 410-0 to 410-15 or so as to transfer the data on the input data bus to all of the CAM registers 201-0 to 201-15 so that the collation with partial character strings in the CAM registers.

Since the three kinds of modes mentioned above hold the terminal 150 in common, it is possible to reduce the number of pads required on the semiconductor integrated circuit. Accordingly, the present embodiment is effective as a measure to counter the increase in area of a chip or the increase in number of pins.

Figure 43:
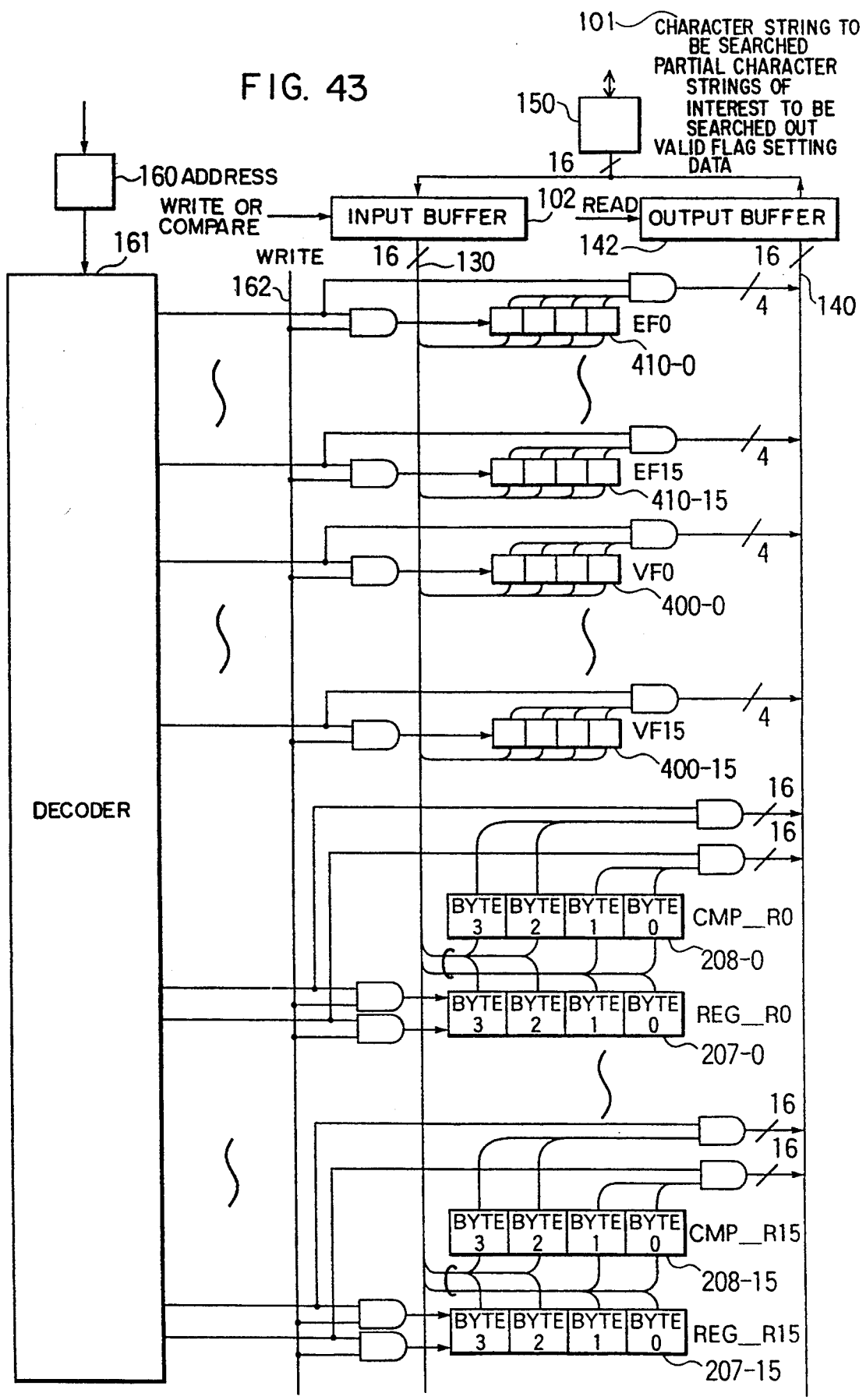

FIG. 43 shows a second embodiment of a construction in which an input terminal for setting of partial character strings, an input terminal for setting of valid flag registers, an input terminal for setting of negation condition flag registers, and an input terminal for a character string to be searched are provided with a common terminal, like the embodiment shown in FIG. 42. In the embodiment shown in FIG. 43, registers (REG R0 to REG R15) and comparing circuits (CMP R0 to CMP R15) are used in place of the CAM registers (CAM R0 to CAM R15) in the embodiment shown in FIG. 42. The operation and effect of the present embodiment are similar to those of the embodiment of FIG. 42 and the present embodiment is effective as a measure to counter the increase in area of a chip or the increase in number of pins.

Figure 44:
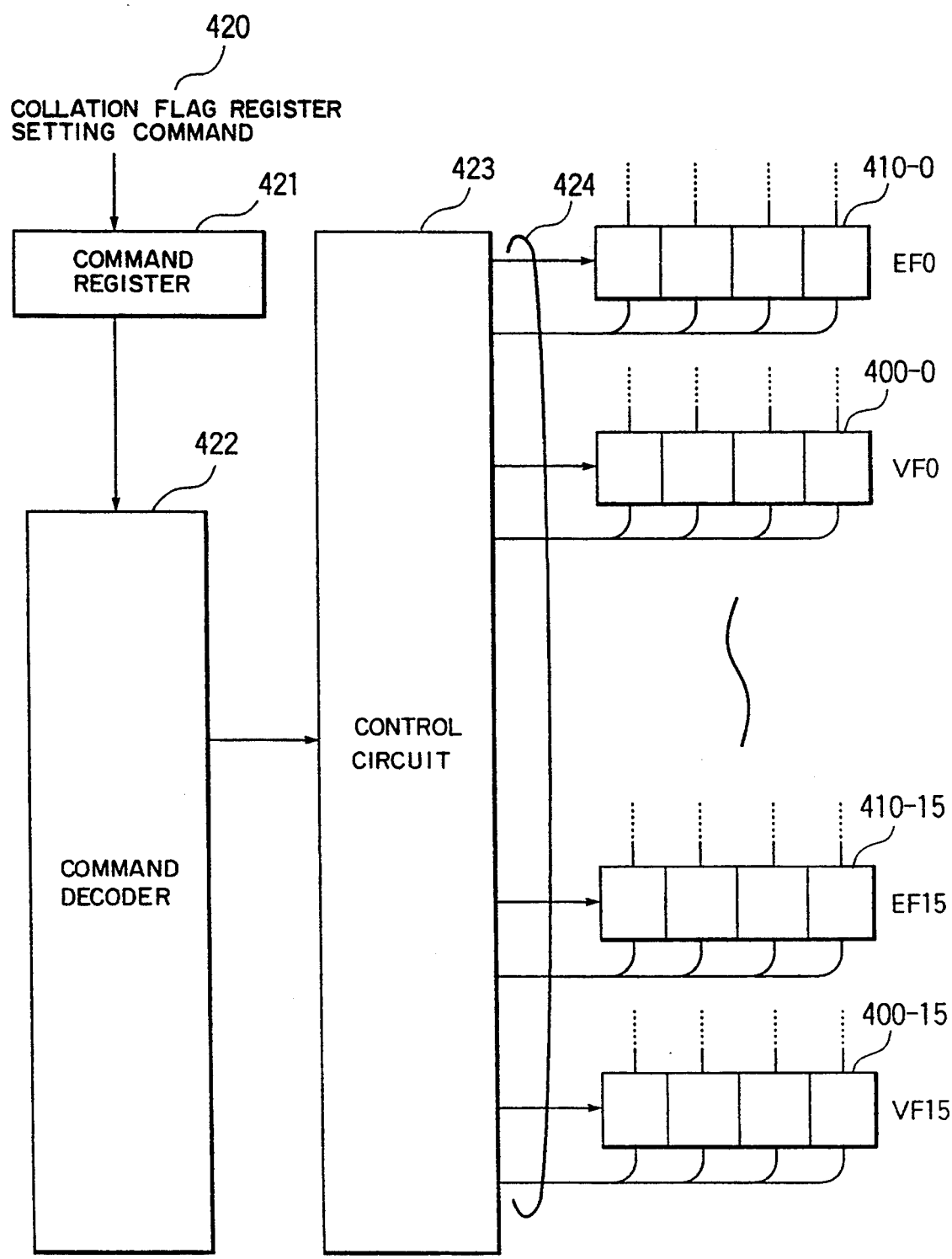

FIG. 44 is a block diagram showing the construction of an embodiment in which the setting of collation flag registers is made by a command.

The present embodiment is composed of a command register 421 for taking in a collation flag register setting command 420, a command decoder 422 for analyzing the collation flag register setting command 420, and a control circuit 423 for generating data to be set to collation flag registers and control signals 424 for data setting on the basis of an output of the command decoder 422.

The collation flag register setting command 420 is inputted to the command register 421 from the exterior and is then sent to the command decoder 422 for analysis thereof. In accordance with the result of analysis, the control circuit 423 generates data to be set to the collation flag registers and control signals necessary for data setting. The control signal makes a control of timing of data latch for a collation flag register into which data is to be set.

According to the above system in which the setting of data to collation flag registers is effected by means of a command, there is obtained an effect that it becomes possible to set data into a plurality of registers concurrently and to invalidate the plurality of registers concurrently.

Figure 45:
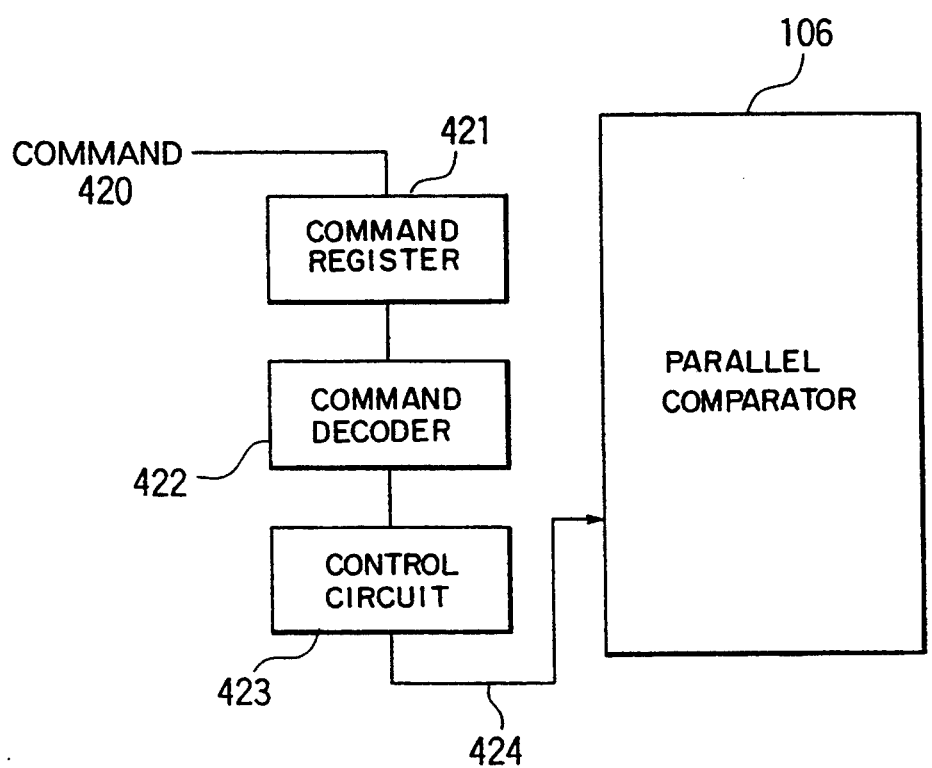

FIG. 45 shows a construction in which the collation flag register setting circuit shown in FIG. 44 is added to the parallel comparator 106. The construction shown in FIG. 45 is applicable to the embodiments shown in FIGS. 4, 20, 21, 12 and 23. The construction of FIG. 44 is also applicable to the embodiments in which the parallel comparator 106 shown in FIG. 4, 20, 21, 22 or 23 is modified to one shown in FIG. 27.

According to the embodiments of the present invention shown in FIGS. 27 to 45, in a search system in which the speed of a processing for document search based on a full-text search using an automaton is improved by disposing a parallel comparator in a front stage of finite automaton executing means to perform a leading collation processing, a negation condition flag register is provided in the parallel comparator in addition to a valid flag register, thereby making it possible to set partial character strings which have different word lengths or partial character strings which include "don't care" characters and/or characters having negation conditions. Thereby, there are obtained effects that the degree of freedom for the setting of a partial character string in the high-speed search using the automaton is improved and an ambiguous search such as a one-character error allowable search or a restrictive search can be realized with a higher flexibility.

We claim:

1. In a symbol string search apparatus a symbol string search method for making a judgement of whether or not a plurality of symbol strings of interest to be searched for exist in a symbol string to be searched which is composed of symbols represented by codes, the method comprising the steps of:

dividing each of the plurality of symbol strings of interest into a first partial symbol string and a second partial symbol string;

performing for each of said first partial symbol strings of the plurality of symbol strings of interest a leading collation processing using a parallel collation means for collating, in parallel, symbols constituting said first partial symbol string with symbols constituting the symbol string to be search on a symbol basis, said parallel collation means generating a coincidence signal when there is a coincidence for at least one first partial symbol string;

responsive to said coincidence signal, activating, for a second partial symbol string corresponding to said coincidence, a posterior collation processing with a subsequent symbol string to be searched, the posterior collation processing being performed by use of a finite state automaton executing means including a state transition table which stores control data referred to during the posterior collation processing, the plurality of symbol strings of interest to be searched for being judged as having been successfully searched for in a case where said subsequent symbol string to be searched completely satisfies a search condition for the second partial symbol string corresponding to said coincidence during the posterior collation processing.

2. A symbol string search method according to claim 1, further comprising the step of performing the leading collation in such a manner that a negation condition meaning the presence of all symbols other than a specified symbol can be set at any position in the partial symbol string as the search condition on the partial symbol string at the leading collation processing.

3. A symbol string search apparatus comprising:

(a) first external information accessing means for input of a symbol string code to be searched which is composed of symbols represented by codes;

(b) leading collation processing means for performing leading collation processing between the symbol string to be searched and a first partial symbol string of each of a plurality of symbol strings of interest which are to be searched for, said leading collation processing means including a parallel collation means for collating, in parallel, symbols constituting each of the first partial symbol strings of interest to be searched for with the symbol string to be searched on a symbol basis, said parallel collation means generating a coincidence signal when there is a coincidence for at least one first partial symbol string;

(c) posterior collation processing means including a finite state automaton execution means and being responsive to said coincidence signal, for activating posterior collation processing between a subsequent symbol string to be searched and a second partial symbol string corresponding to said coincidence, by performing finite state automaton processing from a current state indicated by said coincidence signal, said finite state automaton executing means generating an output indicating that the plurality of symbol strings of interest to be searched for are judged as having been successfully searched for in a case where said subsequent symbol string to be searched completely satisfies a search condition for the second partial symbol string corresponding to said coincidence;

(d) data storage means for storing data for control of the finite state automaton processing when said posterior collation processing is performed; and (e) second external information accessing means for input of said output from said finite state automaton executing means.

4. A symbol string search apparatus according to claim 3, wherein access by said first external information accessing means and access by said second external information accessing means are made independent of reference to each other.

5. A symbol string search apparatus according to claim 4, wherein access to external information by said first external information accessing means is greater in number than that of access to external information by said second external information accessing means.

6. A symbol string search apparatus according to claim 4, wherein the access to external information by said first external information accessing means is made prior to the access to external information by said second external information accessing means.

7. A symbol string search apparatus according to claim 3, further comprising:

(f) input buffering means for holding the symbol string to be searched inputted from said first external information accessing means;

(g) said parallel collation means for collating partial symbol strings of the plurality of preset symbol strings of interest to be searched out with the symbol string to be searched sent from said input buffering means in parallel with each other to perform the leading collation processing;

(h) a state transition table for storing control data to which reference is to be made when the posterior collation processing is performed;

(i) said finite automaton executing means for executing a finite automaton on the basis of the symbol string to be searched sent from said input buffering means and the control data stored in said state transition table to perform the posterior collation processing;

(j) state transition table accessing means for referring to said state transition table when the posterior collation processing is performed;

(k) code converting means for converting the result of the leading collation processing by said parallel collation means into a code to be transferred to said finite automaton executing means;

(l) data selecting means for selecting which of the code generated by said code converting means and a state obtained from said state transition table is to be transferred to said finite automaton executing means; and (m) output buffering means for holding the result of search from said finite automaton executing means, said apparatus performing a symbol string search processing in which in making a processing for search for the plurality of symbol strings of interest in response to the input of the symbol string to be searched, each of the plurality of symbol strings of interest is divided into at least two partial symbol strings at any position, each of the plurality of symbol strings of interest is subjected to the leading collation processing for one of the partial symbol strings of the symbol string of interest by said parallel collation means, and each of those of the plurality of symbol strings of interest which satisfy search conditions on the partial symbol strings subjected to the leading collation processing is subjected to the posterior collation processing for the remaining partial symbol string of the symbol string of interest by said finite automaton executing means, the symbol string of interest being judged as having been searched out in the case where it satisfies a search condition on the partial symbol string subjected to the posterior collation processing.

8. A symbol string search apparatus according to claim 7, further comprising termination code setting means for setting any termination code into said symbol string search apparatus and termination code detecting means for detecting the termination code, the symbol string search processing being terminated by detecting the termination code in the symbol string to be searched.

9. A symbol string search apparatus according to claim 8, further comprising a valid flag register for indicating the validity/invalidity of the termination code set in said termination code setting means and composed of a plurality of symbols for at least every symbol upon collation of the termination code with the symbol string to be searched and means for setting or resetting any constituent bit of said valid flag register, whereby the reference to said valid flag register is made upon collation to validate a symbol in the termination code corresponding to a constituent bit of said valid flag register in a set condition upon collation with the symbol string to be searched and to invalidate a symbol in the termination code corresponding to a constituent bit of said valid flag register in a reset condition upon collation with the symbol string to be searched, thereby making it possible to set "don't care" at any position in the termination code.

10. A symbol string search apparatus according to claim 7, wherein said parallel collation means and said finite automaton executing means operate in parallel with each other for the same input symbol to process the symbol.

11. A symbol string search apparatus according to claim 7, wherein said finite automaton executing means includes a central processing unit.

12. A symbol string search apparatus according to claim 7, wherein said parallel collation means includes a content addressable memory.

13. A symbol string search apparatus according to claim 7, wherein said parallel collation means includes a plurality of sets of register and comparing circuits.

14. A symbol string search apparatus according to claim 7, further comprising a valid flag register for indicating the validity/invalidity of the partial symbol string of each symbol string of interest set in said parallel collation means for at least every symbol upon collation and means for setting or resetting any constituent bit of said valid flag register, whereby the reference to said valid flag register is made upon collation to validate a symbol in the partial symbol string corresponding to a constituent bit of said valid flag register in a set condition upon collation with the symbol string to be searched and to invalidate a symbol in the partial symbol string corresponding to a constituent bit of said valid flag register in a reset condition upon collation with the symbol string to be searched, thereby making it possible to set "don't care" at any position in the partial symbol string.

15. A symbol string search apparatus according to claim 14, wherein there is provided means which, in the case where all of symbols in the partial symbol string of the symbol string of interest are set in said parallel collation means in the form of "don't care", makes the judgement of anti-coincidence for all input symbols as the result of collation with the partial symbol string.

16. A symbol string search apparatus according to claim 7, wherein in the case where the collation of the partial symbol strings of the symbol strings of interest set in said parallel collation means with the symbol string to be searched results in that all of the set symbol strings of interest do not satisfy a search condition, means for detecting such a case is provided.

17. A symbol string search apparatus according to claim 7, wherein in the case where the collation of the partial symbol strings of the symbol strings of interest set in said parallel collation means with the symbol string to be searched results in that at least one of the set symbol strings of interest satisfies a search condition, means for detecting such a case is provided.

18. A symbol string search apparatus according to claim 7, further comprising additional information storage means for storing information which is to be added to the result of search as a part thereof when the result of search is outputted from said finite automaton executing means and means for setting the contents of said additional information storage means, thereby making it possible to add arbitrarily presettable information to the result of search outputted to said output buffering means which holds the result of search.

19. A symbol string search apparatus according to claim 3, wherein said leading collation processing means performs the leading collation in such a manner that a negation condition meaning the presence of all symbols other than a specified symbol can be set at any position in the partial symbol string as the search condition on the partial symbol string at the leading collation processing.

20. A symbol string search apparatus according to claim 3, wherein at least said first external information accessing means (a) and said second external information accessing means (e) of said constituent elements (a) to (e) are provided and access by said first external information accessing means (a) and access by said second external information accessing means (e) are made independent of each other.

21. A symbol string search apparatus according to claim 20, wherein access to external information by said first external information accessing means is greater in number than that of access to external information by said second external information accessing means.

22. A symbol string search apparatus according to claim 20, wherein the access to external information by said first external information accessing means is made prior to the access to external information by said second external information accessing means.

23. A semiconductor integrated circuit comprising:
(a) first external information accessing means for input of a symbol string which is to be searched and which is composed of symbols represented by codes;
(b) leading collation processing means for performing leading collation processing between said symbol string to be searched and a first partial symbol string of each of a plurality of symbol strings of interest which are to be searched for, said leading collation processing means including a parallel collation means for collating, in parallel, symbols constituting each of the first partial symbol strings of interest to be searched for with the symbol string to searched on a symbol basis, said parallel collation means generating a coincidence signal when there is a coincidence for at least one first partial symbol string;
(c) posterior collation processing means including a finite state automaton execution means and being responsive to said coincidence signal, for activating a processing for posterior collation between a subsequent symbol string to be searched input from said first external information accessing means and a second partial symbol string corresponding to said coincidence, said finite state automaton executing means generating an output indicating that the plurality of symbol strings of interest to be searched for are judged as having been successfully searched for in a case where said subsequent symbol string to be searched completely satisfies a search condition for the second partial symbol string corresponding to said coincidence;
(d) data storage means for storing data for control of the finite state automaton processing when the posterior collation processing is performed; and
(e) second external information accessing means for input of said output from said finite state automaton executing means,
wherein as least two kinds of elements (a) to (e) are integrated on the same semiconductor chip.

24. A semiconductor integrated circuit according to claim 23, wherein at least said first external information accessing means (a) and said second external information accessing means (e) of said constituent elements (a) to (e) are integrated on the same semiconductor chip, and access by said first external information processing means and access by said second external information accessing means are made independent of reference to each other.

25. A semiconductor integrated circuit according to claim 24, wherein access to external information by said first external information accessing means is greater in number than that of access to external information by said second external information accessing means.

26. A semiconductor integrated circuit according to claim 24, wherein the access to external information by said first external information accessing means is made prior to the access to external information by said second external information accessing means.

27. A semiconductor integrated circuit according to claim 23, wherein at least two kinds of said constituent elements (a) to (e) including said leading collation processing means (b) are integrated on the same semiconductor chip with the element for each of said at least two kinds being at least one in number, and there is provided means for storing a plurality of said symbol strings of interest or partial symbol strings thereof in said semiconductor integrated 28. A semiconductor integrated circuit according to claim 23, wherein said leading collation processing means performs the leading collation in such a manner that a negation condition meaning the presence of all symbols other than a specified symbol can be set at any position in the partial symbol string as the search condition on the partial symbol string at the leading collation processing.

29. A semiconductor integrated circuit according to claim 23, wherein at least said first external information accessing means (a) and said second external information accessing means (e) of said constituent elements (a) to (e) are integrated on the same integrated circuit and access by said first external information accessing means (a) and access by said second external information accessing means (e) are made independent of each other.

30. A semiconductor integrated circuit according to claim 29, wherein at least said first external information accessing means (a) and said second external information accessing means (e) of said constituent elements (a) to (e) are integrated on the same integrated circuit and access to external information by said first external information accessing means (a) is greater in number than that of access to external information by said second external information accessing means (e).

31. A semiconductor integrated circuit according to claim 29, wherein the access to external information by said first external information accessing means is made prior to the access to external information by said second external information accessing means.

* * * * *

UNITED STATES PATENT AND TRADEMARK OFFICE
CERTIFICATE OF CORRECTION

PATENT NO. : 5,452,451
DATED : September 19, 1995
INVENTOR(S) : Mitsuru Akizawa, et al.

It is certified that error appears in the above-indentified patent and that said Letters Patent is hereby corrected as shown below:

Claim 27, column 37, line 9, after "integrated" insert --circuit.--

Signed and Sealed this

Fourteenth Day of November, 1995

BRUCE LEHMAN

*Attest:*

*Attesting Officer*          *Commissioner of Patents and Trademarks*